(12) United States Patent
Becker et al.

(10) Patent No.: US 10,968,303 B2
(45) Date of Patent: Apr. 6, 2021

(54) BIOMIMETIC SYNTHETIC RUBBER AND METHODS FOR CONTROLLING ITS PHYSICAL PROPERTIES THROUGH BACKBONE DOUBLE BOND STEREOCHEMISTRY BY MONOMER SELECTION AND END GROUP MODIFICATION

(71) Applicants: Matthew L. Becker, Stow, OH (US); Andrew P. Dove, Kenilworth (GB); Vinh X. Truong, Melbourne (AU); Craig A. Bell, Toowong (AU); Ian A. Barker, Wollaton (GB); Jiayi Yu, Cuyahoga Falls, OH (US)

(72) Inventors: Matthew L. Becker, Stow, OH (US); Andrew P. Dove, Kenilworth (GB); Vinh X. Truong, Melbourne (AU); Craig A. Bell, Toowong (AU); Ian A. Barker, Wollaton (GB); Jiayi Yu, Cuyahoga Falls, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 53 days.

(21) Appl. No.: 15/756,256

(22) PCT Filed: Aug. 29, 2016

(86) PCT No.: PCT/US2016/049203
§ 371 (c)(1),
(2) Date: Feb. 28, 2018

(87) PCT Pub. No.: WO2017/040373
PCT Pub. Date: Mar. 9, 2017

(65) Prior Publication Data
US 2018/0244821 A1   Aug. 30, 2018

Related U.S. Application Data

(60) Provisional application No. 62/295,264, filed on Feb. 15, 2016, provisional application No. 62/211,367, filed on Aug. 28, 2015.

(51) Int. Cl.
*C08G 75/045* (2016.01)
*C08F 238/00* (2006.01)
(Continued)

(52) U.S. Cl.
CPC .............. *C08F 238/00* (2013.01); *C08F 2/46* (2013.01); *C08F 4/6095* (2013.01);
(Continued)

(58) Field of Classification Search
None
See application file for complete search history.

(56) References Cited

U.S. PATENT DOCUMENTS

2010/0311861 A1* 12/2010 Clapper ................. C08G 18/73
522/167

FOREIGN PATENT DOCUMENTS

WO   2009/010423 A1   1/2009
WO   2010/141274 A1   12/2010

OTHER PUBLICATIONS

Dix, L. R. et al., "Chain Extension and Crosslinking of Telechelic Oligomers-II. Michael Additions of Bisthiols to Bismaleimides, Bismaleates and Bis(Acetylene Ketone)s to Give Linear and Cross-linked Polymers". Eur. Polym. J. 1995, 31(7), 653-658. (Year: 1995).*

(Continued)

*Primary Examiner* — Richard A Huhn
(74) *Attorney, Agent, or Firm* — Renner Kenner Greive Bobak Taylor & Weber

(57) ABSTRACT

In various embodiments, the present invention provides a strong, synthetic elastomer materials (and related methods (Continued)

for making same) with mechanical properties that are controlled by the stereochemically-defined double bonds within their backbone, yet have physical properties that are derived from monomer selection and defined, modifiable, chain end groups. The use of the organocatalyzed, stereospecific addition of thiols to activated alkynes, affords isolated high molar mass materials (>100 kDa) via step-growth polymerization with high levels of cis- or trans-double bond content. Furthermore, in various aspects of the present invention, it has been found that changing the monomer composition and chain end groups provides additional control over the materials' physical properties to provide more efficient compounding with polar additives. Using this approach to elastomer synthesis, further end group modification and toughening through various vulcanization strategies are also possible.

30 Claims, 19 Drawing Sheets

(51) Int. Cl.
 C08F 2/46 (2006.01)
 C08F 4/609 (2006.01)
(52) U.S. Cl.
 CPC ........ *C08G 75/045* (2013.01); *C08F 2500/01* (2013.01); *C08F 2500/04* (2013.01); *C08F 2500/21* (2013.01)

(56) References Cited

OTHER PUBLICATIONS

Kuroda, H. et al., "A Novel Polyaddition of Bifunctional Acetylenes Containing Electron-Withdrawing Groups. 2. Synthesis of Polymers Having β-Alkylmercaptoenoate Moieties by the Reaction with Dithiols". Macromolecules 1995, 28(18), 6020-6025. (Year: 1995).*
Ebdon J R et al: "Chain extension and crosslinking of telechelic oligomers-II. Michael additions of bisthiols to bismaleimides, bismaleates and bis(acetylene ketone)s to give linear and crosslinked polymers", European Polymer Journal, Pergamon Press Ltd. Oxford, GB, vol 31, No. 7, Jul. 1, 1995 (Jul. 1, 1995), pp. 653-658, XP004066951 ,ISSN: 0014-3057, DOI:10.1016/0014-3057(95)00006-2 at Scheme 4.
Truong et al., "Organocatalytic, Regioselective Nucleophilic Click Addition of Thiols to Propiolic Acid Esters for Polymer-Polymer Coupling", Angewandte Chem. Int. Ed. 2013, vol. 52, pp. 4132-4136. p. 4134, Col. 2, para. 2, Scheme 3; p. 4133, Col. 1, para. 2 to Col. 2, para. 1; Tables 1 and 2; p. 4134, Scheme 3.
Chan et al., "Synthesis, Thiol-Yne 'Click' Photopolymerization, and Physical Properties of Networks Derived from Novel Multifunctional Alkynes", Macromolecules, 2010, vol. 43, pp. 4937-4942. abstract; p. 4938, Scheme 1, Figure 1; p. 4941, Col. 2, para. 1 to p. 4942, Col. 1, para. 1; Figure 6.
Migliorese et al., "Skipped Diynes. IV. Diacetylenic Ketone Reactions", J. Org. Chem. 1974, vol. 39, pp. 843-845. p. 843, Col. 1, para. 4, Compound 1a.
Yao et al., "Catalyst-Free Thiol-Yne Click Polymerization: A Powerful and Facile Tool for Preparation of Functional Poly(vinylene sulfide)", Macromolecules, 2014, vol. 47, pp. 1325-1333. abstract; p. 1327, Table 5; p. 1327, Tables 2, 3 and 5; p. 1331, Col. 1, para. 7 to Col. 2, para. 1; Scheme 3.
Truong et al., "Simultaneous Orthogonal Dual-Click Approach to Tough, in-Situ-Forming Hydrogels for Cell Encapsulation", J. Am. Chem. Soc., Jan. 15, 2015, vol. 137, pp. 1619-1622. 1620, Figure 2C.

* cited by examiner

BIOMIMETIC SYNTHETIC RUBBER AND METHODS FOR CONTROLLING ITS PHYSICAL PROPERTIES THROUGH BACKBONE DOUBLE BOND STEREOCHEMISTRY BY MONOMER SELECTION AND END GROUP MODIFICATION

CROSS REFERENCE TO RELATED APPLICATIONS

This application is a national phase application based upon international application serial number PCT/US2016/049203, entitled "Biomimetic Synthetic Rubber and Methods for Controlling its Physical Properties Through Backbone Double Bond Stereochemistry by Monomer Selection and End Group Modification," filed Aug. 29, 2016, which claims the benefit of U.S. provisional patent application Ser. No. 62/211,367 entitled "Biomimetic Synthetic Rubber: Control of Physical Properties Through Backbone Double Bond Stereochemistry Through Monomer Selection and End Group Modification," filed Aug. 28, 2015, and U.S. provisional patent application Ser. No. 62/295,264 entitled "Biomimetic Synthetic Rubber: Control of Physical Properties Through Backbone Double Bond Stereochemistry Through Monomer Selection and End Group Modification," filed Feb. 15, 2016, all of which are incorporated herein by reference in its entirety.

NAMES OF THE PARTIES TO A JOINT RESEARCH AGREEMENT

The present application stems from work done pursuant to a Joint Research Agreement between The University of Akron in Akron, Ohio and The University of Warwick, in Coventry, United Kingdom.

FIELD OF THE INVENTION

One or more embodiments of the present invention relates to a biomimetic elastomer composition and related methods for their synthesis and use. In certain embodiments, the present invention relates to methods of controlling the physical properties of synthetic rubber compositions through by modification of the backbone double bond stereochemistry of the composition through monomer selection and end group modification.

BACKGROUND OF THE INVENTION

Elastomeric materials are applied widely to demanding applications on account of their inherent reversible deformation behaviour. Science has been searching for a synthetic elastomer surrogate for natural rubber for more than a century that delivers both the versatility of synthetic materials and the mechanical properties of natural rubber/gutta percha. While these materials have found widespread application, the design principles that govern their microstructure, and hence their properties, are not clear. Changes to the monomers or stoichiometry are designed to elicit a change in physical properties also alter the chain packing and hence the mechanical properties of the materials. In contrast, natural rubber is a homopolymer of poly(cis-isoprene) and owes its elastomeric properties to the enhanced chain packing afforded by its stereochemical purity.

Interestingly however, gutta-percha, differing only by the stereochemistry of the double bonds in its backbone, displays remarkably different mechanical properties than natural rubber. The small structural difference between natural rubber and gutta-percha, the cis- and trans-isomers of high molar mass poly(isoprene) respectively, highlight the significance of stereochemistry in the remarkable difference in mechanical properties of the two materials. Although natural rubber displays high tensile strength and Young's modulus, which are indicative of its strong yet elastic nature, gutta-percha—only differing in the stereochemical arrangement of the double bonds in the backbone—has lower ultimate tensile strength higher Young's modulus, which indicates that it is significantly weaker and more brittle than its isomer. These features are attributed to its ability to crystallize rapidly on straining. Many synthetic elastomer materials are tri- or multi-block copolymers that are based on the concept of an amorphous-crystalline or 'hard-soft' phase separated system in which organisation of the 'hard' and 'soft' domains endows the strong but elastic properties upon the materials. While great advances have been made in these materials, the excellent elastomeric properties and strength of natural rubber mean that it is still a highly prized material.

Despite the success of natural rubber and its structural isomer, gutta-percha, the application of the underlying chemical principles to other systems has been limited. The design principles necessary to control crystallinity and hence mechanical properties in these materials generally known, but the inability to incorporate a wide range of functional groups into the materials in a controlled manner or rationally define the chain end functionality has significantly limited the applications of both these materials and their synthetic analogues.

A critical limitation in the development of novel materials through the same principles as natural rubber/gutta percha has been the lack of synthetic methods that can deliver both controlled double bond stereochemistry and polymers with high molar mass. Efforts to control stereochemistry in polymeric materials have been a driving force for innovation for more than 60 years. The unique physcio-chemical properties of these polymers are highly dependent on the stereochemistry or regioregularity, hence these areas have been a driving force for continued exploration. A system combining of the control over crystallinity and mechanical properties through backbone double bond stereochemistry, as exemplified by natural rubber/gutta percha, with the tunability of materials properties of synthetic materials via monomer selection and end group modification has long been sought, and if found, would revolutionise the rational design of elastomers across a wide range of application areas and present an entire new design space for functional elastomers. The practical utility of each of these materials results from properties that are defined via the convergence of stereochemistry, composition and phase behaviour.

What is needed in the art, therefore, are strong, synthetic elastomer materials with mechanical properties that are controlled by the stereochemically-defined double bonds within their backbone, yet have physical properties that are derived from monomer selection and defined, modifiable, chain end groups.

SUMMARY OF THE INVENTION

In one or more aspects, the present invention provides strong, synthetic elastomer materials (and related methods for making same) with mechanical properties that are controlled by the stereochemically-defined double bonds within their backbone, yet have physical properties that are derived from monomer selection and defined, modifiable, chain end groups. The use of the organocatalyzed, stereospecific addition of thiols to activated alkynes, affords isolated high molar mass materials (>100 kDa) via step-growth polymerization with high levels of cis- or trans-double bond content. It has been found that the cis-/trans-ratio defines the mechanical properties of the resultant materials, producing materials with an ultimate tensile strength up to 60.0 MPa, a Young's Moduli between 1.5 and 87.6 MPa and an elongation at break of up to 3000%. Furthermore, in various aspects of the present invention, it has been found that changing the monomer composition and chain end groups provides control over the materials' physical properties to provide more efficient compounding with polar additives. Using this approach to elastomer synthesis, further end group modification and toughening through various vulcanization strategies are also possible. The organocatalytic control of stereochemistry provides a new and easily scalable class of elastomers that will have unique chemical handles for functionalization and post synthetic processing.

In a first aspect, the present invention is directed to a thiol-yne elastomer composition comprising the residue of a multi-functional alkyne monomer and the residue of a multi-functional thiol monomer, the thiol-yne elastomer composition having a cis-trans double bond ratio of from 99:1 to about 1:99. In some embodiments, the multi-functional alkyne is a dialkyne having the formula:

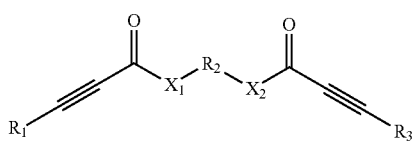
(I)

where $R_1$, and $R_3$ are each an H, alkyl or aryl group; $R_2$ is an alkyl, alkylene, ethoxy, or aryl group; and $X_1$ and $X_2$ are an O, C, NH, or S group.

In one or more embodiments, the thiol-yne elastomer composition of the present invention includes any one or more of the above referenced embodiments of the first aspect of the present invention wherein the multi-functional alkyne is a dialkyne having the formula:

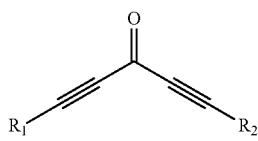
(II)

and R1 and R2 are H, alkyl or aryl groups. In one or more embodiments, the thiol-yne elastomer composition of the present invention includes any one or more of the above referenced embodiments of the first aspect of the present invention wherein the multi-functional thiol monomer has the formula:

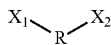
(III)

wherein R is an alkyl or aryl group and $X_1$ and $X_2$ are SH groups.

In one or more embodiments, the thiol-yne elastomer composition of the present invention includes any one or more of the above referenced embodiments of the first aspect of the present invention having a weight average molecular mass ($M_W$) of from about 1,000 Da or more to about 1,000,000 Da or less. Unless otherwise indicated herein, the weight average molecular mass/weight ($M_W$) may be determined using any appropriate method, including without limitation, size exclusion chromatography (SEC), mass spectroscopy, light scattering, osmometry, and intrinsic viscosity. In one or more embodiments, the thiol-yne elastomer composition of the present invention includes any one or more of the above referenced embodiments of the first aspect of the present invention having a glass transition temperature ($T_g$) of from about −50° C. or more to about 10° C. or less. In one or more embodiments, the thiol-yne elastomer composition of the present invention includes any one or more of the above referenced embodiments of the first aspect of the present invention having an elastic modulus (E) of from about 1.0 MPa to about 90 MPa.

In one or more embodiments, the thiol-yne elastomer composition of the present invention includes any one or more of the above referenced embodiments of the first aspect of the present invention having an elongation at break ($\varepsilon_{break}$) of from 50% or more to 3000% or less. In one or more embodiments, the thiol-yne elastomer composition of the present invention includes any one or more of the above referenced embodiments of the first aspect of the present invention having a molecular mass distribution ($Đ_M$) of from about 1.5 or more to about 5.0 or less.

In one or more embodiments, the thiol-yne elastomer composition of the present invention includes any one or more of the above referenced embodiments of the first aspect of the present invention further comprising one or more functional end groups. In one or more embodiments, the thiol-yne elastomer composition of the present invention includes any one or more of the above referenced embodiments of the first aspect of the present invention wherein the one or more functional end groups are selected from the group consisting of alkyne, alkene, alkane, hydroxyl, carboxylic acid, fluoro, trifluoro, perfluoro, and combinations thereof.

In a second aspect, the present invention is directed to a thiol-yne elastomer composition comprising the reaction product of a multi-functional alkyne monomer and a multi-functional thiol monomer wherein the thiol-yne elastomer composition has a cis-trans double bond ratio of from 99:1 to about 1:99. In some embodiments, the multi-functional alkyne is a dialkyne having the formula:

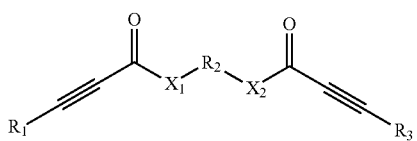
(I)

wherein $R_1$, and $R_3$ are each an H, alkyl or aryl group; $R_2$ is an alkyl, alkylene, ethoxy, or aryl group; and $X_1$ and $X_2$ are an O, C, NH, or S group.

In one or more embodiments, the thiol-yne elastomer composition of the present invention includes any one or more of the above referenced embodiments of the second aspect of the present invention wherein the multi-functional alkyne is a dialkyne having the formula:

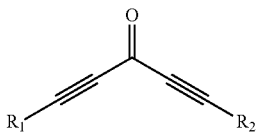

(II)

where R1 and R2 are H, alkyl or aryl groups.

In one or more embodiments, the thiol-yne elastomer composition of the present invention includes any one or more of the above referenced embodiments of the second aspect of the present invention wherein the multi-functional thiol monomer comprises a linear dithiol, a branched trithiol, a branched tetrathiol, or a combination thereof. In one or more embodiments, the thiol-yne elastomer composition of the present invention includes any one or more of the above referenced embodiments of the second aspect of the present invention wherein the multi-functional thiol monomer has the formula:

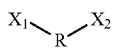

(III)

where R is an alkyl or aryl group and $X_1$ and $X_2$ are SH groups. In one or more embodiments, the thiol-yne elastomer composition of the present invention includes any one or more of the above referenced embodiments of the second aspect of the present invention having a weight average molecular mass ($M_W$) of from about 1,000 Da or more to about 1,000,000 Da or less.

In a third aspect, the present invention is directed to a method of making the thiol-yne elastomer composition of claim 1 comprising: combining a multi-functional alkyne monomer and a multi-functional thiol monomer, with a suitable reaction solvent in a suitable vessel at a temperature of from about −20° C. to about 40° C.; adding a suitable base catalyst, allowing the temperature to rise to about ambient temperature, and stirring for from about 0.05 hours to about 10 hours; diluting the mixture with additional solvent and adding a radical inhibitor compound to prevent undesired radical reactions; and precipitating the mixture into a suitable polar solvent to produce a thiol-yne elastomer composition.

In some of these embodiments, the multi-functional alkyne is a dialkyne monomer having the formula:

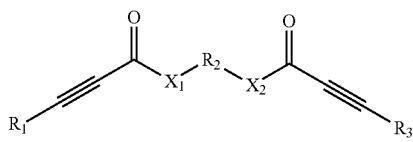

(I)

wherein $R_1$, and $R_3$ are H, alkyl or aryl groups; $R_2$ is alkyl, alkylene, ethoxy, or aryl group; and $X_1$ and $X_2$ is an O, C, NH, or S group.

In one or more embodiments, the method of making the thiol-yne elastomer of the present invention includes any one or more of the above referenced embodiments of the third aspect of the present invention wherein the reaction solvent comprises a mixture of solvents having different polarities. In some embodiments, the reaction solvent is selected from the group consisting of chloroform ($CHCl_3$), N,N-dimethylformamide (DMF), dioxane, methylene chloride ($CH_2Cl_2$), N-methylpyrolidone (NMP), and combinations thereof.

In one or more embodiments, the method of making the thiol-yne elastomer of the present invention includes any one or more of the above referenced embodiments of the third aspect of the present invention wherein the base catalyst is selected from the group consisting of 1,8-diazabicycloundecene (DSU), triazabicyclodecene (TBD), triethylamine ($Et_3N$), tetramethyl guanidine (TMG), benzotriazole, dimethylphenylphosphine (DMPP), and combinations thereof. In one or more embodiments, the method of making the thiol-yne elastomer of the present invention includes any one or more of the above referenced embodiments of the third aspect of the present invention wherein the radical inhibitor is 2,6-di-tert-butyl-4-methylphenol (BHT).

In one or more embodiments, the method of making the thiol-yne elastomer of the present invention includes any one or more of the above referenced embodiments of the third aspect of the present invention wherein the molar ratio of the multi-functional alkyne monomer to the multi-functional thiol monomer is approximately 1:1.

In one or more embodiments, the method of making the thiol-yne elastomer of the present invention includes any one or more of the above referenced embodiments of the third aspect of the present invention further comprising controlling the cis-trans double bond ratio of the resulting thiol-yne elastomer composition by using triethylamine as the base catalyst and varying the polarity of the suitable solvent, wherein an increase in the polarity of the reaction solvent produces an increase in the cis-trans double bond ratio of the resulting thiol-yne elastomer composition and a decrease in the polarity of the reaction solvent produces an decrease in the cis-trans double bond ratio of the resulting thiol-yne elastomer composition. In one or more embodiments, the method of making the thiol-yne elastomer of the present invention includes any one or more of the above referenced embodiments of the third aspect of the present invention further comprising adding one or more thiol functionalized end group to the terminal ends of the thiol-yne elastomer composition by means of a thiol-alkyne click reaction.

In one or more embodiments, the method of making the thiol-yne elastomer of the present invention includes any one or more of the above referenced embodiments of the third aspect of the present invention wherein the ratio of dialkyne monomer to the multi-functional thiol monomer is greater than 1:1, the method further comprising adding a thiol functionalized end group to the mixture after the step of adding a radical initiator. In one or more embodiments, the method of making the thiol-yne elastomer of the present invention includes any one or more of the above referenced embodiments of the third aspect of the present invention wherein the ratio of the dialkyne monomer to the multi-functional thiol monomer is greater than 1:1, the method further comprising: dissolving the thiol-yne elastomer composition in a suitable solvent; adding a thiol functionalized end group to the solution and stirring until the thiol functionalized end group dissolves; adding a catalyst and stirring; and precipitating the solution into a non-solvent for the thiol-yne elastomer composition to produce a thiol-yne elastomer composition comprising the end groups.

BRIEF DESCRIPTION OF THE DRAWINGS

For a more complete understanding of the features and advantages of the present invention, reference is now made to the detailed description of the invention along with the accompanying figures.

FIG. 2A is an SEC chromatogram for a 147.5 kDa $C_{3A}$-$C_{6S}$ polymer containing 80% cis double bonds. FIG. 2B is an SEC chromatogram for a 122.5 kDa $C_{3A}$-$C_{6S}$ polymer containing 70% cis double bonds. FIG. 2C is an SEC chromatogram for a 131.1 kDa $C_{3A}$-$C_{6S}$ polymer containing 53% cis double bonds. FIG. 2D is an SEC chromatogram for a 125.4 kDa $C_{3A}$-$C_{6S}$ polymer containing 32% cis double bonds. Molecular weights given are the weight average molecular weight ($M_w$).

FIG. 3A is an SEC chromatogram for a 147.5 kDa $C_{3A}$-$C_{6S}$ polymer containing 80% cis double bonds. FIG. 3B is an SEC chromatogram for a 132.4 kDa $C_{3A}$-$C_{6S}$ polymer containing 80% cis double bonds. FIG. 3C is an SEC chromatogram for a 107.3 kDa $C_{3A}$-$C_{6S}$ polymer containing 80% cis double bonds. FIG. 3D is an SEC chromatogram for a 62.2 kDa $C_{3A}$-$C_{6S}$ polymer containing 80% cis double bonds. FIG. 3E is an SEC chromatogram for a 43.5 kDa $C_{3A}$-$C_{6S}$ polymer containing 80% cis double bonds. Molecular weights given are the weight average molecular weight ($M_w$).

FIG. 4A is a SEC chromatogram (RI detection calibrated against polystyrene standards) providing $M_n$=18.3 kDa, $M_w$=132.4 kDa, $M_p$=137.5 kDa, and $Đ_M$=7.25. FIG. 4B is graph of intrinsic viscosity vs molar mass (K=95.6×10$^{-5}$ dL g$^{-1}$, α=0.61). The α value is calculated from the gradient of the line and is consistent with a linear polymer in a theta solvent.

FIG. 7A is a stress-strain curve for a 147.5 kDa $C_{3A}$-$C_{3S}$ polymer containing 80% cis double bonds and having 22.2% crystallinity. FIG. 7B is a stress-strain curve for a 131 kDa $C_{3A}$-$C_{3S}$ polymer containing 53% cis double bonds and having 0% crystallinity. FIG. 7C is a stress-strain curve for a 125.4 kDa $C_{3A}$-$C_{3S}$ polymer containing 32% cis double bonds and having 0% crystallinity. Expansions insets are for clarity. Results are listed in Table 5, below.

FIG. 11A is a WAXD pattern for a 147.5 kDa $C_{3A}$-$C_{6S}$ polymer containing 80% cis double bonds and 22.2% crystallinity. FIG. 11B is a WAXD pattern for a 122.5 kDa $C_{3A}$-$C_{6S}$ polymer containing 70% cis double bonds and 14.1.2% crystallinity. FIG. 11C is a WAXD pattern for a 131.1 kDa $C_{3A}$-$C_{6S}$ polymer containing 53% cis double bonds and 0% crystallinity. FIG. 11D is a WAXD pattern for a 125.4 kDa $C_{3A}$-$C_{6S}$ polymer containing 32% cis double bonds and 0% crystallinity. These WAXD patterns show that $C_{3A}$-$C_{6S}$ polymers with a higher percentage of cis double bonds display increased crystallinity, which is consistent with their mechanical performance.

FIG. 12A is a stress-strain curve for a 151.3 kDa $C_{3A}$-$C_{3S}$ polymer containing 75% cis double bonds. FIG. 12B is a stress-strain curve for a 108.0 kDa $C_{3A}$-$C_{3S}$ polymer containing 63% cis double bonds. FIG. 12C is a stress-strain curve for a 104.1 kDa $C_{3A}$-$C_{3S}$ polymer containing 42% cis double bonds. Data for 3 samples are shown to illustrate the reproducibility. Expansions inset for clarity. Results are listed in Table 3, below.

FIG. 13A is a WAXD pattern for a 151.3 kDa $C_{3A}$-$C_{3S}$ polymer containing 75% cis double bonds and 3% crystallinity. FIG. 13B is a WAXD pattern for a 108.0 kDa $C_{3A}$-$C_{3S}$ polymer containing 63% cis double bonds and 0% crystallinity. FIG. 13C is a WAXD pattern for a 104.1 kDa $C_{3A}$-$C_{3S}$ polymer containing 42% cis double bonds and 0% crystallinity. WAXD shows that $C_{3A}$-$C_{3S}$ with higher percentage of cis double bonds display an increased crystallinity that is consistent with their mechanical performance.

FIG. 14A is a WAXD pattern for a 107.3 kDa $C_{3A}$-$C_{3S}$ polymer containing 80% cis double bonds and having 22.9% crystallinity. FIG. 14B is a WAXD pattern for a 132.4 kDa $C_{3A}$-$C_{3S}$ polymer containing 80% cis double bonds and having 19.4% crystallinity. FIG. 14C is a WAXD pattern for a 147.5 kDa $C_{3A}$-$C_{3S}$ polymer containing 80% cis double bonds and having 22.2% crystallinity. WAXD results show that the $C_{3A}C_{3S}$ polymers with the same percentage of cis double bonds possess similar crystallinity.

FIGS. 17 A-E are exemplar stress vs strain curves for $C_{3A}$-$C_{XS}$ polymers with similar percentages of cis double bonds tested at 20 mm/min.

FIG. 18A is a stress-strain curve for a 151.2 kDa $C_{3A}C_{3S}$ polymer containing 75% cis double bonds. Expansion inset is for clarity. FIG. 18B is a stress-strain curve for a 145.7 kDa $C_{4A}C_{3S}$ polymer containing 75% cis double bonds. FIG. 18C is a stress-strain curve for a 105.8 kDa $C_{6A}C_{3S}$ polymer containing 75% cis double bonds. For each, data for 3 samples is shown to illustrate the reproducibility. Results are listed in Table 6, below.

DETAILED DESCRIPTION OF THE ILLUSTRATIVE EMBODIMENTS

Figure 1A:
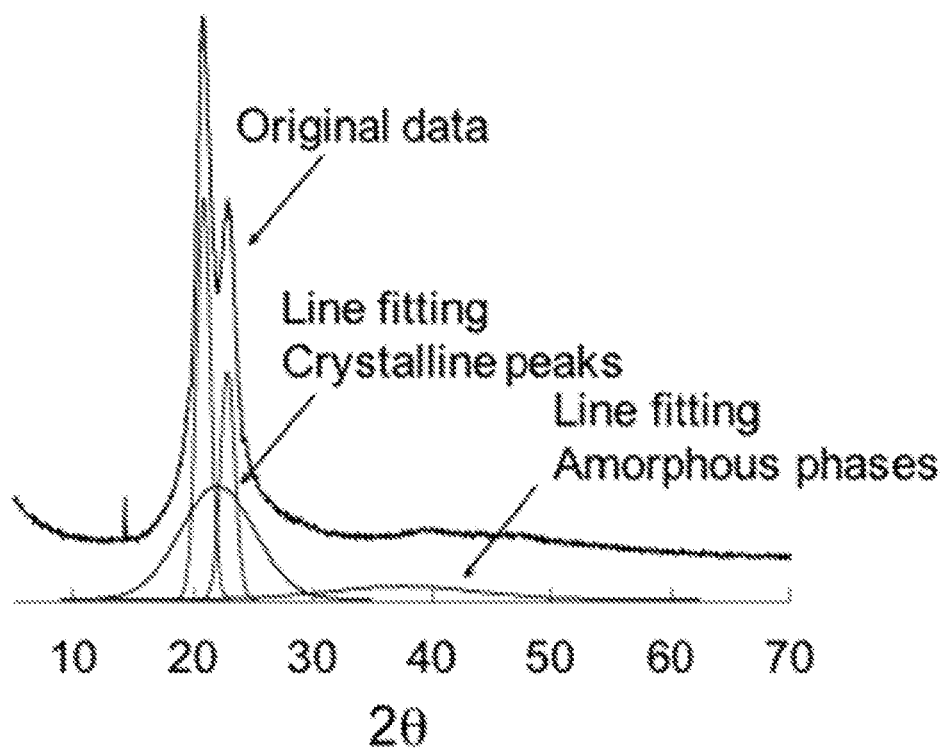
FIGS. 1A-B is a graph showing X-Ray scattering data for $C_{3A}$-$C_{6S}$ polymers according to one or more embodiments of the present invention with 80% cis double bonds after stretching. Wide-Angle X-Ray Diffraction (WAXD) pattern (FIG. 1A) shows that the material retains a high degree of crystallinity 22.2% crystallinity before stretching and 46.8% crystallinity after stretching) that is consistent with their mechanical performance. Lines showing the original data, lines showing the fitting of the crystalline peaks, and lines showing the fitting of the amorphous phases are marked. Small-Angle X-Ray Scattering (FIG. 1B) data shows that the crystalline domain size, calculated from the q value at maximum intensity, reduces in line with that expected from the stretching of the sample.

In one or more aspects, the present invention provide strong, synthetic thiol-yne elastomer materials (and related methods for making same) with mechanical properties that are controlled by the stereochemically-defined double bonds within their backbone, yet have physical properties that are derived from monomer selection and defined, modifiable, chain end groups. Using the organocatalyzed, stereospecific addition of thiols to activated alkynes, affords isolated high molar mass materials (>100 kDa) via step-growth polymerization with high levels of cis- or trans-double bond content. It has been found that the cis-/trans-ratio defines the mechanical properties of the resultant materials and produces materials with an ultimate tensile strength of up to 60 MPa, a Young's Moduli of between 1.5 and 87.6 MPa and an elongation at break of up to 3000%. Moreover, in one or more embodiments, the present method makes it possible to manipulate the cis-/trans-ratio of these thiol-ene elastomer materials without changing their molecular weight, simply by controlling the polarity of the reaction solvent. Furthermore, in various aspects of the present invention, it has been found that changing the monomer composition and chain end groups provides control over the materials' physical properties to aid more efficient compounding with polar additives.

In a first aspect, the various embodiments of the present invention are directed to biomimetic synthetic rubber materials comprising a thiol-yne elastomer composition formed as the step-growth reaction product of a multi-functional alkyne monomer and a multi-functional thiol monomer and will, of course be comprised of segments consisting of the residues of those monomers. As used herein, the term "residue" refers generally to the part of a monomer or other chemical unit that has been incorporated into a polymer or large molecule. As will be apparent to those of skill in the art, the thiol-yne elastomer composition of the biomimetic synthetic rubber composition of the present invention will be comprised of the residues of the two monomers, present in relative amounts that reflect the molar ratio of the two monomers used to form the thiol-yne elastomer.

In various embodiments, the multi-functional alkyne monomer will have two, three, or four alkyne functional groups separated by a linear or branched $C_1$-$C_{12}$ alkyl, a $C_1$-$C_{12}$ alkylene, $N_1$-$N_{20}$ or ethoxy. In one or more embodiments, the multi-functional alkyne monomer is linear and has two alkyne functional groups. While these arrangements are preferred, the invention is not so limited and the multi-functional alkyne monomer may comprise an alkyne ester, such as 2-butynoic ester, an activated alkyne amide, or a dialkyne with a ketone. In some embodiments, the multi-functional alkyne monomer may comprise a trifunctional activated alkyne. In one or more of these embodiments, the trifunctional activated alkyne may be synthesized by esterification of tris(hydroxymethyl)ethane with proprionic acid using any conventional method. In some other embodiments, the multi-functional alkyne monomer may comprise a tetra-functional alkyne. In one or more of these embodiments, the tetra-functional alkyne may be synthesized by esterification of pentaerythritol by with proprionic acid using any conventional method.

In one or more embodiment, the multi-functional alkyne monomer will have a weight average molecular weight $M_W$ of from about 100 Da or more to about 10,000 Da or less. In some embodiments, the $M_W$ may be 500 Da or more. In some embodiments, the $M_W$ may be 1000 Da or more, in some embodiments, 1500 Da or more, in some embodiments, 2000 Da or more, in some embodiments, 2500 Da or more, in some embodiments, 3000 Da or more, in some embodiments, 3500 Da or more, and in some embodiments, 4,000 Da or more. In one or more embodiments, thiol-yne elastomer composition may have a $M_W$ of 9000 Da or less. In some embodiments, the $M_W$ may be 8000 Da or less. In some embodiments, the $M_W$ may be 7500 Da or less, in some embodiments, 7000 Da or less, in some embodiments, 6500 Da or less, in some embodiments, 6000 Da or less, in some embodiments, 5500 Da or less, in some embodiments, 5000 Da or less, and in some embodiments, 4500 Da or less. In one or more embodiments, thiol-yne elastomer composition may have a $M_W$ of from 1000 Da or more to 5000 Da or less.

In one or more embodiments, the multi-functional alkyne monomers may include any $C_1$-$C_{12}$ alkyl, a $C_1$-$C_{12}$ alkylene, or $N_1$-$N_{20}$ ethoxy having two or more alkyne functional groups. In one or more embodiments, the multi-functional alkyne monomers may be, without limitation, propane-1,3-diyl dipropiolate, butane-1,4-diyl dipropiolate, and/or hexane-1,6-diyl dipropiolate.

In one or more embodiment, the multi-functional alkyne monomer may be a dialkyne having the formula:

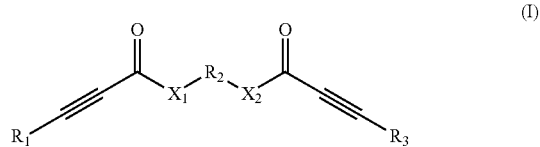

(I)

wherein $R_1$, and $R_3$ are H, alkyl or aryl groups; $R_2$ is an alkyl, alkylene, ethoxy, or aryl group; and $X_1$ and $X_2$ are each an O, C, NH, or S group. In one or more embodiments, $R_1$, and $R_3$ may be H, alkyl or aryl groups. In some embodiments, $R_2$ may be alkyl, alkylene, ethoxy, or aryl groups.

In some embodiments, the multi-functional alkyne monomer may be a dialkyne having the formula:

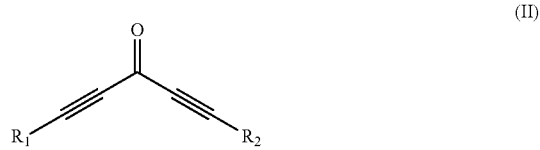

(II)

wherein $R_1$ and $R_2$ are H, alkyl or aryl groups. In various embodiments, $R_1$ and $R_2$ may be alkyl, alkylene, ethoxy, or aryl groups.

In one or more embodiments, the multi-functional alkyne monomer may have a formula selected from:

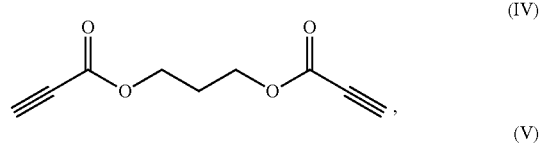

(IV)

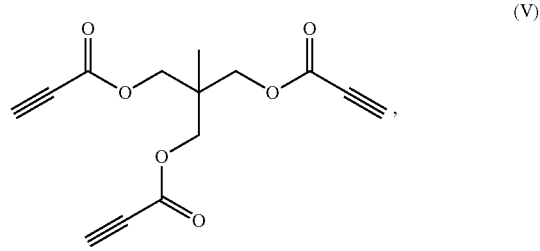

(V)

(VI)

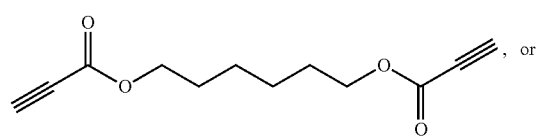

(VII)

, or

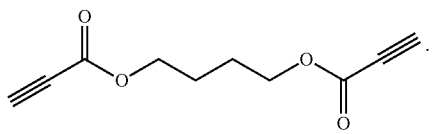

(VIII)

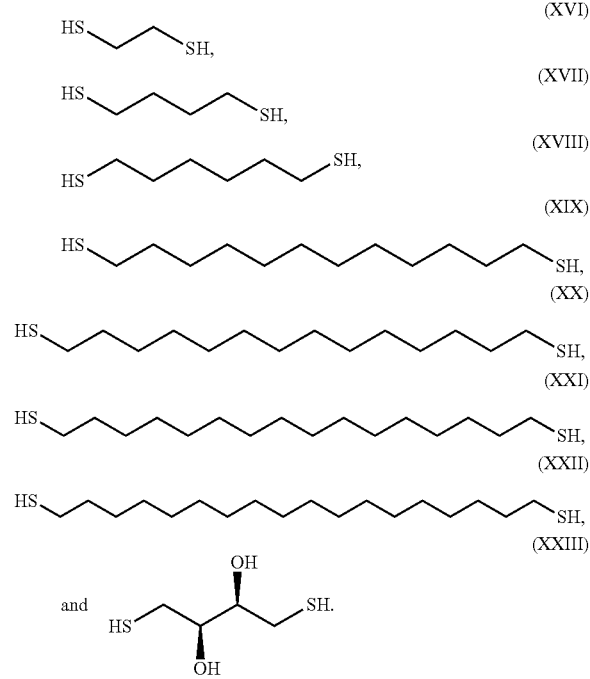

Suitable multi-functional alkyne monomers are available from a variety of commercial sources and may be synthesized using any method known in the art for that purpose. In some embodiments, suitable dialkyne monomers may be obtained by sulphuric acid-catalyzed Fischer esterification of propiolic acid and the corresponding diol, triol, or tetraol in a 2:1 ratio using a Dean-Stark apparatus at about 120° C.

As set forth above, the thiol-yne elastomer composition of various embodiments of the present invention further comprises the residue of one or more multi-functional thiol monomer(s). In one or more embodiments, the multi-functional thiol monomer may comprise two, three, or four thiol functional groups separated by a linear or branched $C_2$-$C_{30}$ molecule, but is preferably a $C_2$-$C_{20}$ linear dithiol.

In one or more embodiments, the multi-functional thiol monomer residue may be, without limitation, that of propanedithiol poly(ethylene glycol) dithiol, hexa(ethylene glycol) dithiol, tetra(ethylene glycol) dithiol, 2,2'-(ethylenedioxy)diethanethiol, 1,4-benzenedimethanethiol, 2-mercaptoethyl ether, 1,2-mthanedithiol, 1,4-butanedithiol, 1,6-hexanedithiol, 1,8-octanedithiol, 1,10-decanedithiol, 1,12-dodecanedithiol, 1,14-butadecanedithiol, 1,16-hexadecanedithiol, 1,18-octadecanedithiol, L-(-)-dithiothreitol.

In one or more embodiment, the multi-functional thiol monomers may have the formula:

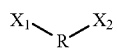

(III)

wherein R is an alkyl or aryl group and $X_1$ and $X_2$ are SH groups. In one or more embodiments, R may be a $C_2$-$C_{30}$ linear alkane or a linear aryl In one or more embodiments, the multi-functional thiol monomer may have a formula selected from:

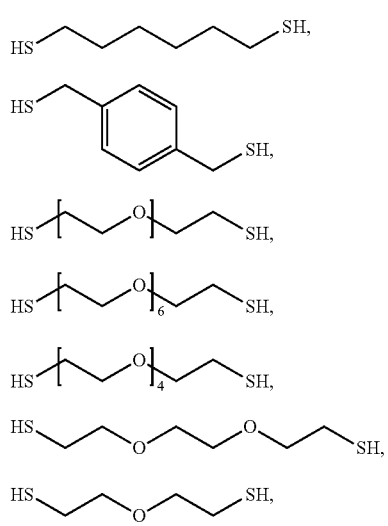

Suitable multi-functional thiol monomers are available from a variety of commercial sources, including for example Sigma-Aldrich (St. Louis, Mo.) and may also be synthesized using a variety of available methods known in the art for that purpose.

As will be appreciated by those of skill in the art, and is discussed in more detail below, when the multi-functional alkyne monomer and multi-functional thiol monomer are combined, the thiol end groups of the multi-functional thiol monomer will react with the alkyne end groups of the multi-functional alkyne monomers to form a thiol-yne elastomer material containing the residues of both monomers. In this reaction, a bond is formed between each thiol end group and each alkyne end group by alkylating the triple bond of the alkyne to form stereospecific isomers, with each resulting double bond providing either a cis or a trans stereoisomer. Accordingly, the thiol-yne elastomer compositions of the present invention will have a combination of cis and trans configurations throughout its length and, as will be discussed in more detail below, the relative number of these cis and trans configurations has a significant effect on the overall structure and the resulting properties of these thiol-yne polymers.

It has been found, further, that the ordering of the polymer chains into micro-line domains in the thiol-yne elastomers according to various embodiments of the present invention is enhanced by high cis-content, in line with that of natural rubber and a decrease in the % cis content corresponds to a decreased crystallinity within these thiol-yne elastomers. Further, the semicrystalline nature of these elastomer networks manifests itself as a significant improvement of the network's mechanical properties with an increase in the fraction of the cis-isomers.

In one or more embodiments, thiol-yne elastomer composition of the biomimetic synthetic rubber composition of the present invention may have a cis-trans double bond ratio of from 99:1 to about 1:99. In one or more embodiments, the thiol-yne elastomer composition of the biomimetic synthetic rubber composition of the present invention may have a cis-trans double bond ratio of 5:95 or more. In some embodiments, the cis-trans double bond ratio may be 15:85 or more, in some embodiments, 20:80 or more, in some embodiments, 25:75 or more, in some embodiments, 30:70 or more, in some embodiments, 35:65 or more, and in some embodiments, 40:60 or more. In one or more embodiments, the thiol-yne elastomer composition of the biomimetic synthetic rubber composition of the present invention may have a cis-trans double bond ratio of 95:5 or less. In some embodiments, the cis-trans double bond ratio may be 90:10 or less, in some embodiments, 85:15 or less, in some embodiments, 80:20 or less, in some embodiments, 75:25 or less, in some embodiments, 70:30 or less, in some embodiments, 65:35 or less, and in some embodiments, 60:40 or less. In some embodiments, cis-trans double bond ratio may be 80:20. In some other embodiments, cis-trans double bond ratio may be 70:30. In some other embodiments, cis-trans double bond ratio may be 53:47. In some other embodiments, cis-trans double bond ratio may be 32:68.

In one or more embodiments, from 1% to about 99% of the double bonds in the thiol-yne elastomer composition of the biomimetic synthetic rubber composition of the present invention are cis double bonds. The percentage of double bonds in the thiol-yne elastomer composition that are cis double bonds may be referred to herein interchangeably as "cis %" or "% cis" and conversely, the percentage of double bonds in the thiol-yne elastomer composition that are trans double bonds may be referred to herein interchangeably as "trans %" or "% trans". In one or more embodiments, the % cis is 10% or more. In other embodiments, the % cis is 20% or more, in other embodiments, 30% or more, in other embodiments, 40% or more, in other embodiments, 50% or more, in other embodiments, 60% or more, in other embodiments, 65% or more, and in other embodiments, 70% or more. In one or more embodiments, the % cis is 95% or less. In other embodiments, the % cis is 90% or less, in other embodiments, 85% or less, in other embodiments, 80% or less, in other embodiments, 75% or less, in other embodiments, 70% or less, and in other embodiments, 65% or less.

In one or more embodiments, the % trans in the thiol-yne elastomer compositions of the present invention is 5% or more. In other embodiments, the % trans is 10% or more, in other embodiments, 15% or more, in other embodiments, 20% or more, in other embodiments, 30% or more, in other embodiments, 40% or more, and in other embodiments, 50% or more. In one or more embodiments, the % trans is 95 or less. In other embodiments, the % trans is 90 or less, in other embodiments, 85% or less, in other embodiments, 80% or less, in other embodiments, 75% or less, in other embodiments, 70% or less, and in other embodiments, 60% or less.

In one or more embodiments, thiol-yne elastomer composition of the present invention may have a weight average molecular mass ($M_W$) of from 1,000 Da or more to about 1,000,000 Da or less. The weight average molecular mass ($M_W$) may be determined using any appropriate method, including without limitation, size exclusion chromatography (SEC), mass spectroscopy, light scattering, osmometry, and intrinsic viscosity. In one or more embodiments, the thiol-yne elastomer composition may have a $M_W$ of 10,000 Da or more. In some embodiments, the $M_W$ may be 50,000 Da or more. In some embodiments, the $M_W$ may be 100,000 Da or more, in some embodiments, 150,000 Da or more, in some embodiments, 200,000 Da or more, in some embodiments, 250,000 Da or more, in some embodiments, 300,000 Da or more, in some embodiments, 400,000 Da or more, and in some embodiments, 500,000 Da or more. In one or more embodiments, thiol-yne elastomer composition may have a $M_W$ of 900,000 Da or less. In some embodiments, the $M_W$ may be 800,000 Da or less. In some embodiments, the $M_W$ may be 750,000 Da or less, in some embodiments, 700,000 Da or less, in some embodiments, 650,000 Da or less, in some embodiments, 600,000 Da or less, in some embodiments, 550,000 Da or less, in some embodiments, 500,000 Da or less, and in some embodiments, 450,000 Da or less. In one or more embodiments, thiol-yne elastomer composition may have a $M_W$ of from 100,000 Da or more to 500,000 Da or less.

In one or more embodiments, thiol-yne elastomer composition of the present invention may have a molecular mass distribution ($Đ_M$), defined herein as the ratio of the weight average molecular weight ($M_w$) to the number average molecular weight ($M_n$), of from about 1.5 or more to about 8.0 or less. In some embodiments, the thiol-yne elastomer composition may have a $Đ_M$ of 1.6 or more. In some other embodiments, the thiol-yne elastomer composition may have a $Đ_M$ of 1.8 or more, in other embodiments, 1.9 or more, in other embodiments, 2.0 or more, in other embodiments, 2.1 or more, in other embodiments, 2.2 or more, in other embodiments, 2.5 or more, in other embodiments, 2.8 or more, and in other embodiments, 3.0 or more. In some embodiments, the thiol-yne elastomer composition may have a $Đ_M$ of 4.9 or less. In some other embodiments, the thiol-yne elastomer composition may have a $Đ_M$ of 4.8 or less, in other embodiments, 4.7 or less, in other embodiments, 4.6 or less, in other embodiments, 4.3 or less, in other embodiments, 4.0 or less, in other embodiments, 3.8 or less, in other embodiments, 3.6 or less, and in other embodiments, 3.4 or less. In one or more embodiments, thiol-yne elastomer composition may have a $Đ_M$, of from 1.5 or more to 5.0 or less.

In one or more embodiments, thiol-yne elastomer composition of the biomimetic synthetic rubber composition of the present invention may have a glass transition temperature ($T_g$) of from about −50° C. or more to about 10° C. or less, as measured by DSC. In some embodiments, the thiol-yne elastomer composition may have a $T_g$ of −45° C. or more. In some embodiments, the $T_g$ may be −40° C. or more, in other embodiments, −35° C. or more, in other embodiments, −30° C. or more, in other embodiments, −25° C. or more, in other embodiments, −20° C. or more, in other embodiments, −15° C. or more, and in other embodiments, −10° C. or more. In some embodiments, the thiol-yne elastomer composition may have a glass transition temperature ($T_g$) of 5° C. or less. In some embodiments, the $T_g$ may be 0° C. or less, in other embodiments, −5° C. or less, in other embodiments, −10° C. or less, in other embodiments, −15° C. or less, in other embodiments, −20° C. or less, in other embodiments, −25° C. or less, in other embodiments, −30° C. or less, and in other embodiments, −35° C. or less. In one or more embodiments, thiol-yne elastomer may have a glass transition temperature ($T_g$) of from about −16° C. or more to about 0° C. or less.

In one or more embodiments, thiol-yne elastomer composition of the biomimetic synthetic rubber composition of the present invention may have an ultimate tensile strength (UTS) of from about 1.0 MPa to about 60.0 MPa, as measured by tensiometer. As used herein, the term ultimate tensile strength (UTS) refers to is the capacity of a material or structure to withstand loads tending to elongate and may be calculated determined by tensile testing using a conventional tensiometer, such as the Instron™ 5567. As should be apparent, the UTS will be the highest point on an engineering stress/strain curve for the material sampled. In some embodiments, the thiol-yne elastomer composition of the present invention has an ultimate tensile strength (UTS) of 3 MPa or more, in other embodiments, 10 or more, in other embodiments, 15 or more, in other embodiments, 20 or more, in other embodiments, 25 or more, in other embodiments, 30 or more and, in other embodiments, 35 or more. In some embodiments, the thiol-yne elastomer composition of the present invention has an ultimate tensile strength (UTS) of 55 MPa or less, in other embodiments, 50 or less, in other embodiments, 45 or less, in other embodiments, 40 or less, in other embodiments, 35 or less, and in other embodiments, 30 or less. In some embodiments, the thiol-yne elastomer composition of the present invention may have an ultimate tensile strength (UTS) of from about 10 MPa to about 55 MPa In one or more embodiments, thiol-yne elastomer composition of the biomimetic synthetic rubber composition of the present invention may have an elastic modulus (E) of from about 1 MPa to about 90 MPa, as measured by a tensiometer. In some embodiments, the thiol-yne elastomer composition may have an elastic modulus (E) of 1.5 MPa or more. In some other embodiments, the thiol-yne elastomer composition may have an elastic modulus (E) of 5.0 MPa or more, in other embodiments, 10 MPa or more, in other embodiments, 15 MPa or more, in other embodiments, 20 MPa or more, in other embodiments, 25 MPa or more, in other embodiments, 30 MPa or more, in other embodiments, 35 MPa or more, and in other embodiments, 40 MPa or more. In some embodiments, the thiol-yne elastomer composition may have an elastic modulus (E) of 85 MPa or less. In some other embodiments, the thiol-yne elastomer composition may have an elastic modulus (E) of 80 MPa or less, in other embodiments, 75 MPa or less, in other embodiments, 70 MPa or less, in other embodiments, 65 MPa or less, in other embodiments, 60 MPa or less, in other embodiments, 55 MPa or less, in other embodiments, 50 MPa or less, and in other embodiments, 45 MPa or less. In one or more embodiments, the thiol-yne elastomer composition may have an elastic modulus (E) of from 1.5 MPa or more to about 52 MPa or less.

In one or more embodiments, the thiol-yne elastomer composition of the biomimetic synthetic rubber composition of the present invention may have an elongation at break ($\varepsilon_{break}$) of from 50% or more to 3000% or less as measured by tensile strength testing. In some embodiments, the thiol-yne elastomer composition may have an elongation at break ($\varepsilon_{break}$) of 100% or more. In some of embodiments, the thiol-yne elastomer composition may have an elongation at break ($\varepsilon_{break}$) of 300% or more, in other embodiments, 600% or more, in other embodiments, 900% or more, in other embodiments, 1200% or more, in other embodiments, 1500% or more, in other embodiments, 1800% or more, in other embodiments, 2100% or more, and in other embodiments, 2400% or more. In some embodiments, the thiol-yne elastomer composition may have an elongation at break ($\varepsilon_{break}$) of 2800% or less. In some of embodiments, the thiol-yne elastomer composition may have an elongation at break ($\varepsilon_{break}$) of 2500% or less, in other embodiments, 2200% or less, in other embodiments, 2000% or less, in other embodiments, 1800% or less, in other embodiments, 1500% or less, in other embodiments, 1200% or less, in other embodiments, 900% or less, and in other embodiments, 600% or less. In one or more embodiments, the thiol-yne elastomer composition may have an elongation at break ($\varepsilon_{break}$) of from 1000% or more to 3000% or less.

In one or more embodiments, the thiol-yne elastomer composition of the biomimetic synthetic rubber composition of the present invention may have the formula:

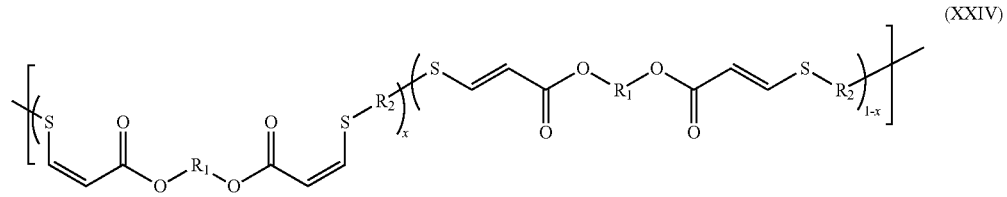

(XXIV)

wherein $R_1$ is an alkyl, alkylene, ethoxy, or aryl group, $R_2$ is an alkyl or aryl group, and x is a mole fraction. In one or more embodiments, the thiol-yne elastomer composition of the biomimetic synthetic rubber composition of the present invention may have the formula:

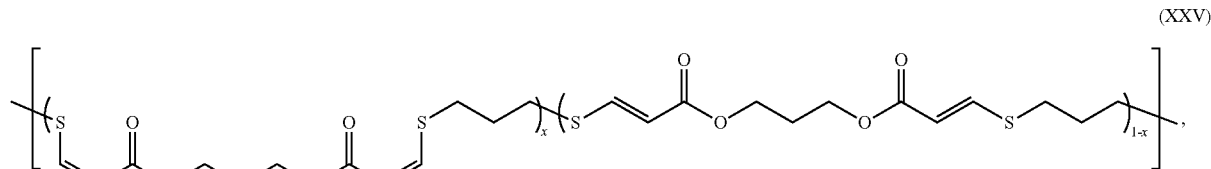

(XXV)

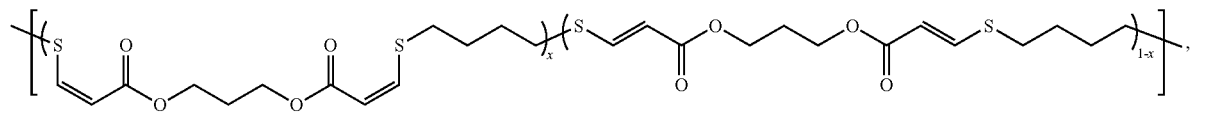

(XXVI)

-continued

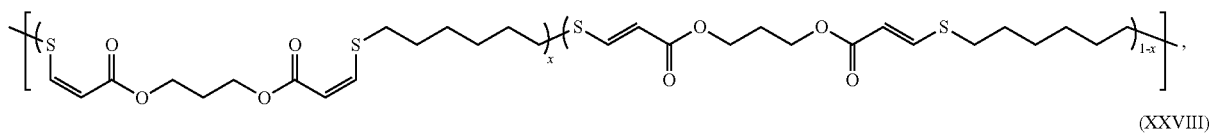
(XXVII)

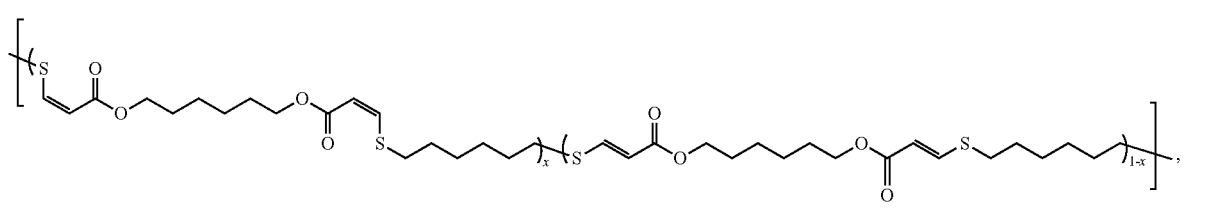
(XXVIII)

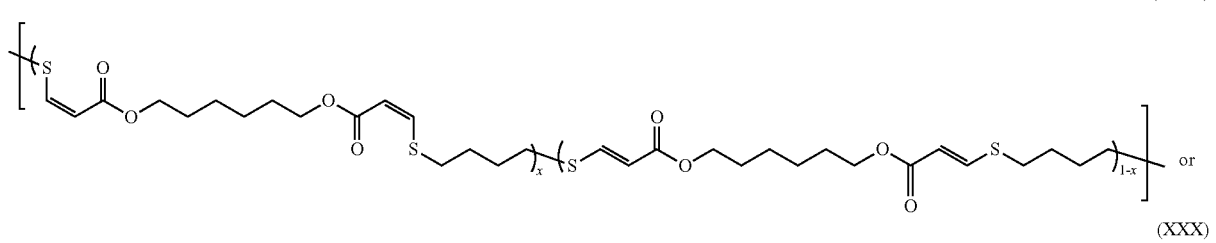
(XXIX)

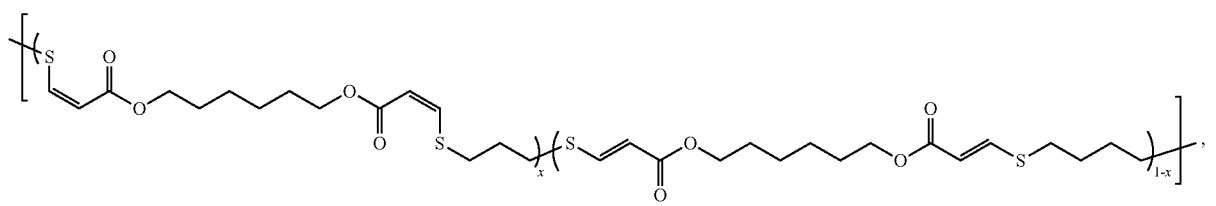
(XXX)

wherein x is a mole fraction.

In one or more embodiments, the thiol-yne elastomer of the present invention may have added to it one or more functional end groups. In one or more embodiments, these functional groups may include, without limitation, alkyne, alkene, hydroxyl, carboxylic acid, fluoro, trifluoro, perfluoro, or combinations thereof.

In one or more embodiments, the thiol-yne elastomer composition of the present invention may have the formula:

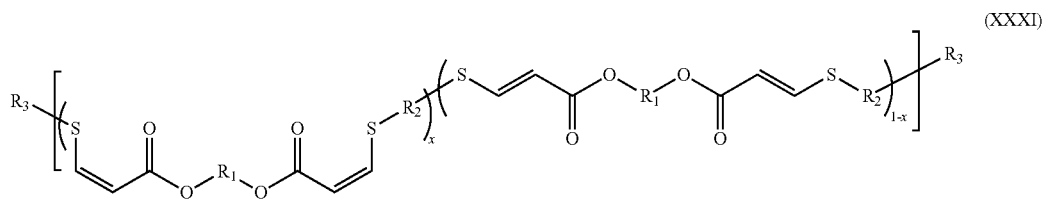
(XXXI)

wherein $R_1$ is an alkyl, alkylene, ethoxy, or aryl group; $R_2$ is an alkyl or aryl group, each $R_3$ is an alkyne, alkene, hydroxyl, carboxylic acid, fluoro, trifluoro, perfluoro or combination thereof; and x is a mole fraction.

In one or more embodiments, the thiol-yne elastomer composition of the biomimetic synthetic rubber composition of the present invention may have the formula:

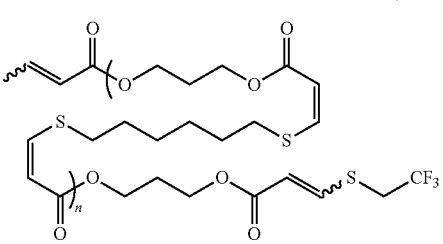
(XXXIII)

wherein n is an integer from about 10 to about 1000.

Moreover, for one or more embodiments of the present invention, it has been found that in addition to chain-end modification, simple variation of the monomer structure of the dialkyne or multi-functional thiol monomers enables not only access to varied mechanical properties, as set forth below, but also provides materials with different physical properties. Materials with longer alkyl chains between ester units (introduced through either dialkyne or multi-functional thiol monomers), for example, typically resulted in materials with increased strength and an increased % cis. (See Table 6, below)

Further, in some embodiments, it has been found that changes in physical properties may be introduced in these materials through the incorporation of functional dithiols such as including 2,2'-(ethylenedioxy)diethanethiol and 1,4-dithio-D-threitol, after polymer chain formation. It has been found for some embodiments that even a 10% incorporation of these co-monomers, the polar component of the Young's-Laplace equation is significantly reduced, while the mechanical properties were largely retained (See Tables 6 and 7). It is believed that these effects will be significant when dispersing polar fillers.

In some other embodiments, the the thiol-yne elastomers of the present invention can be cured by reaction with a radical curing agent, such as dicumyl peroxide, followed by heating, to produce a crosslinked elastomer material having improved elastic properties. In one or more embodiments, the cured thiol-yne elastomers of the present invention can be subjected to repeated load-unload cycles of up to 500% extension with the materials recovering to 150% of the original dimensions.

In some other embodiments, multifunctional primary or secondary aliphatic amines monomers may be used in place of the multi-functional thiol monomers described above to produce the corresponding amine-yne elastomer comprising the residue of its component multi-functional yne and multi-functional primary or secondary aliphatic amine monomers. These monomers may also have both thiol and amine functional groups. In various embodiments, these amine-yne elastomer may have a weight average molecular weight of from about 3,000 Da to about 100,000 Da.

In a second aspect, the various embodiments of the present invention are directed to methods of making the thiol-yne polymer compositions described above. In one or more embodiment, the method begins with selecting and obtaining a suitable multi-functional alkyne monomer and multi-functional thiol monomer. The multi-functional alkyne monomer may include any of the multi-functional alkyne monomers described above. In one or more embodiments, the multi-functional alkyne monomer may be a dialkyne having the formula:

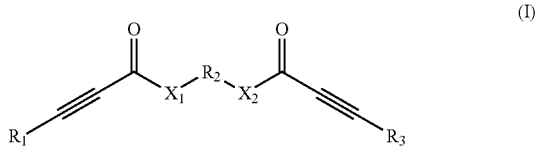
(I)

wherein $R_1$, and $R_3$ are H, alkyl or aryl groups; $R_2$ is an alkyl, alkylene, ethoxy, or aryl group; and X is an O, C, NH, or S group. In one or more other embodiments, the multi-functional alkyne monomer may a dialkyne having the formula:

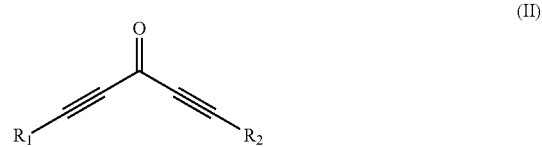
(II)

wherein $R_1$ and $R_2$ are each H, alkyl or aryl groups.

As set forth above, the multi-functional alkyne monomer is then reacted with a multi-functional thiol monomer, to form the thiol-yne elastomer materials according to various embodiments of the present invention. The multi-functional thiol monomer may include any of the multi-functional thiol monomer molecules described above with respect to the thio-yne elastomer material. As set forth above, in one or more embodiments, the multi-functional thiol monomer may be a linear dithiol, a branched trithiol, or a branched tetra-thiol, but is preferably a linear dithiol. In various embodiments, the multi-functional thiol monomer will comprise two, three, or four thiol functional groups separated by any linear or branched $C_2$-$C_{30}$ molecule. In these embodiments, it has been found that the aliphatic chain length of the multi-functional thiol monomer molecules has an effect on cis/trans ratio of the resulting polymer. A longer aliphatic spacer between the thiols will provide a polymer having a higher percentage of cis double bonds. In addition, it has been found that with very short aliphatic spacers (e.g. ethanedithiol and/or propanedithiol) the volatility (and resulting loss of dithiol monomer during the reaction) of these monomers may be significant enough to cause problems with monomer ratio, causing the molecular weights of the resulting polymers to vary between batches and with scale-up.

It has likewise been found that electron withdrawn thiols are generally less reactive than thiols on the opposite side of an ester, as shown below:

While not wanting to be bound by theory, it is believed that electron withdrawn thiols require significantly more catalyst to form the polymer, leading to base degradation.

Suitable multi-functional thiol monomer monomer are commercially available from a variety of sources. They may also be synthesized by any method known in the art for that purpose, including but not limited to the method described in the Experimental and Example section below.

In one or more embodiments, the multi-functional thiol monomer may have the formula:

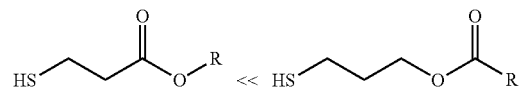
(III)

wherein R is an alkyl or aryl group and $X_1$ and $X_2$ are an SH group.

Once a suitable multi-functional alkyne monomer and a suitable multi-functional thiol monomer have been selected and obtained, they are combined with a suitable solvent or solvent combination in an appropriate vessel at a temperature of from about −20° C. to about 40° C. As will be appreciated, an exact stoichiometric relationship in the amounts of the multi-functional alkyne monomer and multi-functional thiol monomer used will produce the thiol-yne polymers having the largest theoretical weight average molecular weight for the starting monomers used. The theoretical maximum $M_w$ for a thiol-yne polymer made from a dialkyne monomer and a dithiol monomer, for example, would be occur at a molar ratio of 1:1. Conversely, an excess of either monomer will result in unreacted alkyne or thiol end groups, depending upon which monomer is in excess, and a reduced $M_w$.

As will be appreciated by those of skill in the art, aliphatic thiols are very reactive and are exothermic upon addition of the catalyst. To address this, the temperature of the reaction vessel is reduced to control the rate of the reaction. In one or more embodiments of the inventive method, the temperature of the reaction vessel may be −20° C. or more, in other embodiments, −18° C. or more, in other embodiments, −15° C. or more, in other embodiments, −10° C. or more, in other embodiments, −5° C. or more, and in other embodiments, 0° C. or more. In one or more embodiments, the temperature may be 32° C. or less, in other embodiments, 30° C. or less, in other embodiments, 25° C. or less, in other embodiments, 20° C. or less, in other embodiments, 15° C. or less, and in other embodiments, 10° C. or less.

Any suitable solvent, such as chloroform, or combination of solvents such as chloroform and DMF, may be used to dissolve the particular multi-functional alkyne monomer and multi-functional thiol monomer being used. As used herein, the term "suitable solvent" refers to a liquid material capable of dissolving a desired amount of a solid substance or combination of substances at a desired set of reaction conditions such as temperature and pressure, which, unless otherwise specified, are assumed to be ambient temperature and pressure. Similarly, as used herein, the term "suitable solvent combination" refers to two or more liquids that are miscible in each other and capable of dissolving a desired solid substance or combination of substances to form a single solution at a desired set of reaction conditions, such as temperature and pressure, which, unless otherwise specified, are assumed to be ambient temperature and pressure. One of ordinary skill in the art will be able to select suitable solvents or solvent combinations for the particular multi-functional alkyne monomer and multi-functional thiol monomer being used, without undue experimentation. Likewise the selection of a suitable vessel is well within the capabilities of one of ordinary skill in the art.

The suitable solvents selected will, of course, depend upon the particular multi-functional alkyne monomer and multi-functional thiol monomer being used. Suitable solvents for the multi-functional alkyne monomer may include without limitation, chloroform ($CHCl_3$), N,N-dimethylformamide (DMF), dioxane, methylene chloride ($CH_2Cl_2$), N-methylpyrolidone (NMP), and combinations thereof. Suitable solvents for the multi-functional thiol monomer may include without limitation, chloroform ($CHCl_3$), N,N-dimethylformamide (DMF), dioxane, methylene chloride ($CH_2Cl_2$), N-methylpyrolidone (NMP), and combinations thereof. Solvents and/or solvent combinations for both multi-functional alkyne monomer and multi-functional thiol monomer may include chloroform ($CHCl_3$), N,N-dimethylformamide (DMF), dioxane, methylene chloride ($CH_2Cl_2$), N-methylpyrolidone (NMP).

In some embodiments, chloroform ($CHCl_3$) was used as the reaction solvent, dissolving both the multi-functional alkyne monomer and multi-functional thiol monomer being used.

As set forth above, it has been found that the ratio cis double bonds to trans double bonds in the resulting thiol-yne elastomer composition of the biomimetic synthetic rubber compositions of the present invention may be tuned by changing the polarity of the reaction solvent or solvent combination used to dissolve the multi-functional alkyne monomer and multi-functional thiol monomer being used, without altering the molecular weight of the polymer formed. In general, it has been found that in embodiments where a more polar solvent is used a thiol-yne elastomer composition having a higher ratio of cis double bonds to trans double bonds is produced and conversely, in embodiments wherein a less polar solvent is used, the resulting thiol-yne elastomer compositions had a lower ratio of cis double bonds to trans double bonds. In this manner, it has been found, for example, that thiol-yne elastomer materials can be synthesized from dialkyne and dithiol monomers with cis-trans double bond ratios that can be tuned between 80% cis and 78% trans based on the polarity of the reaction solvent.

In one or more embodiments, the polarity of the reaction solvent (the solvent or solvent combination that dissolves the multi-functional alkyne monomer and multi-functional thiol monomer may be controlled by using a solvent combination containing two or more co-solvents for the multi-functional alkyne monomer and multi-functional thiol monomer having differing polarities and then controlling the ratio of those solvents to obtain the desired polarity. In some embodiments, the solvent combination used may include both polar and non-polar solvents. Suitable polar/non-polar solvent combinations may include, without limitation, chloroform ($CHCl_3$) and N,N-dimethylformamide (DMF), chloroform and N-methylpyrolidone (NMP). It has been found, for example, that by varying the ratio of $CHCl_3$ to DMF used as the reaction solvent, is it possible to vary the cis/trans ratio of the resulting polymer without affecting its molecular weight. That is, a higher percentage of $CHCl_3$ in the reaction solvent combination will give polymer having a lower % cis and a higher percentage of DMF in the reaction solvent combination will give a polymer having approximately the same molecular weight and a higher % cis using the same base catalyst.

In one or more embodiments, the reaction solvent or solvent combination may have a relative polarity of the may be from about 0.2 or more to about 0.4 or less. The values for relative polarity are normalized from measurements of solvent shifts of absorption spectra and were extracted from Christian Reichardt (*Solvents and Solvent Effects in Organic Chemistry*, Wiley-VCH Publishers, 3rd ed., 2003), the disclosure of which is incorporated herein by reference. DMF, for example, has a relative polarity of 0.386 and $CHCl_3$, has a relative polarity of 0.259.

Once the monomers have been dissolved as set forth above, a suitable base catalyst is added and the temperature of the solution is allowed to reach ambient temperature (approximately 20° C.). As set forth above, aliphatic thiols are very reactive and are exothermic upon addition of the catalyst. Suitable base catalysts, may include, without limitation 1,8-diazabicycloundecene (DBU), triazabicyclodecene (TBD), triethylamine ($Et_3N$), tetramethyl guanidine (TMG), benzotriazole, dimethylphenylphosphine (DMPP), and combinations thereof. It has been found that TBD and DBU are stronger catalysts (reaction complete within 1 hour) than $Et_3N$ (reaction complete within 16 hours).

In one or more embodiments, the solution is then stirred or otherwise agitated, for a period of from about 0.5 hours or more to about 10 hours or less. In some embodiments, the solution is then stirred for a period of 1 hour or more. In other embodiments, it may be stirred for a period of 1.5 hours or more, in other embodiments, 2.0 hours or more, in other embodiments, 2.5 hours or more, in other embodiments, 3.0 hours or more, in other embodiments, 3.5 hours or more, in other embodiments, 4.0 hours or more, and in other embodiments, 5.0 hours or more. In some embodiments, the solution is then stirred for a period of 9.5 hours or less. In other embodiments, it may be stirred for a period of 9.0 hours or less, in other embodiments, 8.5 hours or less, in other embodiments, 8.0 hours or less, in other embodiments, 7.5 hours or less, in other embodiments, 7.0 hours or less, in other embodiments, 6.0 hours or less, and in other embodiments, 5.0 hours or less.

Next, the solution is diluted with additional solvent and a radical inhibitor may is added to prevent undesired radical reactions. Suitable radical inhibitors may include 2,6-di-tert-butyl-4-methylphenol (BHT). The mixture is then precipitated into a polar solvent such as diethyl ether to produce a thiol-yne elastomer according to one or more embodiments of the present invention, as described above. The thiol-yne elastomer so produced may then be collected, cleaned, and purified by any conventional means.

Further, the methods according to various embodiments of the present invention may be used to synthesize thiol-yne elastomers having controllable and definable end groups that can be selectively modified and may be critical to dispersing and grafting fillers within the elastomer network. Specifically, use of a slight excess of multi-functional alkyne monomer results in alkyne chain ends that can be further modified by a simple nucleophilic addition. And, in some embodiments, the method of the present invention further comprises the addition of thiol functionalized end groups to the thiol-yne elastomer composition described above. Any reactive group that can be functionalized with a thiol group may be added (e.g., an alkene or alkyne) to the thiol-yne elastomer composition described above. In various embodiments, these end groups may comprise 2,2,2-thrifluoroethanethiol, and $C_2$-$C_{20}$ linear or branched thiol and combinations thereof. As will be apparent to those of skill in the art, these thiol functionalized end groups are added to the terminal alkyne groups of said thiol-yne elastomer composition by means of a thiol-alkyne click reaction. These end groups may be added directly after the polymerisation reaction or in a subsequent post-polymerisation step.

In one or more embodiments, the thiol functionalized end groups may be added directly after the polymerisation reaction. In these embodiments, the thiol-yne elastomer is formed in an excess of multi-functional alkyne monomer, and one or more thiol functionalized end groups are added to the solution after the radical initiator is added but before the thiol-yne elastomer is precipitated out of solution. In these embodiments, there should be more than a 1:1 molar relationship between the multi-functional alkyne monomer and the multi-functional thiol monomer, to provide unreacted alkyne end groups to react with the thiol end groups of the reactive group being added to the polymer.

In some other embodiments, the thiol functionalized end groups may be added to the thiol-yne elastomer material in a subsequent post-polymerisation step. In these embodiments, the thiol-yne elastomer material formed as set forth above, is re-dissolved in a suitable solvent. The thiol functionalized end group is then added, and the solution stirred to permit the thiol functionalized end group to dissolve therein. As will be apparent to those of skill in the art, both the thiol-yne elastomer material and the thiol functionalized end groups should be miscible in the selected solvent at the relevant concentrations. As will be apparent, the particular solvent chosen will depend on the molecular weight of the thiol-yne elastomer material and the characteristics of the particular thiol functionalized end group being used. In one or more embodiments, suitable solvents may include, without limitation, chloroform ($CHCl_3$), N,N-dimethylformamide (DMF), dioxane, methylene chloride ($CH_2Cl_2$), N-methylpyrolidone (NMP), and combinations thereof.

Next, a suitable base catalyst is added and the solution stirred for from about 10 hours to about 24 hours. In one or more embodiment, the base catalyst may be $Et_3N$.

Finally, the mixture is precipitated into a non-solvent for the thiol-yne polymer, which in some embodiments may be a polar solvent such as diethyl ether, to produce a thiol-yne elastomer material having the added end groups, as described above. The thiol-yne elastomer material having the added end groups may then be collected, cleaned, and purified by any conventional means.

In addition, in one or more embodiments, the method of the present invention further includes curing the thiol-yne elastomers of the present invention using a radical curing agent. In these embodiments, the thiol-yne elastomer is dissolved in a suitable solvent. Suitable solvents may include, without limitation, chloroform, DMF, chloroform/DMF mixtures, N-methylpyrolidone (NMP), and $CH_2Cl_2$. One or ordinary skill in the art will be able to select a suitable solvent without undue experimentation.

Next, a radical curing agent is added to the thiol-yne elastomer solution and the solution stirred until the materials are fully dissolved, usually for a period of from about 0.5 hours to about 10 hours, before being dried in vacuo. The particular radical curing agent used is not particularly limited and any suitable radical curing agent may be used, including, but not limited to dicumyl peroxide. One or ordinary skill in the art will be able to selected a suitable radical initiator, without undue experimentation. In one or more embodiments, the radical initiator is dicumyl peroxide. In some embodiments, the solution may be stirred. And while the resulting solution is preferably dried in vacuo, the invention is not to be so limited and other suitable methods for drying known in the art may be used without departing from the spirit of the present invention. In one or more embodiment, the thiol-yne elastomer may be cured for about 15 minutes or more. In one or more embodiments, the thiol-yne elastomer was cured at a temperature of about 160° C. for about 15 minutes.

It is believed that the combination of the outstanding properties of natural rubber with the tunability of the material properties of these synthetic materials via monomer selection and end group modification will revolutionise the rational design of elastomers across the wide range of application areas in which they are applied, as well as promising to open up new opportunities to custom design advanced materials with tailor made properties for a range of cutting edge applications such as in biomedicine and sensors.

In addition, as set forth above, in some other embodiments multifunctional primary or secondary aliphatic amines monomers are used in place of the multi-functional thiol monomers described above to produce the corresponding amine-yne elastomer. It should be appreciated that these may be formed using the method described above with respect to the thiol-yne elastomers, with the following modifications. Because they are more highly reactive, the multi-functional primary amine monomers react exothermically upon mixing and to not require the use of a catalyst. These elastomers tend to have a lower molecular weight ($M_w$=3000 Da to 100,000 Da), but may cross link upon sitting. These elastomers are also less soluble and require the addition of $HN_4BF_4$ to the DMF or DMSO to solubilize them. The multi-functional secondary amine monomers are not as reactive as the multi-functional primary amine monomers and require the use of a catalyst such as DBU. Unlike the elastomers made with the primary amines, these elastomers are soluble in DMF.

EXPERIMENTAL EXAMPLES

The following experiments and examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

A. Synthetic Procedures

1. Reagents

The following chemicals were used as received: acetonitrile (MeCN: Sigma-Aldrich, >99.5%), 1,4-butanediol (Sigma-Aldrich, 99%), chloroform ($CHCl_3$: VWR Chemicals, 99%), d-chloroform ($CDCl_3$: Apollo, >99%), 1,8-diazabicyclo[5.4.0]undec-7-ene (DBU: Sigma-Aldrich, 98%), diethyl ether ($Et_2O$: Sigma-Aldrich, 99.8%), N,N-dimethylformamide (DMF: Fisher Scientific, LR grade), 2,6-di-tert-butyl-4-methylphenol (BHT: Alfa Aesar, 99%), ethyl acetate (EtOAc: Fisher Scientific, LR grade), hexane (VWR Chemicals, 99%), 1,6-hexanediol (Sigma-Aldrich, 99%), magnesium sulfate ($MgSO_4$: anhydrous, Fisher Scientific, LR grade), 1,3-propanediol (Sigma-Aldrich, 98%), propiolic acid (Acros Organics, 98%), silica gel ($SiO_2$: Apollo Scientific, 40-63 micron), sodium chloride (NaCl: Fisher Scientific, >99%), sodium hydrogen carbonate ($NaHCO_3$: Fisher Scientific, >99%), sulfuric acid (Fisher Scientific, >95%), triethylamine ($Et_3N$: Fisher Scientific, LR grade), trifluoroacetic acid ($CF_3COOH$: Sigma-Aldrich, 99%).

The following chemicals were vacuum distilled prior to use and stored in Young's tapped ampoules under $N_2$: 1,4-butanedithiol (Sigma-Aldrich, 97%), 1,10-decanedithiol (Alfa Aesar, 95%), 2,2'-(ethylenedioxy)diethanethiol (DEGDT: Sigma-Aldrich, 95%), 1,6-hexanedithiol (Sigma-Aldrich, 97%), 1,8-octanedithiol (Alfa Aesar, 98%), 1,3-propanedithiol (Sigma-Aldrich, 99%), 2,2,2-trifluoroethanethiol (Sigma-Aldrich, 95%). 1,4-dithio-D-threitol (DTT: Sigma-Aldrich, ≥98%) was purified by sublimation under high vacuum prior to use and stored at −20° C.

2. Synthesis of Propane-1,3-diyldipropiolate (IV)

Propane-1,3-diyl dipropiolate (IV) was prepared according to Scheme 1 below:

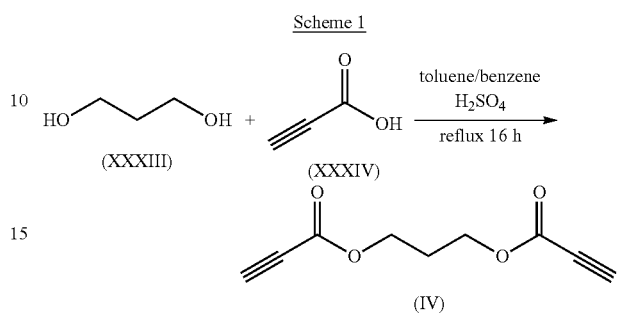

Scheme 1

1,3-Propanediol (20 g, 0.263 mol) was added to a 1 L single neck round bottom flask. To this was added toluene (100 mL) and benzene (100 mL). Two drops of $H_2SO_4$ were added and the solution was allowed to stir at room temperature for 5 min before adding propiolic acid (50 g, 0.714 mol). A Dean-Stark apparatus with condenser was fitted and the reaction was then refluxed for 16 h at 120° C. or until the required amount of water was collected. The solution was then cooled to room temperature and solvent extracted with saturated $NaHCO_3$ solution (2×200 mL) to remove any residual acids. The organic phase was then collected, dried over $MgSO_4$, filtered and reduced in volume to dryness. The product was then purified on silica gel isocratically using 4:1 hexane/EtOAc and collecting the $1^{st}$ fraction. After removal of the solvent, the final product was further purified by distillation under high vacuum at 160° C. to yield colourless oil that slightly crystallised on sitting (24.63 g, 52% yield). $R_f$ (3:2 Hex/EtOAc)=0.43. Melting point: 25° C. $^1H$ NMR (500 MHz, $CDCl_3$) δ 4.30 (t, $^3J_{HH}$=6.2 Hz, 4H), 2.88 (s, 2H), 2.19-1.96 (m, 2H). $^{13}C$ NMR (125 MHz, $CDCl_3$) δ 152.6, 75.3, 74.5, 62.6, 27.5. ESI-MS Calcd for $C_9H_8O_4Na$ (M+Na): 203.03, Found: 203.0. Analysis Calculated for $C_9H_8O_4$: C, 60.00; H, 4.48%. Found: C, 59.70; H, 4.41%.

3. Synthesis of Butane-1,4-diyl dipropiolate (VII)

3. Butane-1,4-diyl dipropiolate (VII) was prepared according to Scheme 2 below:

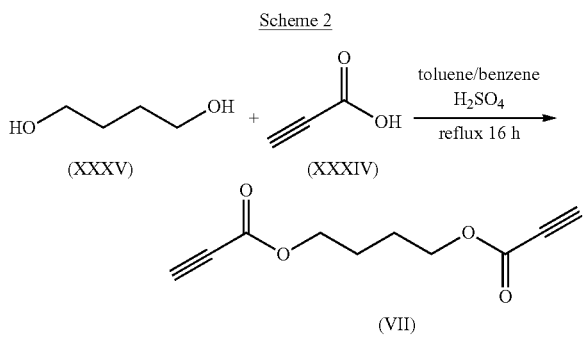

Scheme 2

Synthetic procedure was identical to section A2, above. The final product was further purified by sublimation under high vacuum at 50° C. to yield clear/white crystals (26.88 g, 83% yield). $R_f$ (3:2 Hex/EtOAc)=0.44. Melting point: 50° C.

¹H NMR (500 MHz, CDCl₃) δ 4.23 (t, $^3J_{HH}$=6.5 Hz, 4H), 2.89 (s, 2H), 1.90-1.67 (m, 4H). ¹³C NMR (125 MHz, CDCl₃) δ 152.8, 75.0, 74.7, 65.6, 25.0. ESI-MS Calcd for $C_{10}H_{10}O_4Na$ (M+Na): 217.05, Found: 216.9. Analysis Calculated for $C_{10}H_{10}O_4$: C, 61.85; H, 5.19%. Found: C, 61.89; H, 5.13%.

4. Hexane-1,6-diyldipropiolate (VII)

Hexane-1,6-diyl dipropiolate (VII) was prepared according to Scheme 3 below:

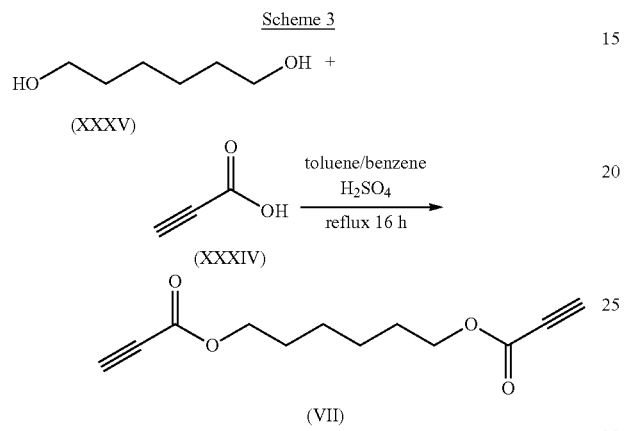

Scheme 3

Synthetic procedure was identical to section A2, above. The final product was further purified by recrystallization onto a cold finger under high vacuum at 75° C. to yield clear/white crystals (13.58 g, 48% yield). $R_f$ (3:2 Hex/EtOAc)=0.49. Melting point: 53° C. ¹H NMR (CDCl₃, 500 MHz) δ 4.19 (t, $^3J_{HH}$=6.6 Hz, 4H), 2.88 (s, 2H), 1.76-1.62 (m, 4H), 1.48-1.34 (m, 4H). ¹³C NMR (125 MHz, CDCl₃) δ 152.9, 74.8, 74.7, 66.3, 28.3, 25.5. ESI-MS Calcd for $C_{10}H_{10}O_4Na$ (M+Na): 245.08, Found: 244.9. Anal Calcd for $C_{12}H_{14}O_4$: C, 64.85; H, 6.35%. Found: C, 64.68; H, 6.32%.

5. Synthesis of propane-1,3-diyl(2E,2'E)-bis(3-(butylthio)acrylate) (XXXVII)

Propane-1,3-diyl (2E,2'E)-bis(3-(butylthio)acrylate) (XXXVII) was prepared according to Scheme 4 below:

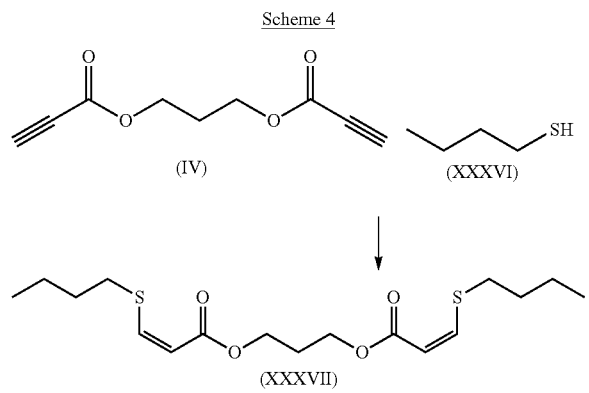

Scheme 4

Propane-1,3-diyl dipropiolate (213 mg, 1.2 mmol) in CHCl₃ (2 mL) was added drop-wise to a solution of 1-butanethiol (257 μL, 2.4 mmol) and Et₃N (1.7 μL, 0.012 mmol) in CHCl₃ (4 mL) at 0° C. with stirring. After full addition the solution was then allowed to stir at ambient temperature for 120 min, after which the solution was solvent extracted with 1M HCl (2×20 mL) and saturated NaCl solution (20 mL). The organic phase was dried over MgSO₄, filtered and taken to dryness to yield a colourless oily product (358 mg, 84% yield). $R_f$ (3:2 Hex/EtOAc)=0.53. ¹H NMR (500 MHz, CDCl₃) δ 7.69 (d, $^3J_{HH}$=15.1 Hz, 1H), 5.72 (d, $^3J_{HH}$=15.1 Hz, 1H), 4.22 (t, $^3J_{HH}$=6.3 Hz, 2H), 2.79 (t, $^3J_{HH}$=7.4 Hz, 2H), 2.08-1.96 (m, 2H), 1.72-1.62 (m, 4H), 1.51-1.37 (m, 4H), 0.94 (t, $^3J_{HH}$=7.4 Hz, 6H). ¹³C NMR (125 MHz, CDCl₃) δ 165.4, 147.6, 113.3, 61.1, 31.8, 30.7, 28.3, 22.1, 13.7. ESI-MS Calcd for $C_{17}H_{28}O_4S_2Na^+$ (M-Na⁺): 383.13, Found: 383.1. Anal Calcd for $C_{17}H_{28}O_4S_2$: C, 56.64; H, 7.83%. Found: C, 56.65; H, 7.90%.

6. Synthesis of propane-1,3-diyl(2Z,2'Z)-bis(3-(butylthio)acrylate) (XXXVIII)

Propane-1,3-diyl (2Z,2'Z)-bis(3-(butylthio)acrylate) (XXXVIII) was prepared according to Scheme 5 below:

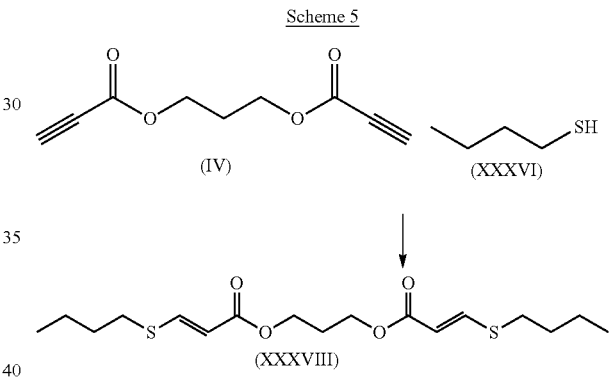

Scheme 5

Propane-1,3-diyl dipropiolate (216 mg, 1.2 mmol) in MeCN (2 mL) was added drop-wise to a solution of 1-butanethiol (257 μL, 2.4 mmol) and DBU (1.8 μL, 0.012 mmol) in MeCN (4 mL) at 0° C. with stirring. After full addition the solution was then allowed to stir at ambient temperature for 30 min, after which the MeCN was evaporated in vacuo. The resultant solid was recrystallized from hexane 2 times to yield the product as white crystals (242 mg, 56% yield). $R_f$ (3:2 Hex/EtOAc)=0.53. Melting point: 51° C. ¹H NMR (500 MHz, CDCl₃) ¹H NMR (500 MHz, CDCl₃) δ 7.09 (d, $^3J_{HH}$=10.2 Hz, 1H), 5.82 (d, $^3J_{HH}$=10.2 Hz, 1H), 4.24 (t, $^3J_{HH}$=6.3 Hz, 2H), 2.75 (t, $^3J_{HH}$=7.4 Hz, 2H), 2.11-1.92 (m, 2H), 1.73-1.54 (m, 4H), 1.52-1.31 (m, 4H), 0.92 (t, $^3J_{HH}$=7.4 Hz, 6H). ¹³C NMR (125 MHz, CDCl₃) δ166.7, 150.9, 112.8, 60.9, 35.9, 32.5, 28.2, 21.7, 13.7. ESI-MS Calcd for $C_{17}H_{28}O_4S_2Na^+$ (M-Na⁺): 383.13, Found: 383.1. Anal Calcd for $C_{17}H_{28}O_4S_2$: C, 56.64; H, 7.83%. Found: C, 56.68; H, 7.89%.

7. Synthesis of propane-1,3-diyl bis(3-((2,2,2-trifluoroethyl)thio)acrylate) (XL/XLI)

Propane-1,3-diyl bis(3-((2,2,2-trifluoroethyl)thio)acrylate) (XL/XLI) was prepared according to Scheme 6 below:

Scheme 6

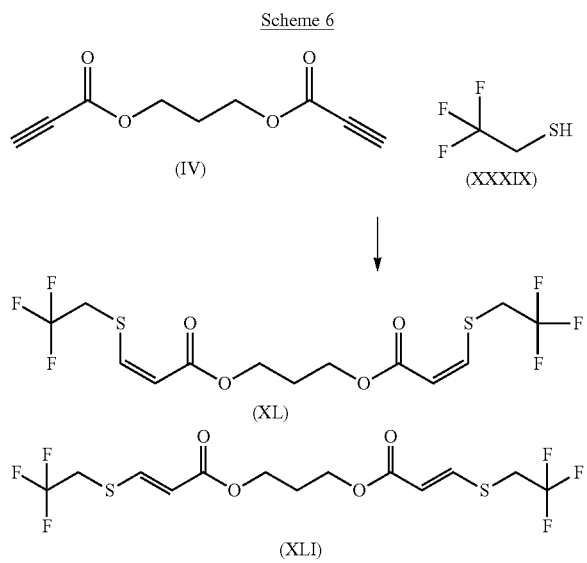

Propane-1,3-diyl dipropiolate (215 mg, 1.2 mmol) in CHCl$_3$ (2 mL) was added drop-wise to a solution of 2,2,2-trifluoroethanethiol (214 μL, 2.4 mmol) and Et$_3$N (1.7 μL, 0.012 mmol) in CHCl$_3$ (4 mL) at 0° C. with stirring. After full addition the solution was then allowed to stir at ambient temperature for 120 min, after which the solution was solvent extracted with 1 M HCl (2×20 mL) and saturated NaCl solution (20 mL). The organic phase was dried over MgSO$_4$, filtered and taken to dryness to yield a colourless oily product that crystallised on standing. The solid was recrystallized twice from hexanes/EtOAc (19:1) to yield white crystals (472 mg, 96% yield). R$_f$ (3:2 Hex/EtOAc)=0.38. Melting points: −40, 58 and 79° C. (mixture of 3 isomers E,E', E,Z', and Z,Z'). $^1$H NMR (500 MHz, CDCl$_3$) δ 7.56 (d, $^3J_{HH}$=15.3 Hz, 1H), 7.02 (d, $^3J_{HH}$=8.0 Hz, 1H), 5.94 (dd, $^3J_{HH}$=12.6 Hz, $^2J_{HH}$=9.7 Hz, 2H), 4.42-4.07 (m, 4H), 3.52-3.14 (m, 4H), 2.19-1.88 (m, 2H). $^{13}$C NMR (125 MHz, CDCl$_3$) δ 166.4, 164.6, 147.8, 147.8, 144.3, 144.2, 128.4, 128.1, 126.2, 125.9, 124.0, 123.7, 121.8, 121.5, 116.75, 116.7, 115.2, 115.1, 61.4, 61.3, 61.3, 38.4, 38.1, 37.85, 37.6, 35.5, 35.3, 35.0, 34.7, 28.1, 28.1, 28.1. $^{19}$F NMR (376 MHz, CDCl$_3$+0.01% v/v CF$_3$COOH) δ 9.44, 9.08, 0.00 (CF$_3$COOH). ESI-MS Calcd for C$_{13}$H$_{14}$F$_6$O$_4$S$_2$Na$^+$ (M-Na$^+$): 435.01, Found: 435.0. Analysis Calculated for C$_{13}$H$_{14}$F$_6$O$_4$S$_2$: C, 37.87; H, 3.42%. Found: C, 37.83; H, 3.31%.

8. General Procedure for thiol-yne Step Growth Polymerization

An example of the thiol-yne step growth polymerization is as follows: 1,3-propanedithiol (3.24 g, 2.99×10$^{-2}$ mol) was added to a 100 mL round bottom flask. To this propane-1,3-diyl dipropiolate (5.40 g, 3.00×10$^{-2}$ mol) was added by quantitative transfer with CHCl$_3$ (60 mL). The solution was then cooled to −15° C. with stirring for 15 min before DBU (45 μL, 3.00×10$^{-4}$ mol) was added in one portion. The addition of DBU produced an exothermic reaction, causing the solvent to bubble. After 2 min of stirring, the reaction was then allowed to warm to room temperature and continued to stir, during which time the solution became very viscous. After 1 h the solution was diluted with CHCl$_3$ (40 mL) and BHT (0.5 g, mol) was added. The polymer solution was then precipitated into diethyl ether (1000 mL) and collected by decanting the supernatant. The polymer was then redissolved in CHCl$_3$ (100 mL) and reprecipitated into diethyl ether (1000 mL), collected by decanting the supernatant, and dried in vacuo at room temperature for 24 h. SEC (CHCl$_3$+0.5% Et$_3$N) M$_n$=29.4 kDa, M$_w$=151.3 kDa, M$_p$=155.3 kDa, Đ$_M$=5.14. $^1$H NMR (CDCl$_3$, 400 MHz) % cis=75%.

9. Variation of Molecular Weight

The molecular weight of the thiol-yne step growth polymers was varied by changing the amount of dithiol in relation to the dialkyne such that the dialkyne was always in excess. Monomer ratios were determined using the extended Carothers equation for one monomer in excess (assuming p→100%). See, B. M. Mandal, *Fundamentals of Polymerization*, [47-51] (World Scientific Publishing Co., Singapore, 2013), the disclosure of which is incorporated herein by reference.

10. Variation of % cis

The % cis in each thiol-yne step growth polymer was tuned based on solvent polarity and base. It is known that low and high % cis can be achieved by changing the base from Et$_3$N to DBU while maintaining the solvent (CDCl$_3$). See Truong, V. X. & Dove, A. P. Organocatalytic, Regioselective Nucleophilic "Click" Addition of Thiols to Propiolic Acid Esters for Polymer-Polymer Coupling. *Angew. Chem. Int. Ed.* 52, 4132-4136 (2013), the disclosure of which is incorporated herein by reference. However, moderately high % cis can be achieved with Et$_3$N when a more polar solvent such as DMSO is used. All high % cis polymers were formed using DSU/CHCl$_3$ but lower % cis contents were formed by using Et$_3$N and varying compositions of CHCl$_3$ and DMF (17:3, 7:3, and 100% DMF).

11. Chain End Modification of C3A-C6S polymer

To 100 mg of C$_{3A}$-C$_{6S}$ thiol-yne step growth polymer (M$_w$=132.4 kDa, Đ$_M$=7.25) was added CHCl$_3$ (5 mL) and 2,2,2-trifluoroethanethiol (2.4 μL, 2.7×10$^{-5}$ mol). This was allowed to stir until completely dissolved before adding Et$_3$N (1 μL, 7.2×10$^{-6}$ mol). The solution was stirred at room temperature for 16 h before precipitating into diethyl ether. The polymer was collected and redissolved in CHCl$_3$ before reprecipitating into diethyl ether. Upon collection the polymer was dried in vacuo at room temperature for 24 h.

12. General Method for Radical Curing 2 g of C$_{3A}$-C$_{6S}$ polymer was dissolved in CH$_2$Cl$_2$ (20 mL) and to this was added 1 wt % of dicumyl peroxide (20 mg). The solution was stirred overnight then reduced to dryness in vacuo. The polymer was placed into a mold and cured at 160° C. for 15 min before being pressed into films.

B. Analytical Methods

1. NMR Spectroscopy.

NMR ($^1$H, $^{13}$C, and $^{19}$F) spectra were recorded in CDCl$_3$ on either a Bruker DPX-500 (monomers and model compounds) or Bruker DPX-400 (all polymers) spectrometer at 298° K. Chemical shifts are reported as δ in parts per million (ppm) and referenced to the chemical shift of the residual solvent resonances (CDCl$_3$ 1H: δ=7.26 ppm, 13C: δ=77.16 ppm) or to external standards ($CF_3COOH$ $^{19}F$: δ=0 ppm). The resonance multiplicities are described as s (singlet), d (doublet), t (triplet), q (quartet) or m (multiplet).

2. Size-Exclusion Chromatography (SEC).

SEC was used to determine the molar masses and molar mass distributions (dispersities, $Đ_M$) of the synthesized polymers. SEC analyses were performed on a system composed of an Agilent 390-LC-Multi detector using an Agilent Polymer Laboratories guard column (PLGel 5 μM, 50×7.5 mm), two mixed D Varian Polymer Laboratories columns (PLGel 5 μM, 300×7.5 mm) and a PLAST RT autosampler. Detection was conducted using a differential refractive index (RI) and an ultraviolet (UV) detector set to 280 nm. The analyses were performed in $CHCl_3$ at 40° C. and containing 0.5% w/w $Et_3N$ at a flow rate of 1.0 mL/min. Polystyrene (PS) (162-2.4×105 g·mol-1) standards were used to calibrate the system. Polymers containing 2,2'-(ethylenedioxy)diethanethiol and 1,4-dithio-d-threitol were analysed on a system composed of an Agilent 390-LC-Multi detector using an Agilent Polymer Laboratories guard column (PLGel 5 μM, 50×7.5 mm), two mixed C Varian Polymer Laboratories columns (PLGel 5 μM, 300×7.5 mm) and a PLAST RT autosampler. Detection was conducted using a differential refractive index (RI). The analyses were performed in DMF at 50° C. and containing 5 mM NH4BF4 at a flow rate of 1.0 mL/min. Poly(methyl methacrylate) (PMMA) (550–2.136×106 g·mol-1) standards were used to calibrate the system. Molecular weights and dispersities were determined using Cirrus v2.2 SEC software. Absolute MW size exclusion chromatography (SEC) analysis was performed on an Agilent 390-LC MDS instrument equipped with differential refractive index (DRI), viscometry (VS), dual angle light scatter (LS) and two wavelength UV detectors. The system was equipped with 2× PLgel Mixed D columns (300×7.5 mm) and a PLgel 5 μm guard column. The eluent used was $CHCl_3$ with 2% $Et_3N$. Samples were run at 1 mL·min-1 at 30° C. Poly(methyl methacrylate), and polystyrene standards (Agilent EasyVials) were used for calibration and ethanol was added as a flow rate marker. Analyte samples were filtered through a PTFE membrane with 0.22 μm pore size before injection.

3. Thermal Property Measurements.

The thermal characteristics of the polymers were determined using differential scanning calorimetry (DSC, TA Q200) from −50° C. to 150° C. at a scanning rate of 10° C./min. The glass transition temperature ($T_g$) was determined from the midpoint in the second heating cycle of DSC.

4. Mechanical Property Measurements.

A. Tensile Tests at Different Strain Rates

Thin films of each polymer were fabricated using a vacuum compression machine (TMP Technical Machine Products Corp.). The machine was preheated to 160° C. Then polymer was added into the 50×50×0.5 mm mould and put into the compression machine with vacuum on. After 15 minutes of melting, the system was degassed three times. Next, 10 lbs*1000, 15 lbs*1000, 20 lbs*1000, 25 lbs*1000 of pressure were applied for 2 minutes respectively. After that, the mould was cooled down with 1000 psi of pressure to prevent the wrinkle on the film's surface. The films were visually inspected to ensure that no bubbles were present in the films. Dumbbell-shaped samples were cut using a custom ASTM Die D-638 Type V.

B. Tensile Tests at Different Strain Rates

Tensile tests at different stretching speed were carried out using Instron (Instron 5543 Universal Testing Machine) at room temperature (25±1° C.). The gauge length was set as 7 mm and the crosshead speed was set as various values (listed in Table 1). The dimensions of the neck of the specimens were 7.11 mm in length, 1.70 mm in width and 0.50 mm in thickness.

TABLE 1

Crosshead speeds and strain rates of tensile tests.

| Crosshead Speed (mm/min) | Strain Rate* ($s^{-1}$) |
|---|---|
| 0.001 | $2.34 \times 10^{-6}$ |
| 0.01 | $2.34 \times 10^{-5}$ |
| 0.05 | $1.17 \times 10^{-4}$ |
| 0.1 | $2.34 \times 10^{-4}$ |
| 0.15 | $3.52 \times 10^{-4}$ |
| 0.2 | $4.69 \times 10^{-4}$ |
| 0.25 | $5.86 \times 10^{-4}$ |
| 0.3 | $7.03 \times 10^{-4}$ |
| 0.35 | $8.20 \times 10^{-4}$ |
| 0.4 | $9.38 \times 10^{-4}$ |
| 0.45 | $1.05 \times 10^{-3}$ |
| 0.5 | $1.17 \times 10^{-3}$ |
| 1 | $2.34 \times 10^{-3}$ |
| 5 | $1.17 \times 10^{-2}$ |
| 10 | $2.34 \times 10^{-2}$ |
| 15 | $3.52 \times 10^{-2}$ |
| 20 | $4.69 \times 10^{-2}$ |
| 40 | $9.38 \times 10^{-2}$ |
| 80 | $1.88 \times 10^{-1}$ |

*strain rate = crosshead speed/original length

C. Tensile Tests at 20 mm/min and Calculation of Elastic Modulus

Dumbbell-shaped samples of the elastomers described above were prepared as set forth in section 4A above. The elastic modulus of each polymer was obtained using tensile testing at 20 mm/min using Instron (Instron 5543 Universal Testing Machine) at room temperature (25±1° C.). The gauge length was set as 7.25 mm and the crosshead speed was 20 mm/min. The dimensions of the neck of the specimens were 7.11 mm in length, 1.7 mm in width and 0.5 mm in thickness. The elastic moduli were calculated using the slope of linear fitting of the data from strain of 0% to 0.1%. The reported results (See Tables 5 and 6) are average values from three individual measurements.

5. Wide Angle X-ray Diffraction Measurement (WAXD).

The WAXD experiments were conducted using a Rigaku Ultima IV X-ray Diffractometer at room temperature. The generator was operated at 40 kV and 40 mA with a beam monochromatized to Cu Kα radiation. Samples were scanned at 1.0 degree/min continuously over a scan range of 5.0-70.0° C. A typical exposure time was 5 min. The air scattering was subtracted. One-dimensional WAXD curve was integrated from the two-dimensional image.

6. Small Angle X-ray Scattering Measurement (SAXS).

Figure 1B:
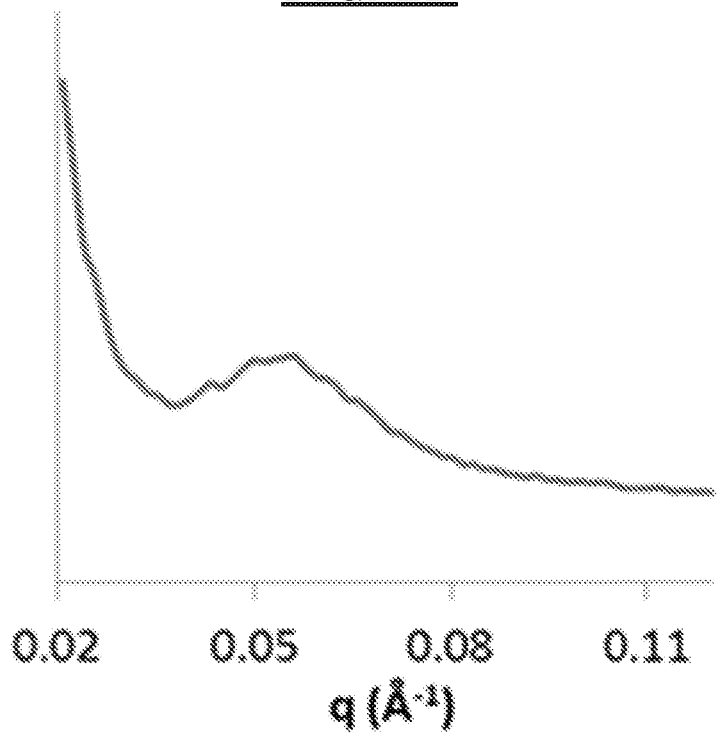
Figure 2A:
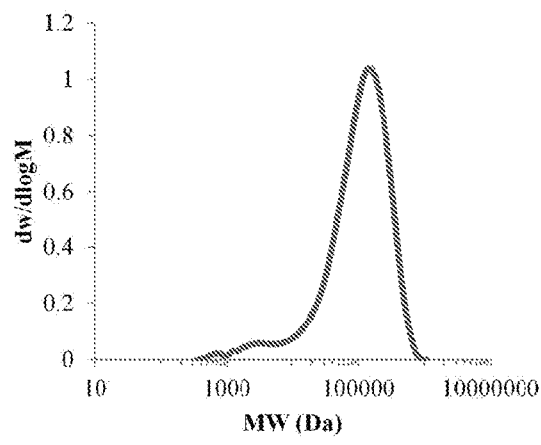
FIGS. 2A-D are SEC chromatograms of $C_{3A}$-$C_{6S}$ polymers according to one or more embodiments of the present invention with different percentages of cis double bonds (80%, 70%, 53%, and 32%).
Figure 2B:
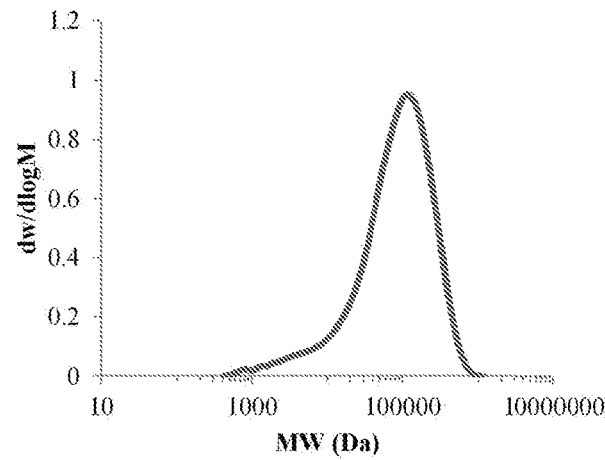
Figure 2C:
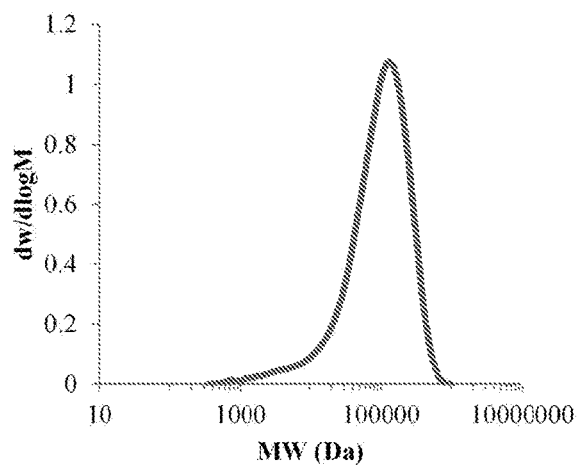
Figure 2D:
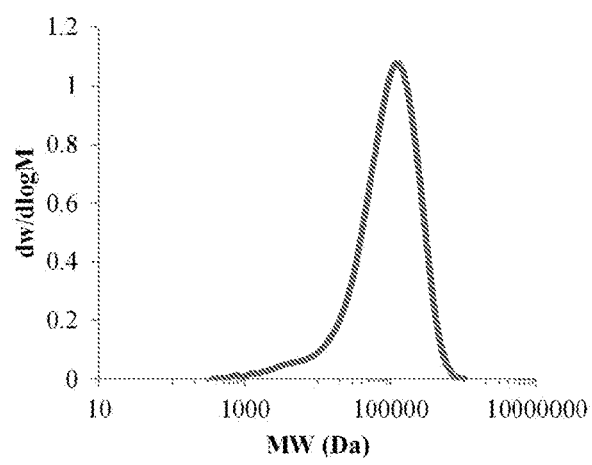
Figure 3A:
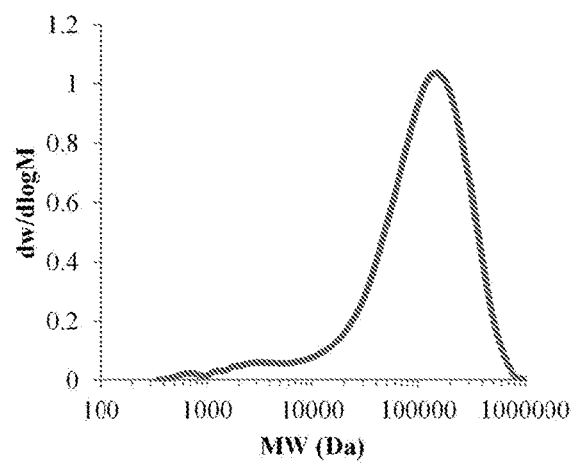
FIGS. 3A-E SEC chromatograms of $C_{3A}$-$C_{6S}$ polymers according to one or more embodiments of the present invention containing 80% cis double bonds at different molecular weights (147.5 kDa, 132.4 kDa, 107.3 kDa, 62.2 kDa, and 43.5 kDa).
Figure 3B:
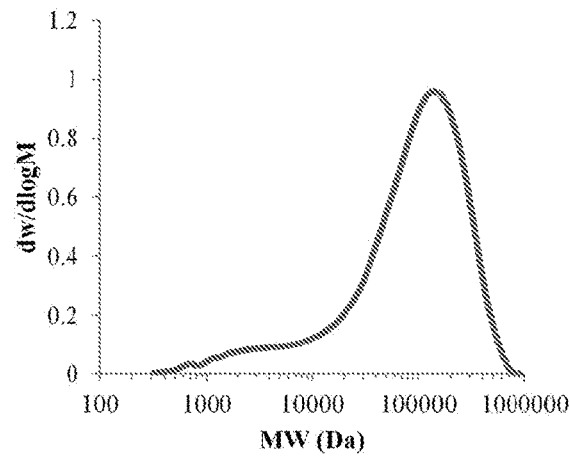
Figure 3C:
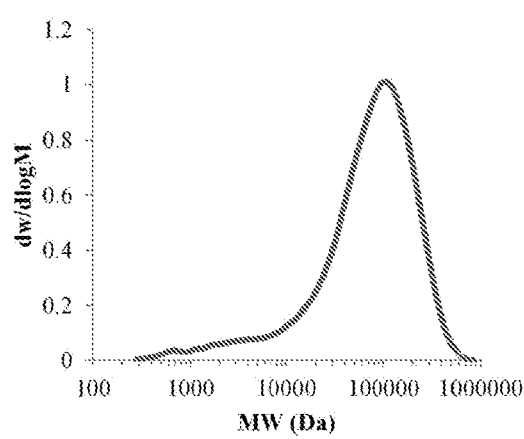
Figure 3D:
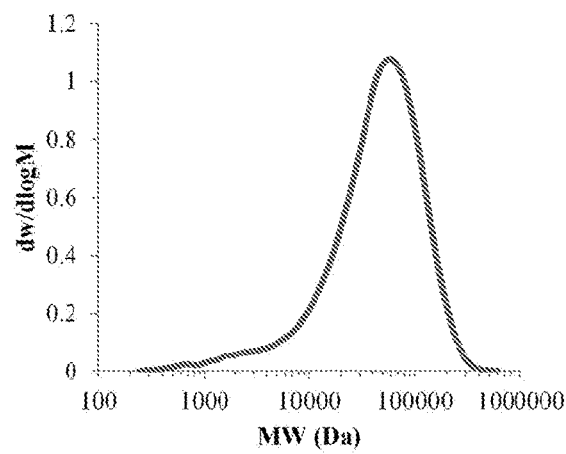
Figure 3E:
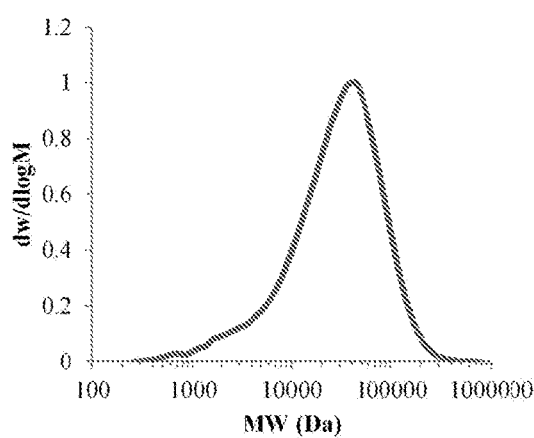

The SAXS experiments were performed on a Rigaku MicroMax 002+ instrument equipped with a two-dimensional multiwire area detector and a microfocus sealed copper tube. The working voltage and current used were 45 kV and 0.88 mA, with the wavelength of the X-ray is 0.154 nm. The scattering vector (q) was calibrated using standard of silver behenate with the primary reflection peak at (q=1.067 nm-1). The recording time for each sample was 10-20 min, depending on the scattering intensity. The data analysis was done with SAXSgui software and the results are shown in FIGS. 1A-B.

7. Surface Energy Measurement.

The surface energies of the polymers were estimated from contact angle measurements. By measuring contact angle with four different probe liquids (propylene glycol, ethylene glycol, glycerol and water) using an Advanced Goniometer (Rame-Hart Instrument Co., Model 500) at 25° C. and fitting the data using the Owen's equation, the dispersion and polar components of the polymer surface energy before stretching and after stretching were obtained from the slope and the intercept. (See Table 2) At least five measurements were performed on different spots and averaged.

Owen's equation: (Eq. 1)

$$\frac{(1+\cos\theta_{LP})\gamma_L}{2\sqrt{\gamma_L^d}} = \sqrt{\gamma_S^d} + \sqrt{\frac{\gamma_L^p}{\gamma_L^d}}\sqrt{\gamma_S^p}$$

$$\gamma_S = \left(\sqrt{\gamma_S^d}\right)^2 + \left(\sqrt{\gamma_S^p}\right)^2 \quad \text{(Eq. 2)}$$

where $\theta_{LP}$ is the Young's contact angle, $\gamma_L$ is the liquid surface tension, $\gamma_L^d$ is the dispersion component of liquid surface tension, $\gamma_L^p$ is the polar component of liquid surface tension, $\gamma_L$ is the polymer surface energy, $\gamma_S^d$ is the dispersion component of polymer surface energy and $\gamma_S^p$ is the polar component of polymer surface energy.

TABLE 2

Surface Tension of Liquids used for the Contact Angle Measurement

| | Propylene glycol (PG) | Ethylene glycol (EG) | Glycerol (G) | Water (H$_2$O) |
|---|---|---|---|---|
| $\gamma_s^p$ (mJ/m$^2$) | 9.0 | 16.0 | 26.4 | 51.0 |
| $\gamma_s^d$ (mJ/m$^2$) | 26.4 | 32.8 | 37.0 | 21.8 |
| $\gamma_s$ (mJ/m$^2$) | 35.4 | 48.8 | 63.4 | 72.8 |

8. Network Mechanical Properties

According to Boltzmann superposition principle, (6) we can describe stress evolution in polymeric networks undergoing uniaxial elongation at a constant strain rate $\dot{\varepsilon}$ as:

$$\sigma(t) = \int_0^t E(t-t')d\mathcal{D}(t') = \int_0^t E(t-t')dt' = \int_0^t E(\Delta t)d\Delta t \quad \text{(Eq. 3)}$$

where E(t) is time dependent network Young's modulus. In entangled amorphous polymeric networks, dynamics of entangled strands forming a network on the time scales t smaller than the strands' Rouse time, $\tau_R = \tau_0 N_e^2$ ($N_e$–degree of polymerization of network strands between entanglements and $\tau_0$–characteristic monomer time), the dynamics of network strands is not influenced by entanglements or crosslinks and network modulus decays with time as, $$E(t) \propto \rho kT \left(\frac{\tau_0}{t}\right)^{1/2},$$

where $\rho$ is a monomer number density, k is the Boltzmann constant and T is the absolute temperature. However, at the time scales t larger than the Rouse time of the entangled polymeric strands the network response is pure elastic with Young's modulus $E \propto \rho kT/N_e$. We will use the following approximation for time dependent modulus to describe network relaxation:

$$E(t) \approx 3\rho kT \begin{cases} (\tau_0/t)^{1/2}, & \text{for } \tau_0 < t \leq \tau_R = \tau_0 N_e^2 \\ 1/N_e, & \text{for } \tau_R \leq t \end{cases} \quad \text{(Eq. 4)}$$

For the stress relaxation modulus given by Eq. 2 integration of Eq. 1 results in $$\sigma(t) \approx 2E_m \dot{\varepsilon} \tau_0^{1/2} t^{1/2}, \text{ for } t < \tau_R \quad \text{(Eq. 5)}$$

where we introduced $E_m = 3$ kT/v with monomer volume v. For experiments at constant strain rate, we can substitute $t = \varepsilon/\dot{\varepsilon}$ into Eq. 5 to express $\sigma(t)$ as a function of strain $\varepsilon$ as:

$$\sigma(\varepsilon) \approx 2E_m \tau_0^{1/2} \dot{\varepsilon}^{1/2} \varepsilon^{1/2}, \text{ for } t < \tau_R \quad \text{(Eq. 6)}$$

In the opposite limit, $t > \tau_R$, $$\sigma(t) \approx E_m \dot{\varepsilon} t/N_e, \text{ for } t \geq \tau_R \quad \text{(Eq. 7)}$$

Analysis of the Eq. 7 shows that in this network deformation regime we can collapse data sets obtained at different strain rates by plotting $$\frac{\sigma(t)}{\dot{\varepsilon}} \text{ vs } \varepsilon/\dot{\varepsilon}.$$

The slope will provide value of the network Young's modulus at small deformations, $E_0 = E_m/N_e$. Note, that in the case of composite materials with a spectrum of relaxation times, Eq. 7 is valid on the time scales longer than the longest relaxation time of stress relaxation in a system.

Network tensile toughness ($U_{TT}$) reported in Table 4 was calculated from the area under the stress-strain curve $$U_{TT} = \int_0^{D_{break}} \sigma dD \quad \text{(Eq. 8)}$$

where $D_{break}$ is the strain upon failure.

C. Results and Discussion

To access suitable materials, a multi-functional alkyne monomer ($C_{3A}$) synthesized by simple Fischer esterification of propiolic acid and propane diol was combined with hexane dithiol ($C_{6S}$) in chloroform (CHCl$_3$) in the presence of 1 mol % of 1,8-diazabicycloundecane (DSU) to promote cis-double bond formation, as set forth above, and shown in Scheme 7 below Scheme 7

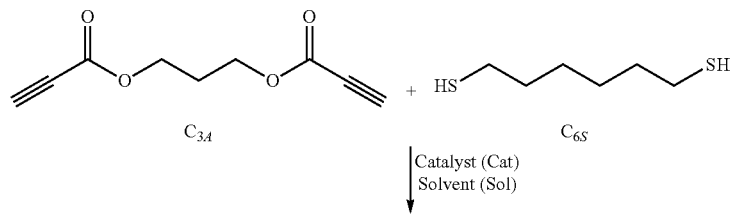

-continued

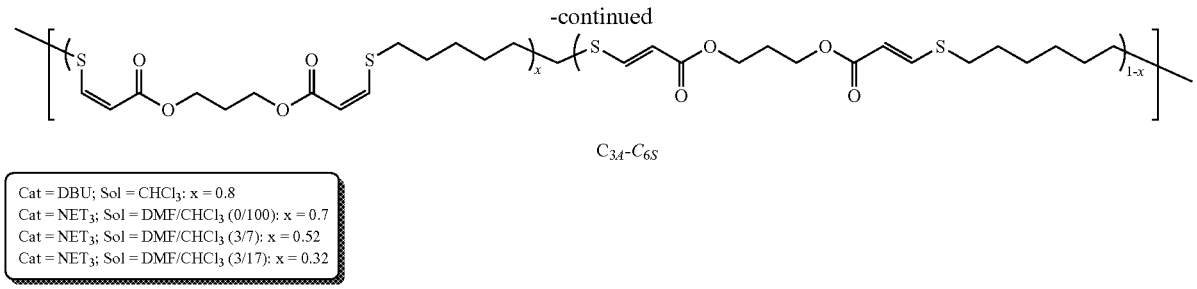

$C_{3A}-C_{6S}$

Cat = DBU; Sol = CHCl₃: x = 0.8
Cat = NET₃; Sol = DMF/CHCl₃ (0/100): x = 0.7
Cat = NET₃; Sol = DMF/CHCl₃ (3/7): x = 0.52
Cat = NET₃; Sol = DMF/CHCl₃ (3/17): x = 0.32

After only 1 h, precipitation of the polymer into diethyl ether revealed the formation of a material with high molar mass (see, FIGS. 2A-D, 3A-E and Tables 5 and 6) with a high cis-content of (80%).

As set forth above, alteration of the polarity of the reaction solvent by blending CHCl₃ with DMF and using 1 mol % of triethylamine (NEt₃) enabled the synthesis of materials with altered cis:trans ratios. Further analysis of the materials by size exclusion chromatography using viscometry detection (See FIG. 4A-B) revealed α values of ca. 0.6 which is highly characteristic of a linear, unbranched or non-cross-linked material in a good solvent.

Materials having cis:trans ratios of 80:20, 70:30, 53:47, and 32:68 were produced and their mechanical properties tested by tensile testing via Instron, as set forth above. The resultant materials displayed dramatically altered mechanical properties (See FIGS. 5A-E, 6, 7A-C) as a function of their cis:trans ratios. As can be seen in Table 5, below, as the ratio of cis isomers to trans isomers was varied from 70:30 to 53:47 and then to 32:68, the materials were in turn increasingly weaker as is reflected in their lower Young's moduli, but also became more stretchable or ductile or toughened as reflected by their greater extensibility.

Figures 8, 9:
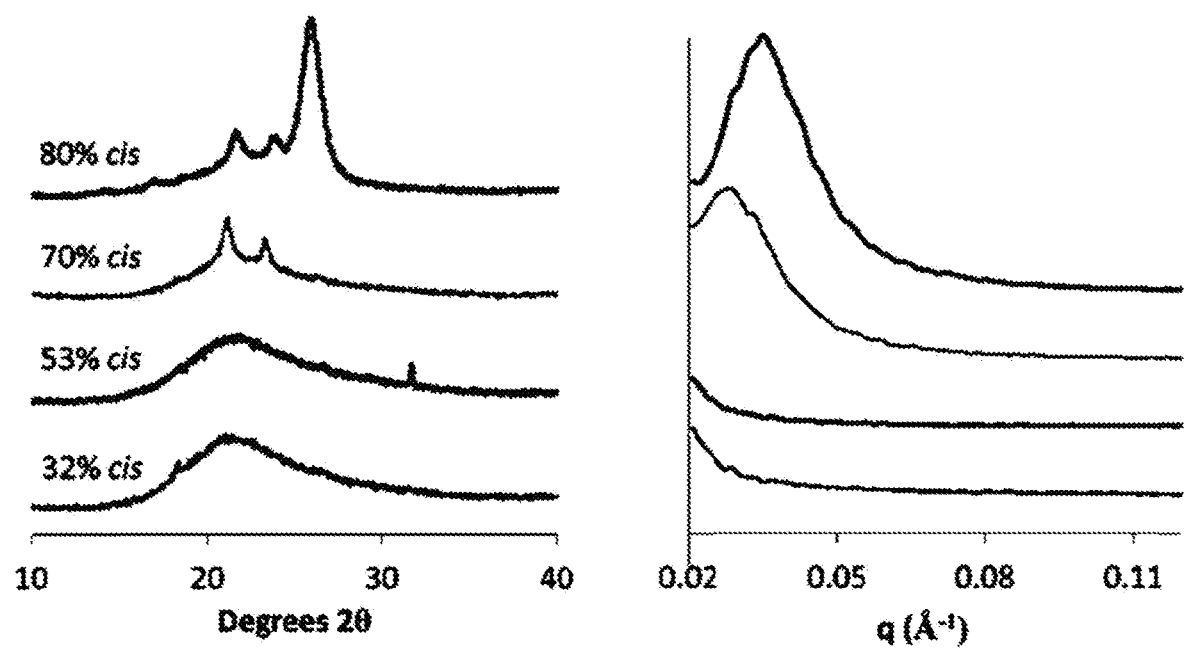
FIG. 8 is a graph showing Wide-Angle X-Ray Diffraction (WAXD) plots for elastomer materials prepare according to one or more embodiments of the present invention having 80%, 70%, 53%, and 32% cis double bonds and shows that materials with higher percentages of cis double bonds display an increased crystallinity that is consistent with their mechanical performance.
FIG. 9 is a graph showing Small-Angle X-Ray Scattering (SAXS) plots for elastomer materials prepare according to one or more embodiments of the present invention having 80%, 70%, 53%, and 32% cis double bonds and corroborates the observations with the crystalline domain size being calculated from the q value at maximum intensity.

Analysis of the materials by Wide-Angle X-Ray Diffraction (WAXD), as described above, revealed that while the 80% cis material displayed sharp 20 peaks at 21° and 23°, these peaks were significantly diminished in the 70% cis polymers. Materials at lower % cis double bonds displayed broad peaks that are consistent with amorphous materials exhibiting no strong crystalline domains. (See FIG. 8). Complimentary analysis by Small-Angle X-Ray Scattering (SAXS), as described above, confirmed these observations with microcrystalline domains of ca. 18 and 22 nm being observed for the 80 and 70% cis materials respectively. Again, at lower % cis double bond contents, no significant peaks were observed in the SAXS analysis (See FIG. 9).

Figure 10:
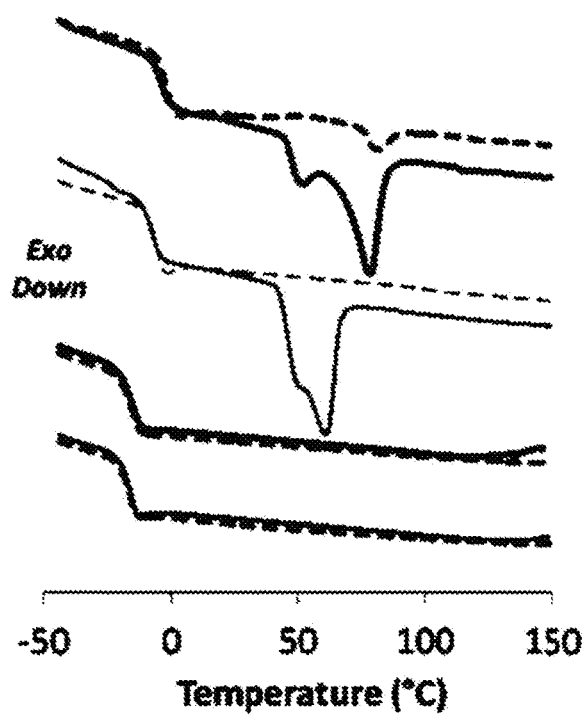
FIG. 10 is a graph showing Differential Scanning Calorimetry (DSC) plots for elastomer materials prepared according to one or more embodiments of the present invention having 80%, 70%, 53%, and 32% cis double bonds (solid line=first scan; dashed line=second scan). As can be seen, at high % cis double bond melt transitions for crystalline domains are observable in both first and second scan data, but for lower % cis double bond-containing materials, such melt transitions are only observed in first scan data and the energy required decreases with decreasing % cis double bonds. This is consistent with fewer smaller crystalline domains being present in the material.
Figure 11A:
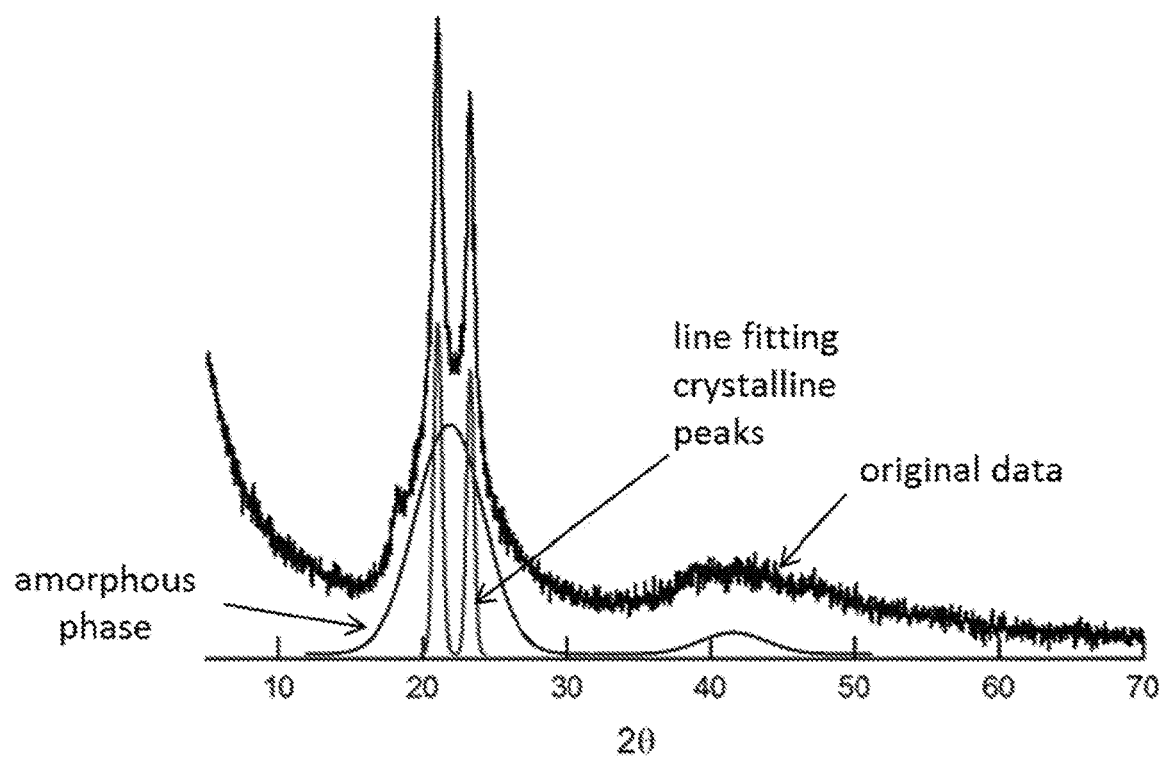
FIGS. 11A-D are WAXD patterns for $C_{3A}$-$C_{6S}$ polymers according to one or more embodiments of the present invention with different percentages of cis double bonds (80% (FIG. 11A), 70% (FIG. 11B), 53% (FIG. 11C), and 32% (FIG. 11D)) before stretching. Lines showing the original data, lines showing the fitting of the crystalline peaks, and lines showing the fitting of the amorphous phases are marked.
Figure 11B:
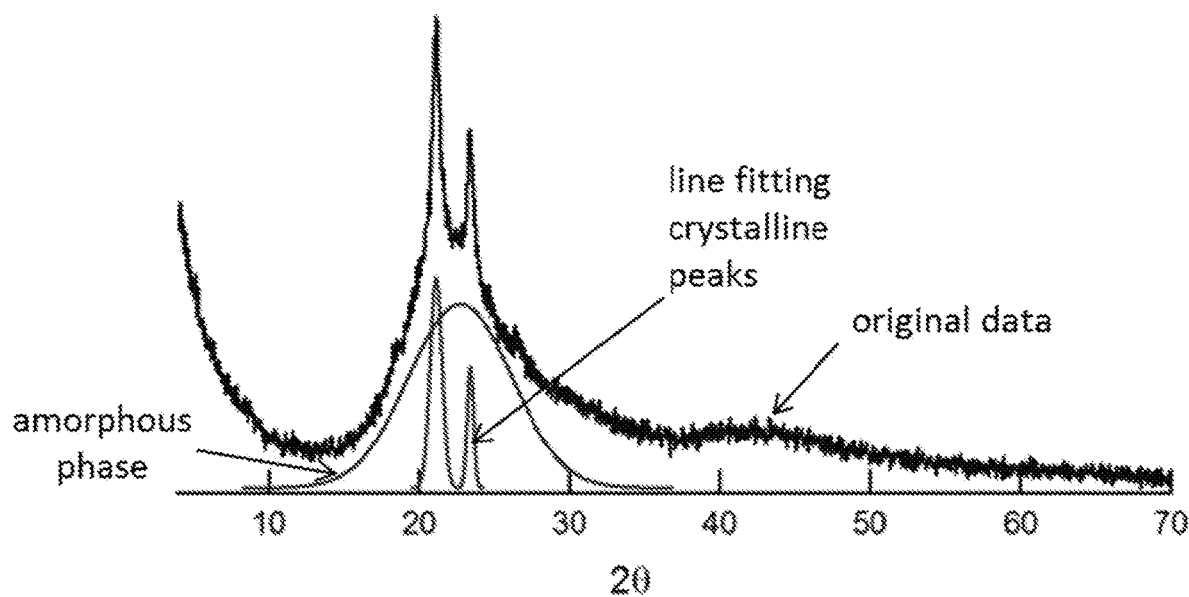
Figure 11C:
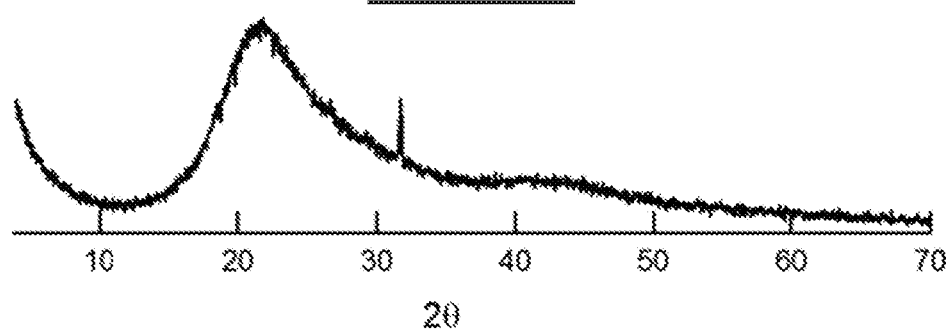
Figure 11D:
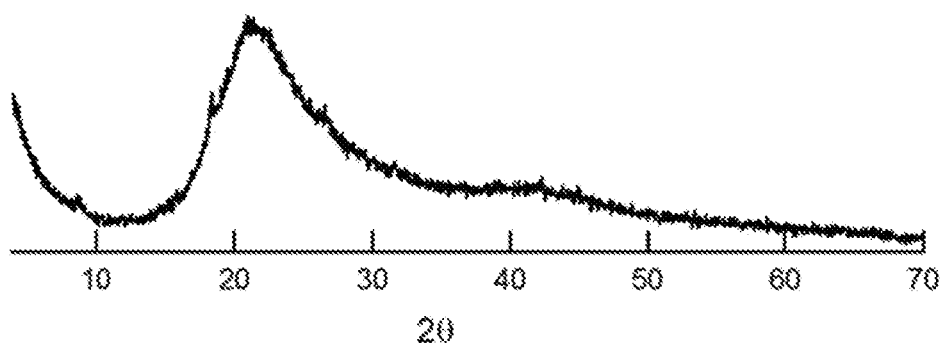
Figure 12A:
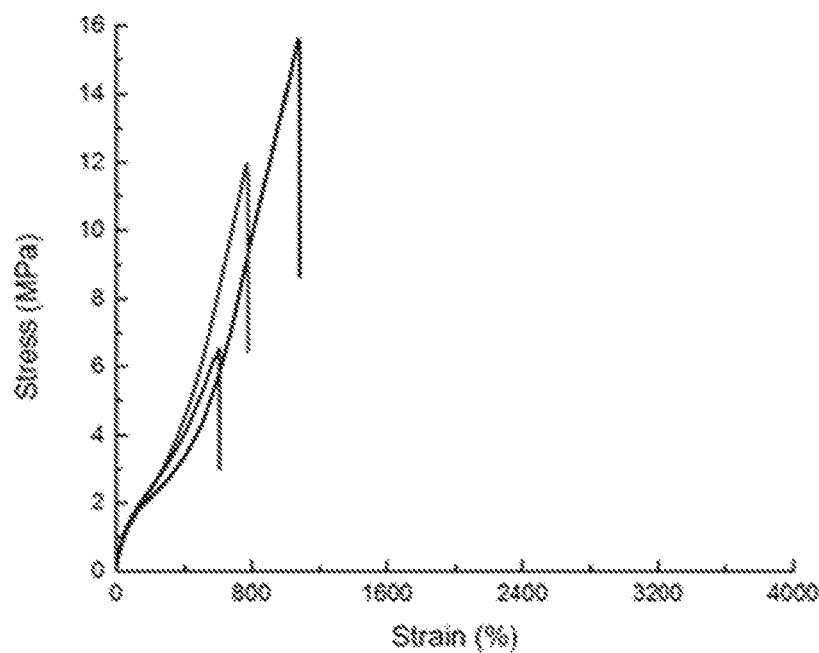
FIGS. 12A-C are exemplar stress vs strain curves for $C_{3A}$-$C_{3S}$ elastomers according to one or more embodiments of the present invention with different percentages of cis (80% (FIG. 12A), 53% (FIG. 12B), and 32% (FIG. 12C)) tested at 20 mm/min.
Figure 12B:
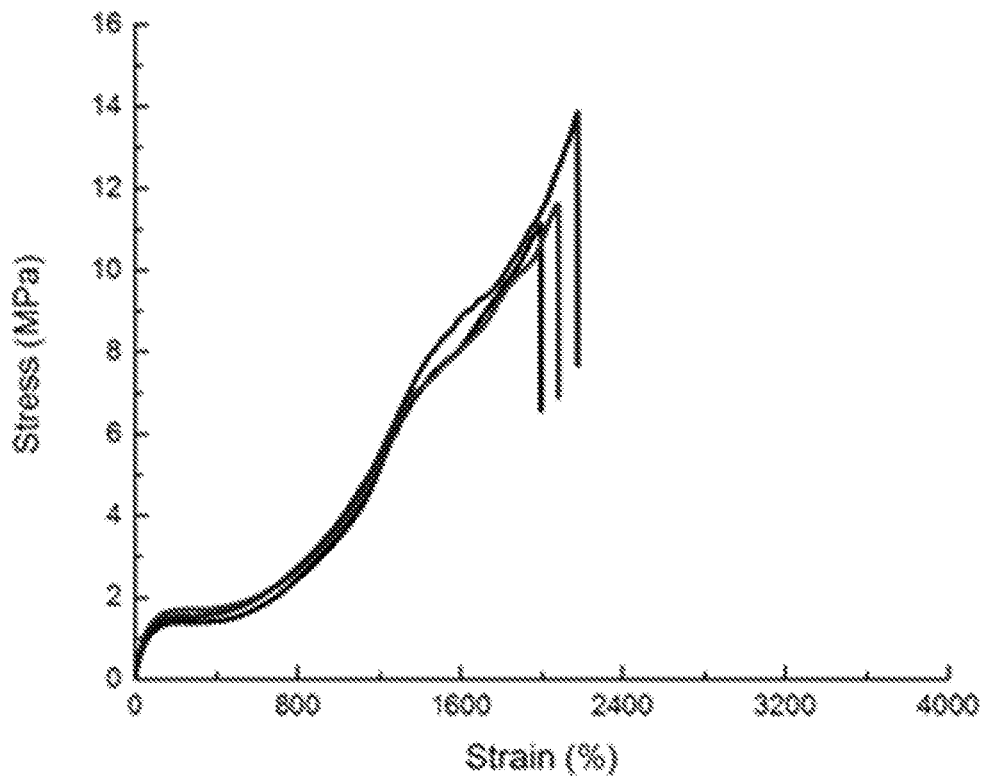
Figure 12C:
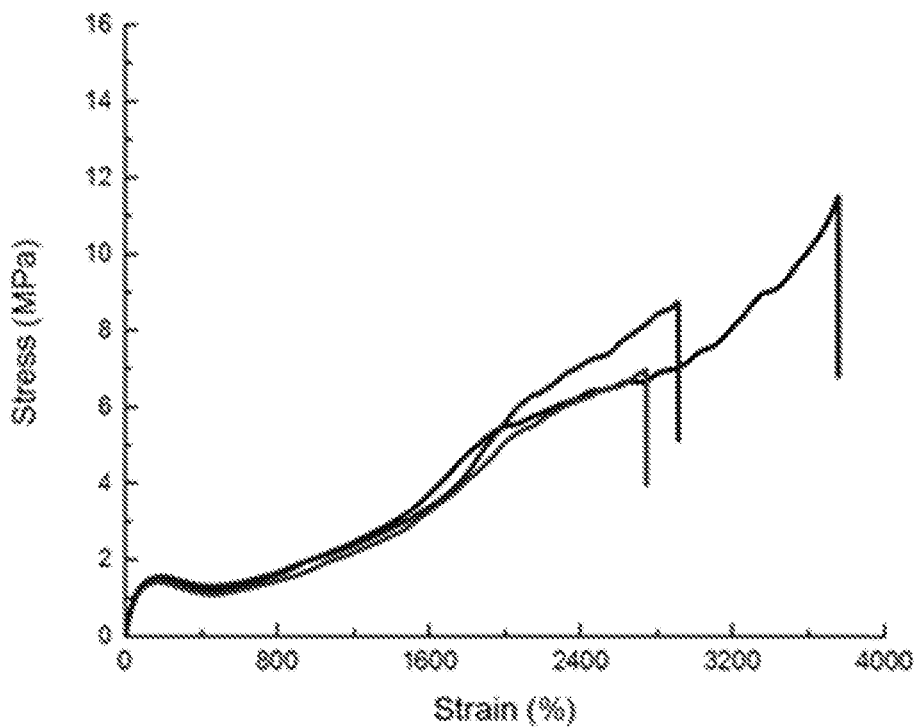
Figure 13A:
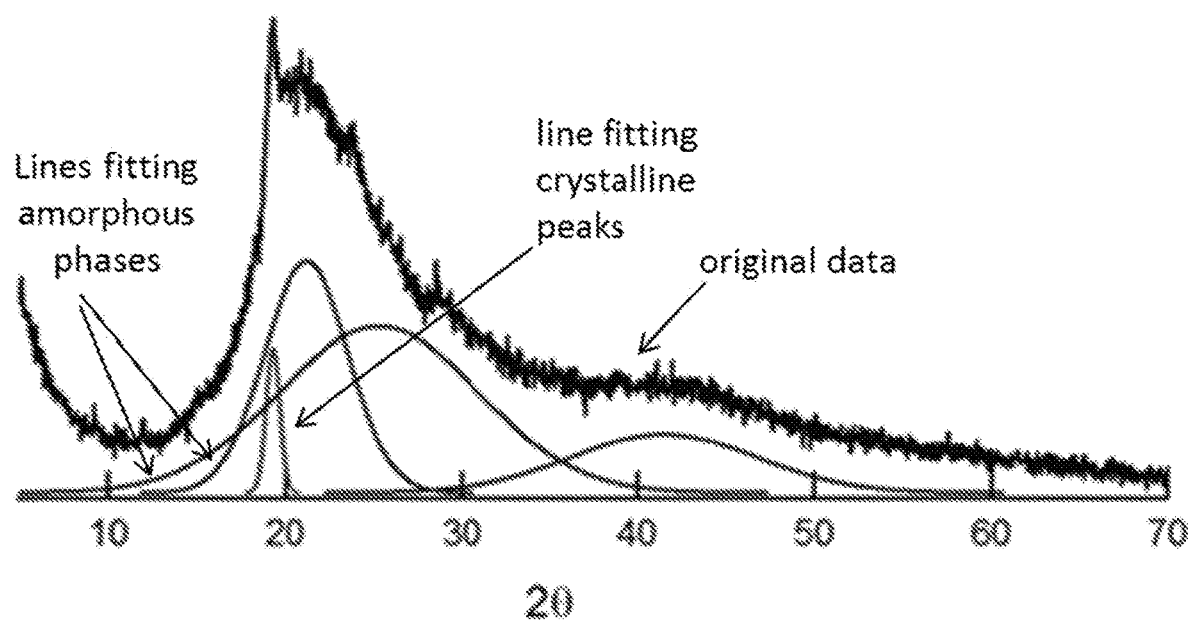
FIGS. 13A-C are WAXD patterns of $C_{3A}$-$C_{3S}$ systems according to various embodiments of the present invention with different percentages of cis double bonds (75% (FIG. 13A), 63% (FIG. 13B), 42% (FIG. 13C)). Lines showing the original data, lines showing the fitting of the crystalline peaks, and lines showing the fitting of the amorphous phases are marked.
Figure 13B:
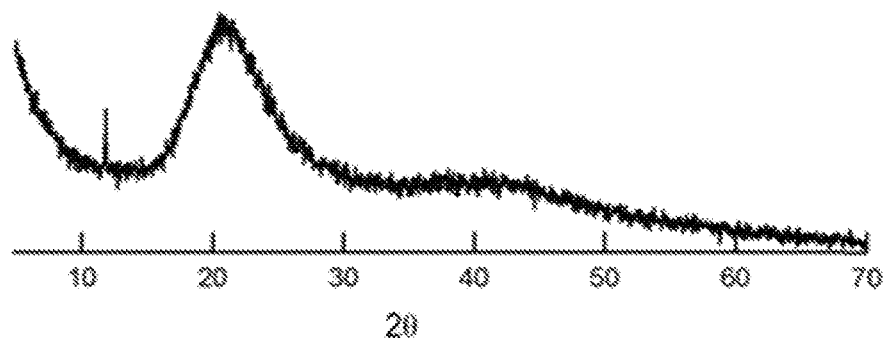
Figure 13C:
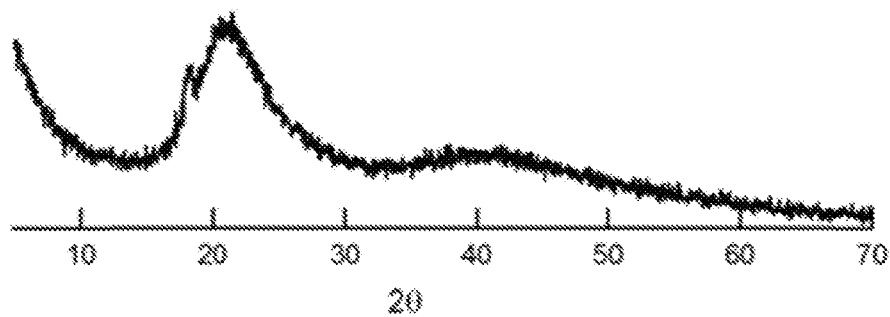
Figure 14A:
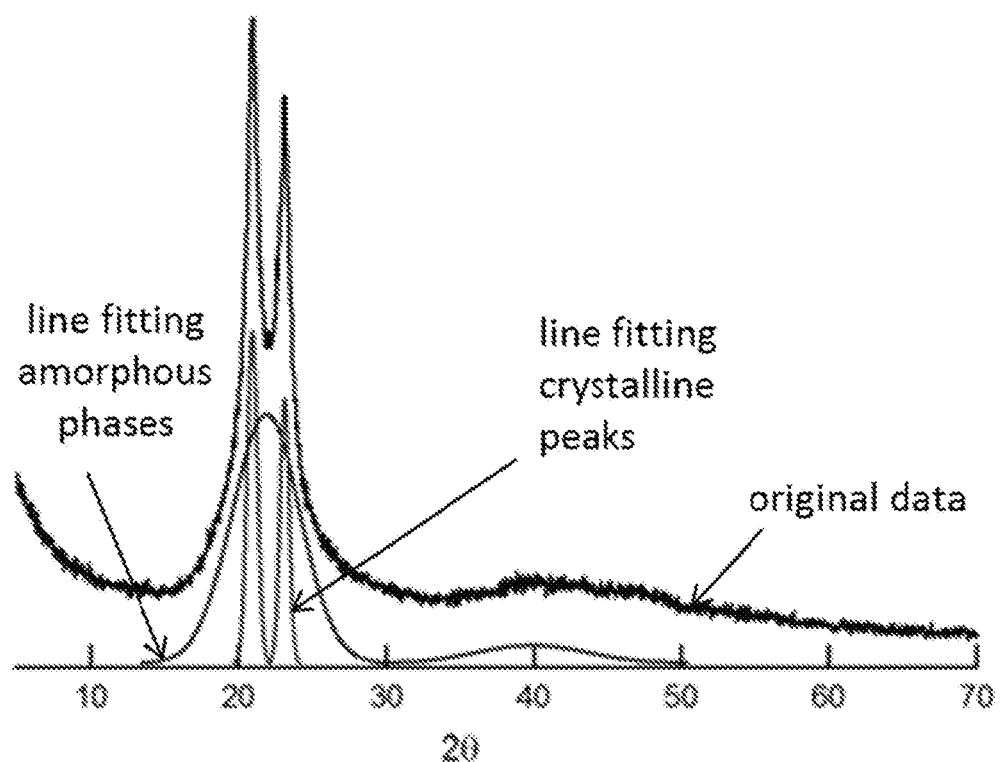
FIGS. 14A-C are WAXD patterns of 80% cis $C_{3A}$-$C_{6S}$ elastomers according to one or more embodiments of the present invention with different molecular weights (107.3 kDa (FIG. 14A), 132.4 kDa (FIG. 14B), and 147.5 kDa (FIG. 14C)). Lines showing the original data, lines showing the fitting of the crystalline peaks, and lines showing the fitting of the amorphous phases are marked, where necessary.
Figure 14B:
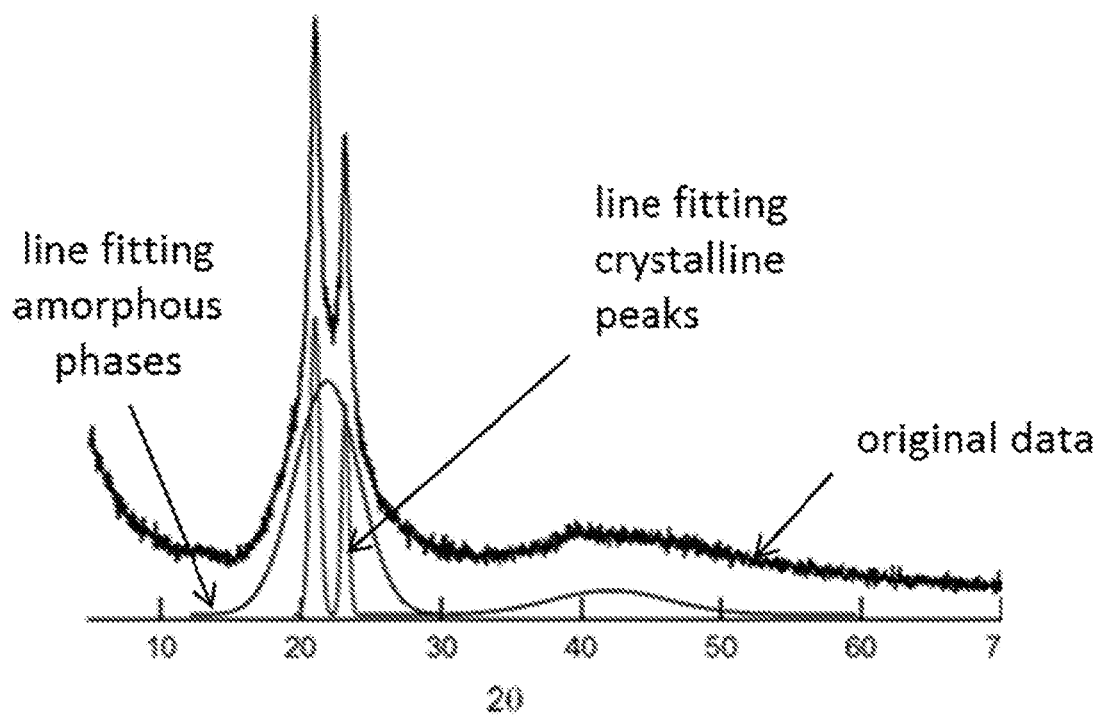
Figure 14C:
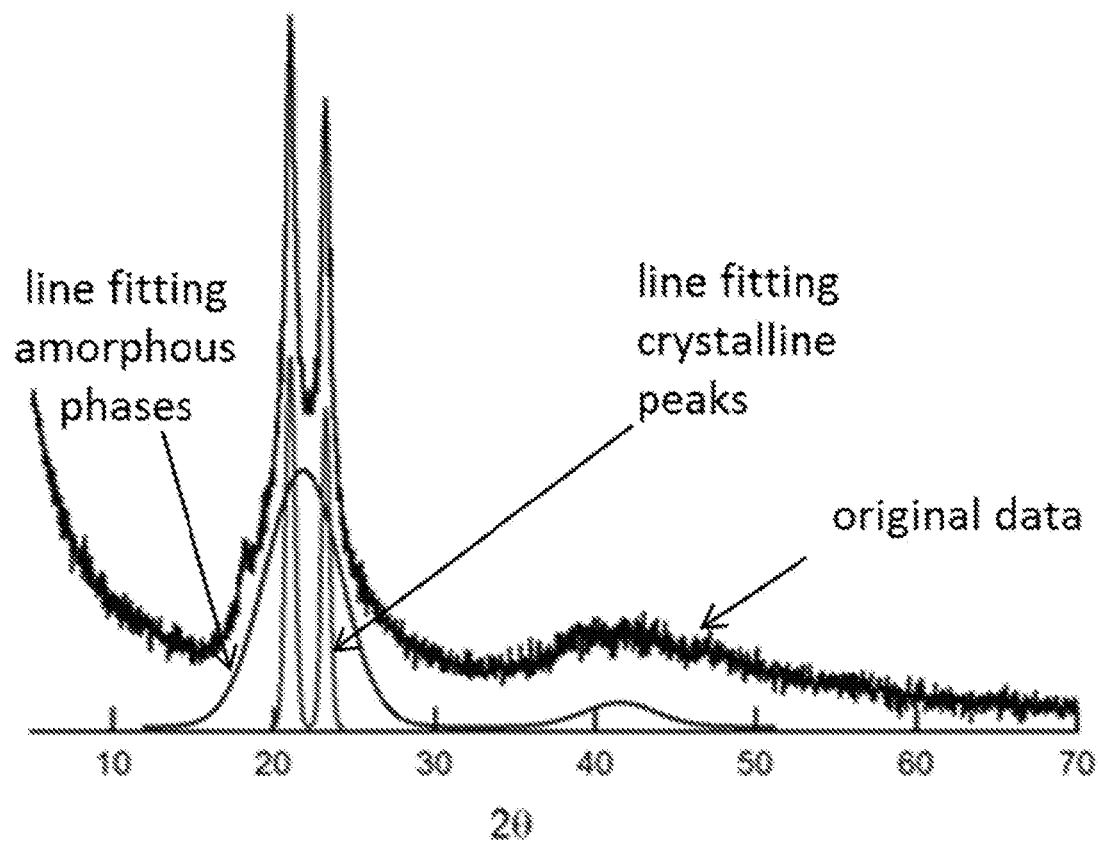

Interestingly, analysis of WAXD and SAXS spectra of the 80% cis material after stretching revealed a significant change in the crystallinity of the materials that is consistent with strain induced crystallisation (See FIG. 1A-B). Further analysis of the materials by Differential Scanning calorimetry (DSC), as described above, revealed, that in addition to glass transitions of the materials being at ca. −2° C., the 80% cis material displayed melting transitions in both the first and second scan data (See FIG. 10). As can be seen in FIG. 10, reduction in the % cis content to 70% resulted in the observation of a melting peak in only the first scan, which had a decreased peak area that corresponds to decreased crystallinity within the sample. Additional decreases in the % cis content, were found to further decrease the crystallinity of the sample. See, FIG. 10, This data was confirmed by the diffraction data (see FIG. 11A-B) and indicates that the ordering of the polymer chains into microcrystalline domains is enhanced by a high cis-content, in line with that of natural and synthetic elastomers. To further investigate this, small molecule cis and trans analogues were synthesised by addition of butane thiol to $C_{3A}$, as described above. Interestingly, the WAXD and SAXS spectra of the 80% cis material after stretching revealed a significant change in the crystallinity of the materials consistent with strain induced crystallisation (See, FIG. 1A-B).

The semicrystalline nature of the physically crosslinked networks of various embodiments of the present invention manifests itself as a significant improvement of the network's mechanical properties with an increase in the fraction of the cis-isomers. (See, FIGS. 7A-C, 12A-C, 13A-C, 14A-C; Tables 5 and 6) Investigation of the elastomer mechanical properties was undertaken to quantify deformation of the thiol-yne elastomers of the present invention over a wide range of strain rates (from $2.23 \times 10^{-6}$ s$^{-1}$ to $9.38 \times 10^{-1}$ s$^{-1}$). These data sets collapse into a straight line, which indicates that for the studied time interval the network mechanical properties are time (deformation rate) independent. To obtain the equilibrium, Young's modulus at small deformations the data set was fitted by the linear function:

$$\frac{\sigma_{true}(t)}{\dot{\varepsilon}} = E_0 \frac{\varepsilon(t)}{\dot{\varepsilon}} \qquad \text{(Eq. 9)}$$

where true stress ($\sigma_{true}$) is defined as the applied load divided by the actual cross-sectional area of the specimen at that load with respect to time (t); strain (D) is defined as the ratio of extension to the original length of the specimen; strain rate () is the change in strain of a material with respect to time; and $E_0$ is the Young's modulus. From the resultant values of the Young's modulus (See Table 4, below and FIGS. 5A-E, 6), the networks can be concluded to function as composite materials for which modulus depends on the network degree of crystallinity $\phi_c$. Using the rule that each component contributes to the final properties of the composite to express the network Young's modulus of the materials as a function of their degree of crystallinity ($E_0$) may be expressed as:

$$E_0 = (1-\phi_c)E_a + \phi_c E_c \qquad \text{(Eq. 10)}$$

where $E_a$ is Young's modulus of the amorphous phase, and $E_c$ is the Young's modulus of the crystalline phase. The modulus of the amorphous phase, $E_a$, is estimated averaging the modulus of samples with 32% and 53% cis-isomer content, resulting in an $E_a$ of 2.94 MPa. In turn, the modulus of the crystalline phase, $E_c$, from fitting the data is equal to 238.4 MPa. This value shows significant improvement over the mechanical properties of existing natural or synthetic elastomer analogs.

Further analysis of this data using a value of the shear modulus (G), $G=E_0/3$, of the network in the amorphous phase enables estimation of the maximum elongation ratio. The molecular mass of strands supporting stress (M) was estimated from the network shear modulus according to the equation:

$$G \approx \rho RT/M \Rightarrow M \approx \rho RT/G \qquad (Eq.\ 11)$$

where $\rho$ is density (assumed to be 1.0 g/cm$^3$ for all these elastomers), R is the gas constant and T is the absolute temperature. Furthermore, the contour length of the chain ($L_0$) can be determined according to the equation:

$$L_0 = l_0 M/M_0 \qquad (Eq.\ 12)$$

where $M_0$ is monomer molecular mass (330.10 g/mol) and $l_0$ is the length of monomer in cis/trans configuration, (See Table 3, below).

Eq. 12 above, where $M_0$ is monomer molecular weight (330.10 g/mol) and $l_0$ is the length of monomer in cis/trans configuration (see, results listed in Table 3). $l_0$ is calculated as the end-to-end distance by:

$$\sqrt{(\Sigma r \cos\theta)^2 + (\Sigma r \sin\theta)^2} \qquad (Eq.\ 14)$$

where r is the bond length and $\theta$ is the angle between x axis and the bond. The maximum extension ratio $\lambda_{max}$ can be estimated (See Table 4) using:

$$\lambda_{max} \approx \frac{L_0}{\sqrt{b_K L_0}} \approx \sqrt{\frac{l_0 M}{b_K M_0}} \approx \sqrt{\frac{l_0 \rho RT}{b_K G M_0}} \qquad (Eq.\ 15)$$

where $b_K$ is the polymer Kuhn length. For flexible chains it varies between 0.8 and 1.4 nm.

TABLE 3

End-to-end distance of the monomer in cis/trans configuration.

| atom start | atom end | r (pm) | cis configuration θ (°) | r cos θ (pm) | r sin θ (pm) | trans configuration θ (°) | r cos θ (pm) | r sin θ (pm) |
|---|---|---|---|---|---|---|---|---|
| C | S | 182 | 79.5 | 33.2 | 179.0 | 60.0 | 91.0 | 157.6 |
| C | C | 154 | 150.0 | −133.4 | 77.0 | 130.5 | −100.0 | 117.1 |
| C | C | 154 | 79.5 | 28.1 | 151.4 | 60.0 | 77.0 | 133.4 |
| C | C | 154 | 150.0 | −133.4 | 77.0 | 130.5 | −100.0 | 117.1 |
| C | C | 154 | 79.5 | 28.1 | 151.4 | 60.0 | 77.0 | 133.4 |
| C | C | 154 | 150.0 | −133.4 | 77.0 | 130.5 | −100.0 | 117.1 |
| S | C | 182 | 79.5 | 33.2 | 179.0 | 60.0 | 91.0 | 157.6 |
| C | S | 172 | 169.5 | −169.1 | 31.3 | 150.0 | −149.0 | 86.0 |
| C | C | 134 | 109.5 | −44.7 | 126.3 | 90.0 | 0.0 | 134.0 |
| C | C | 147 | 49.5 | 95.5 | 111.8 | 150.0 | −127.3 | 73.5 |
| O | C | 136 | 109.5 | −45.4 | 128.2 | 90.0 | 0.0 | 136.0 |
| C | O | 143 | 49.5 | 92.9 | 108.7 | 19.5 | 134.8 | 47.7 |
| C | C | 154 | 120.0 | −77.0 | 133.4 | 90.0 | 0.0 | 154.0 |
| C | C | 154 | 49.5 | 100.0 | 117.1 | 19.5 | 145.2 | 51.4 |
| O | C | 143 | 120.0 | −71.5 | 123.8 | 90.0 | 0.0 | 143.0 |
| C | O | 136 | 60.0 | 68.0 | 117.8 | 150.0 | −117.8 | 68.0 |
| C | C | 147 | 120.0 | −73.5 | 127.3 | 90.0 | 0.0 | 147.0 |
| C | C | 134 | 60.0 | 67.0 | 116.0 | 150.0 | −116.0 | 67.0 |
| S | C | 172 | 0.0 | 172.0 | 0.0 | 90.0 | 0.0 | 172.0 |
| Σr cos θ or Σr sin θ (pm) | | | | −163.5 | 2133.6 | | −194.2 | 2212.9 |
| $\sqrt{(\Sigma r \cos\theta)^2 + (\Sigma r \sin\theta)^2}$ (pm) | | | | 2139.8 | | | 2221.4 | |
| $C_{3,4}$-$C_{6S}$ | | 100 cis % | 80 cis % | 70 cis % | 53 cis % | 32 cis % | 0 cis % | |
| $l_0$ (nm) | | 2.140 | 2.156 | 2.164 | 2.178 | 2.195 | 2.221 | |

Shear modulus (G) can be calculated from elastic modulus as:

$$(E') \text{ by } G = E'/2(l+v) \qquad (Eq.\ 13)$$

where $\upsilon$ is the Poisson's ratio. For soft elastomers, $\upsilon$ is 0.49. The molecular weight of strands supporting stress (M) can be calculated from network shear modulus (G) by Eq. 11, where $\rho$ is density (assume 1.0 g/cm$^3$ for all these elastomers), R is the gas constant and T is the absolute temperature. Contour length of the chain can be determined using The maximum extension ratio was then calculated using the equation:

$$\lambda_{max} \approx \sqrt{l_0 \rho RT/(b_K G M_0)} \qquad (Eq.\ 16)$$

where $b_K$ is the polymer Kuhn length (here, $b_K$=0.8 nm is used) enables the calculation of $\mathcal{D}_{max}$, the maximum theorhetical extension at break as:

$$\mathcal{D}_{max} = (\lambda_{max}-1) \times 100\% \qquad (Eq.\ 17)$$

TABLE 4

Mechanical Properties of Thiol-yne Elastomers

| % Cis | Crystallinity (%) | $E_0$ (MPa) | $\varepsilon_{max}$*(%) | $\varepsilon_{break}$ (%) | Tensile Toughness** (MJ m$^{-3}$) | UTS (MPa) |
|---|---|---|---|---|---|---|
| 80% | 22.3 | 59.8 ± 0.2 | — | 1495 ± 66 | 289 ± 45 | 54.3 ± 6.5 |
| 79% | 22.9 | 56.5 ± 6.4 | — | 1554 ± 71 | 330 ± 29 | 56.7 ± 5.2 |

TABLE 4-continued

Mechanical Properties of Thiol-yne Elastomers

| % Cis | Crystallinity (%) | $E_0$ (MPa) | $\varepsilon_{max}$*(%) | $\varepsilon_{break}$ (%) | Tensile Toughness** (MJ m$^{-3}$) | UTS (MPa) |
|---|---|---|---|---|---|---|
| 70% | 14.1 | 26.2 ± 0.3 | — | 1874 ± 94 | 292 ± 58 | 48.3 ± 9.8 |
| 53% | 0 | 3.1 ± 0.1 | 346 | 2252 ± 115 | 104 ± 22 | 16.2 ± 4.2 |
| 32% | 0 | 2.7 ± 0.1 | 378 | 2970 ± 137 | 35 ± 3.0 | 3.0 ± 0.1 |

Figure 15A:
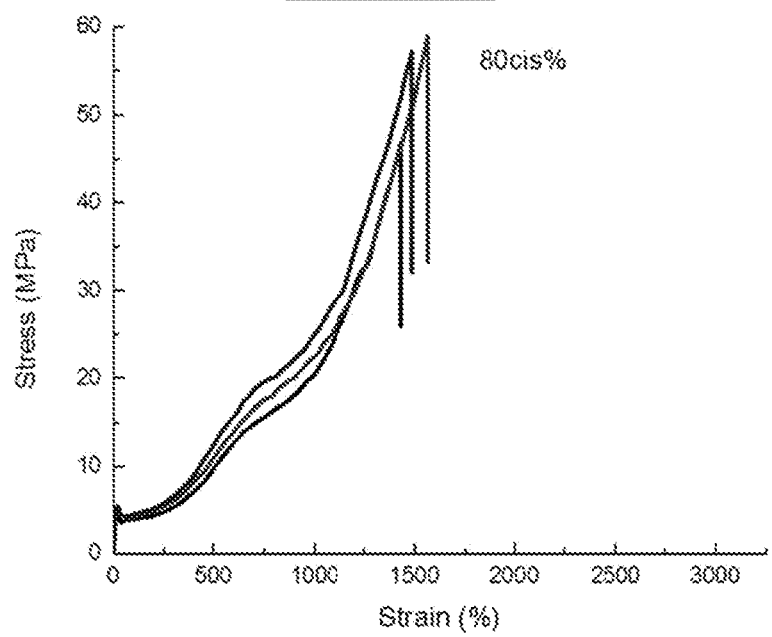
FIGS. 15A-C are exemplar stress vs strain curves for thiol-yne elastomers according to one or more embodiments of the present invention calculated based upon non-linear deformation tensile measurements. More specifically, these graphs are calculated for 80% cis $C_{3A}$-$C_{6S}$ (FIG. 15A); 53% cis $C_{3A}$-$C_{6S}$ (FIG. 15B); and 32% cis $C_{3A}C_{6S}$ (FIG. 15C) thiol-yne elestomers. The data for 3 samples is shown in each figure to illustrate the reproducibility. Each figure includes an expansions inset for clarity.

*$\varepsilon_{max}$ is estimated from the value of the Young's modulus at small deformations.
**Network toughness is calculated at a strain rate of 2.34 × 10$^{-2}$ s$^{-1}$ The remarkable mechanical properties of these materials can further be assessed in the nonlinear deformation regime. (See, FIG. 15A-C, Table 4). Under this regime, the materials with 80% cis-isomer content are strong and elastic materials with an ultimate tensile strength (UTS) of 54.3±6.5 MPa and an elongation at break ($Ð_{break}$) of 1495±66% (See, FIG. 15A). The degree of control over network elastic properties by varying the cis-isomer content, is clearly illustrated from to be a key parameter for strain-induced crystallization. See FIGS. 16A-E, 17A-E, and 18A-C The preparation of a series of samples with $M_w$=44, 62 and 107 kDa and subsequent analysis revealed a decrease in ultimate tensile strength (UTS) and a slight increase in the Young's modulus E with decreasing molar mass (See Table 5). These changes are likely a result of more facile and rapid crystallisation of the lower molar mass materials.

TABLE 5

Mechanical testing data and thermal analysis for $C_{34}$-$C_{65}$ materials.

| | | Mechanical Properties[a] | | | | | Thermal Properties[b] | | | |
|---|---|---|---|---|---|---|---|---|---|---|
| $M_w$ (kg mol$^{-1}$)[c] | % cis[d] | E' (MPa) | $\varepsilon_{yield}$ (%) | $\sigma_{yield}$ (MPa) | $\varepsilon_{break}$ (%) | $\sigma_{break}$ (MPa) | $T_g$ (°C.) | $T_c$ (°C.) | $T_m$ (°C.) | $\Delta H_m$ (J g$^{-1}$) |
| 132.4 | 80 | 52.9 ± 0.6 | 18 ± 3 | 4.7 ± 1.0 | 1123 ± 52 | 44.9 ± 4.1 | -1.2 | 45.1 | 81.7 | -10.2 |
| 107.3 | 80 | 58.0 ± 2.0 | 21 ± 1 | 6.2 ± 0.3 | 1584 ± 47 | 60.0 ± 2.3 | -1.9 | 50.8 | 81.9 | -7.0 |
| 62.2 | 80 | 73.3 ± 1.4 | 15 ± 2 | 5.1 ± 1.0 | 1663 ± 58 | 42.4 ± 3.5 | -1.7 | 40.4 | 82.2 | -14.9 |
| 43.5 | 80 | 77.0 ± 2.6 | 12 ± 1 | 3.9 ± 0.2 | 1650 ± 67 | 27.4 ± 1.2 | -1.2 | 40.0 | 80.4 | -14.8 |
| 147.5 | 80 | 51.9 ± 9.6 | 20 ± 3 | 5.0 ± 0.4 | 1495 ± 66 | 54.3 ± 6.5 | -1.2 | | 75 | |
| 122.5 | 70 | 26.1 ± 2.2 | 28 ± 1 | 2.8 ± 0.3 | 1874 ± 94 | 48.3 ± 9.8 | -5.1 | — | — | — |
| 131.1 | 53 | 1.5 ± 0.2 | 99 ± 6 | 0.4 ± 0.1 | 2252 ± 115 | 16.2 ± 4.2 | -15.5 | — | — | — |
| 125.3 | 32 | 2.4 ± 0.2 | 111 ± 17 | 0.8 ± 0.1 | 2970 ± 137 | 3.0 ± 0.1 | -16.0 | — | — | — |

Figure 15B:
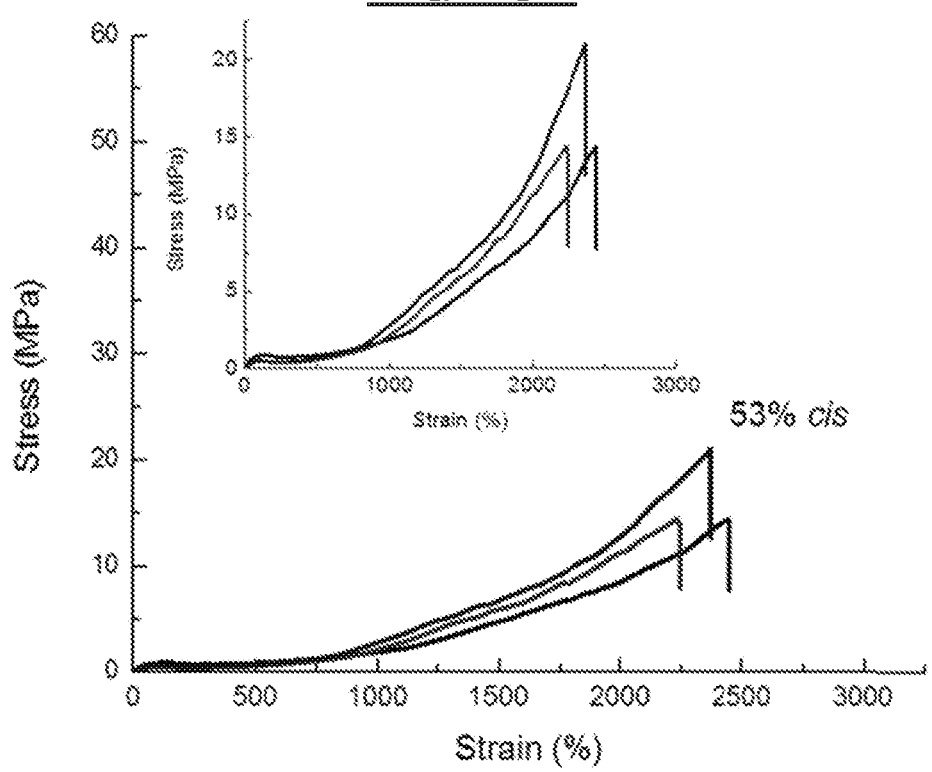
Figure 15C:
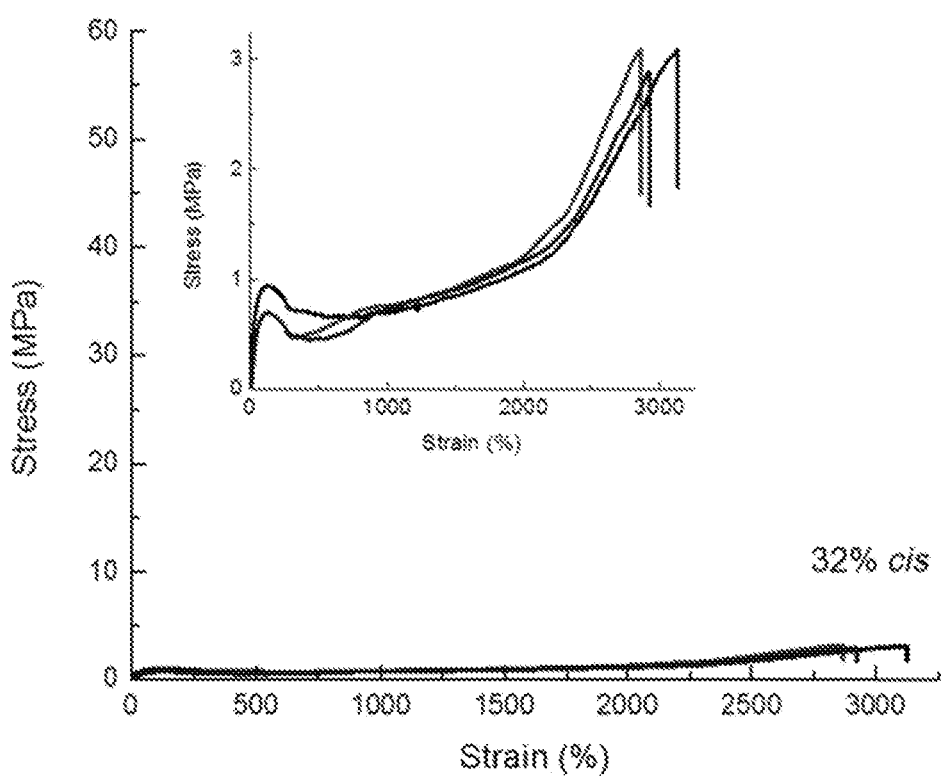
Figure 16A:
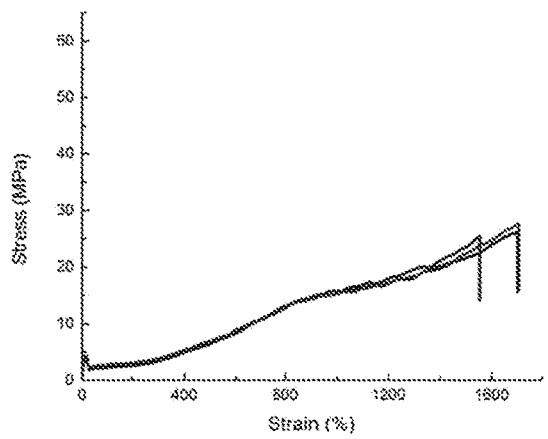
FIGS. 16 A-E are exemplar stress vs strain curves for 80% cis $C_{3A}C_{6S}$ elastomers according to one or more embodiments of the present invention with different molecular weights (43.5 kDa (FIG. 16A), 62.2 kDa (FIG. 16B), and 107.3 kDa (FIG. 16C), 132.4 kDa (FIG. 16D), and 147.5 kDa (FIG. 16E)) tested at 20 mm/min. Data for 3 samples are shown to illustrate the reproducibility. Expansions inset for clarity. Results are listed in Table 5, below.
Figure 16B:
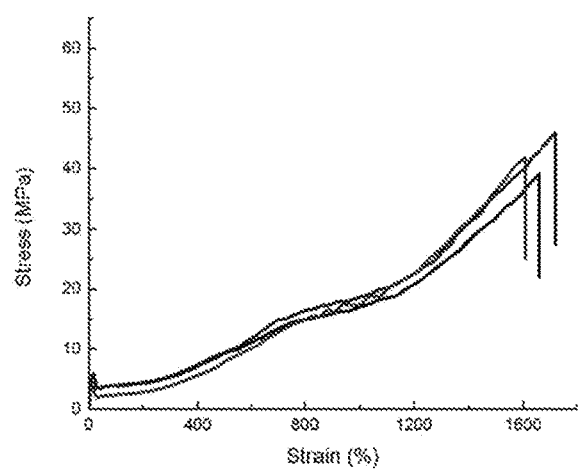
Figure 16C:
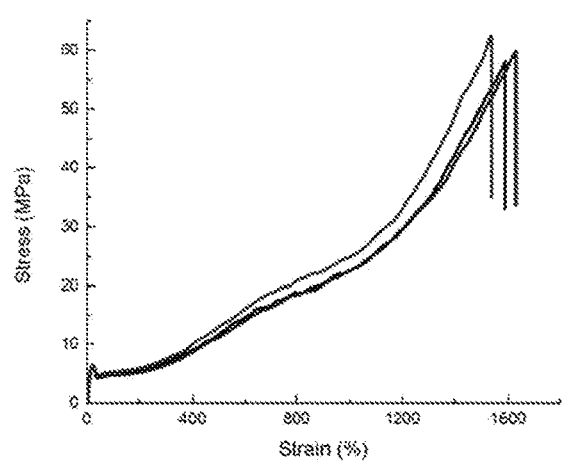
Figure 16D:
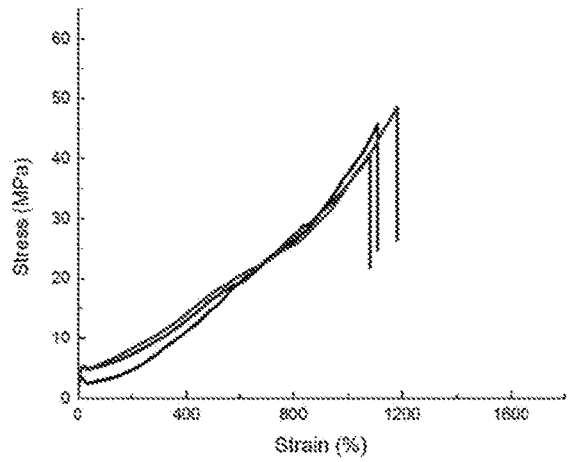
Figure 16E:
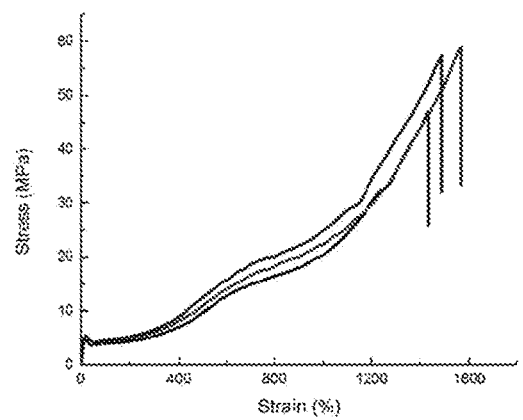
Figure 17A:
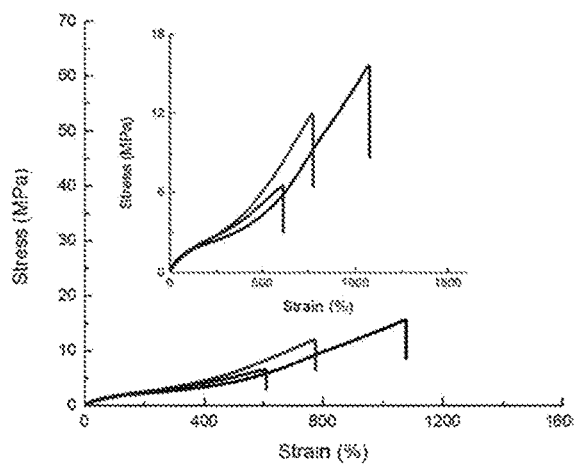
FIG. 17A is a stress-strain curve for a 151.3 kDa $C_{3A}C_{3S}$ polymer containing 75% cis double bonds.
Figure 17B:
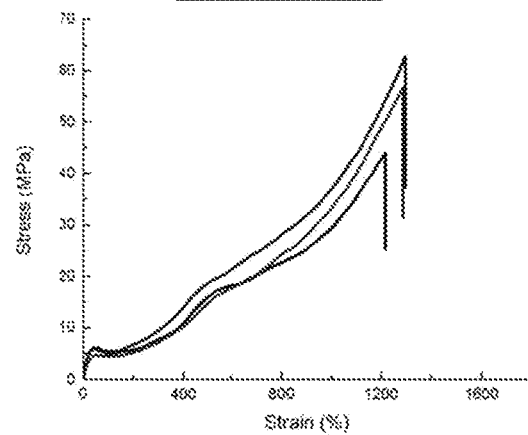
FIG. 17B is a stress-strain curve for a 101.5 kDa $C_{3A}$-$C_{4S}$ polymer containing 78% cis double bonds.
Figure 17C:
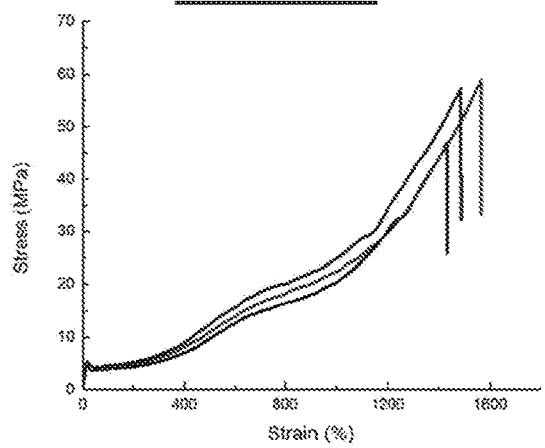
FIG. 17C is a stress-strain curve for a 147 kDa $C_{3A}$-$C_{6S}$ polymer containing 80% cis double bonds.
Figure 17D:
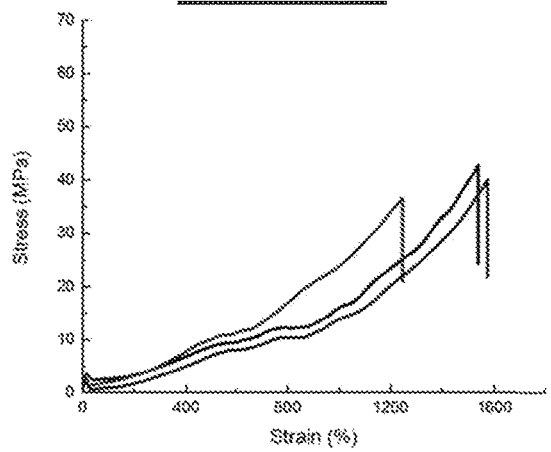
FIG. 17D is a stress-strain curve for a 139.2 kDa $C_{3A}$-$C_{8S}$ polymer containing 79% cis double bonds.
Figure 17E:
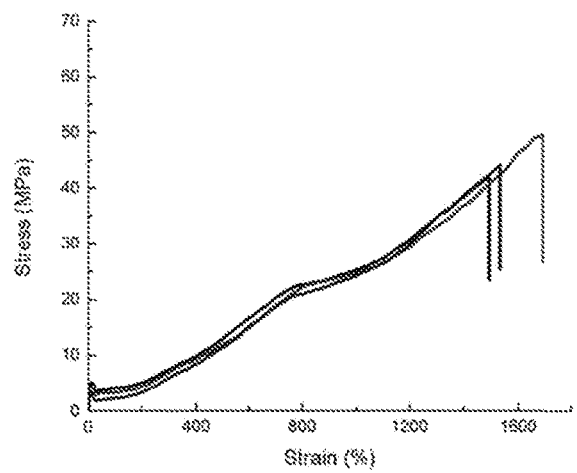
FIG. 17E is a stress-strain curve for a 118.2 kDa $C_{3A}$-$C_{10S}$ polymer containing 79% cis double bonds. For each, data for 3 samples is shown to illustrate the reproducibility. Expansions inset for clarity. Results are listed in Table 6, below.
Figure 18A:
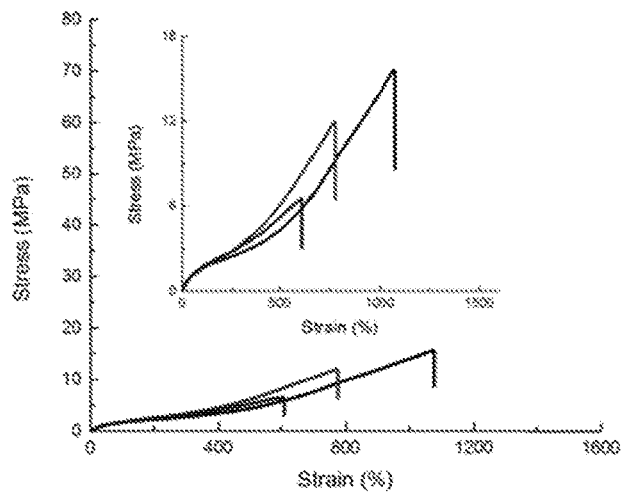
FIGS. 18A-C are exemplar stress vs strain curves for $C_{XA}$-$C_{3S}$ elastomers according to one or more embodiments of the present invention with similar percentages of cis double bonds tested at 20 mm/min.
Figure 18B:
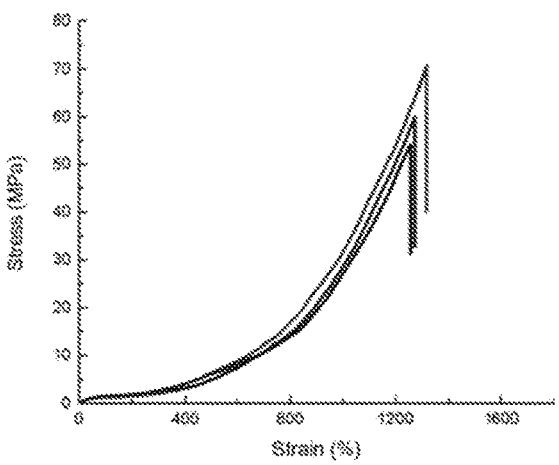
Figure 18C:
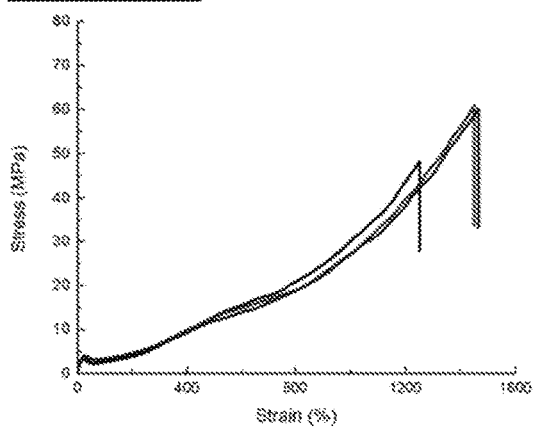

[a]Mechanical data was determined by tensile testing and is presented as a mean ± s.d. of three independent measurements.
[b]Thermal data is reported from DSC 2$^{nd}$ run. $T_g$, $T_m$ and $\Delta H_m$ were obtained from heating curves and $T_c$ from cooling curves.
[c]$M_w$ determined by SEC analysis.
[d]% cis content determined by $^1$H NMR analysis.

samples with 52% and 32% cis-isomer content, respectively (FIGS. 15B-C). In these examples, increasing the fraction of cis-isomers leads to a decrease of the elongation at break from 2970±137% to 2252±115%. This insignificant decrease in network elongation is compensated by almost a five-fold increase from 2.82±0.4 MPa to 16.6±3.8 MPa in ultimate tensile strength at break (Table 4). The integral characteristic of ultimate tensile strength and elongation at break is material's tensile toughness. For these materials, it varies between 35±3.4 MJ m$^{-3}$ and 330±29 MJ m$^{-3}$ which indicates that a large amount of energy can be stored in the system either by achieving a high ultimate tensile strength or elongation at break (see data for 70% and 80% cis-isomer content). The values obtained are noted to differ from the measured elongation at break, $Ð_{break}$ (Table 4) as a consequence of elongation induced crystallization of the samples and sample necking at large deformations which is not captured in the $Ð_{max}$ estimated from small network deformations. None-the-less, this is consistent with what is expected for amorphous entangled networks with shear modulus values on the order of 1-5 MPa.

Figure 4A:
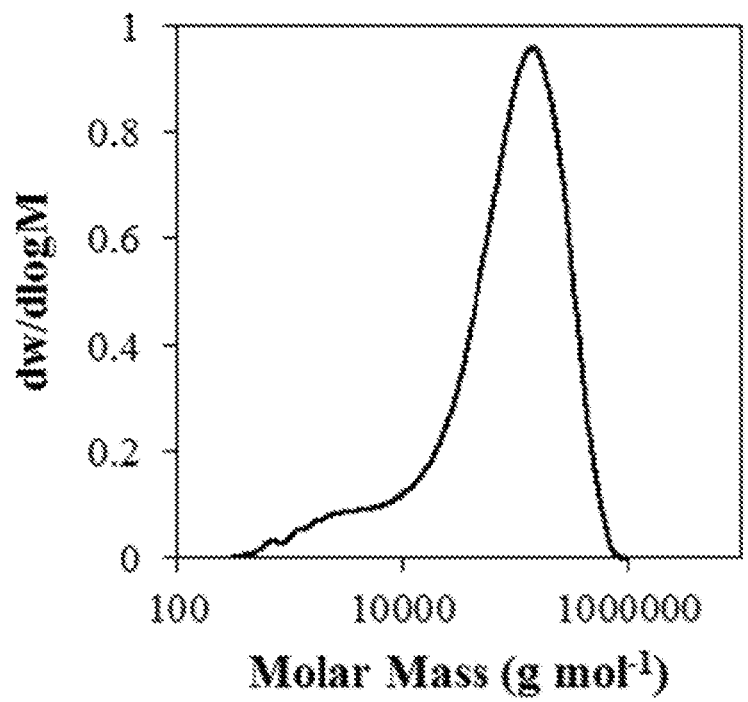
FIGS. 4A-B are graphs showing results of SEC analysis of 80% cis $C_{3A}$-$C_{6S}$ (SEC $CHCl_3$ containing 0.5% v/v $Et_3N$) according to one or more embodiments of the present invention.
Figure 4B:
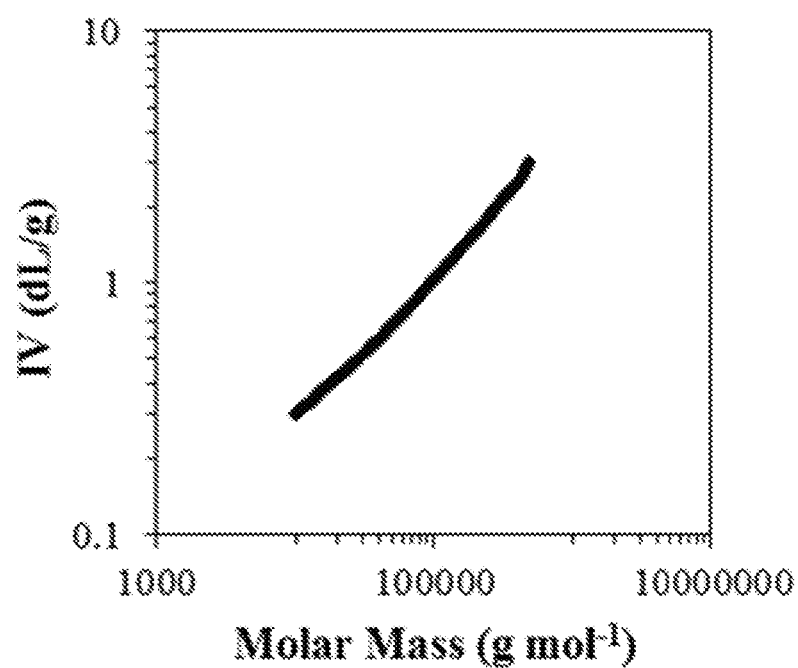
Figure 5A:
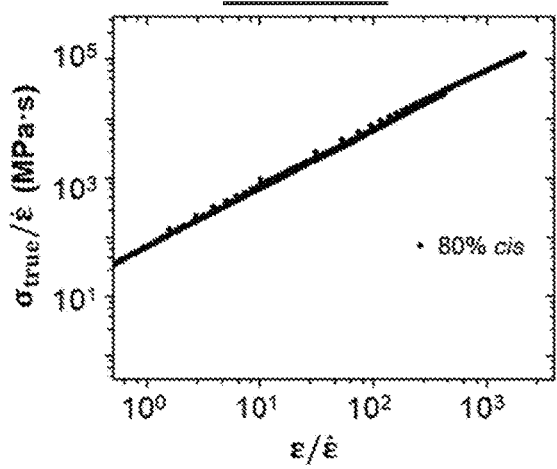
FIGS. 5A-E are graphs showing normalized network true stress $\sigma_{true}(t)/\varepsilon$ as a function of time $\varepsilon(t)/\varepsilon$ for networks with different fractions of the cis-isomers (80% cis-isomers (FIG. 5A), 79% cis-isomers (FIG. 5B), 70% cis-isomers (FIG. 5C), 53% cis-isomers (FIG. 5D), and 32% cis-isomers (FIG. 5E)) obtained using an Instron 5543 Universal Testing Machine. The results of these tests are reported on Table 1, below.
Figure 5B:
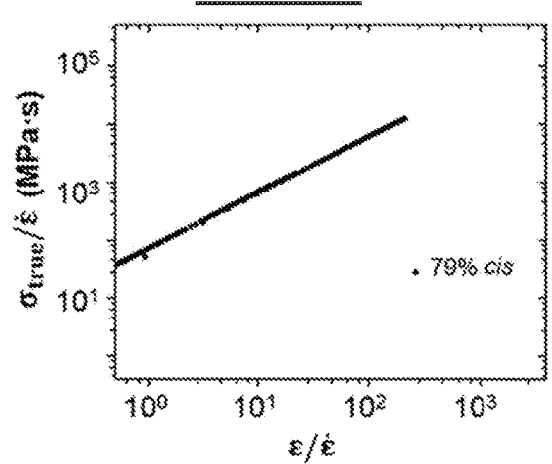
Figure 5C:
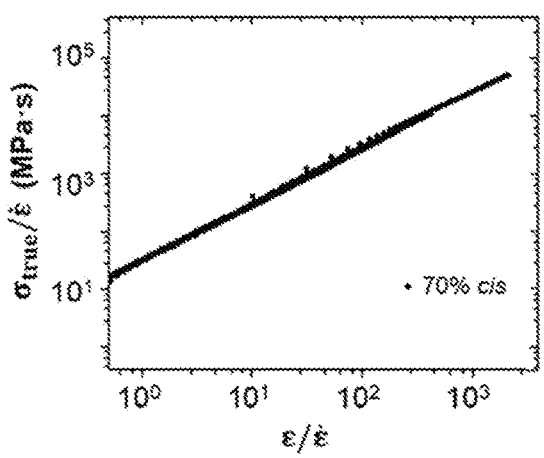
Figure 5D:
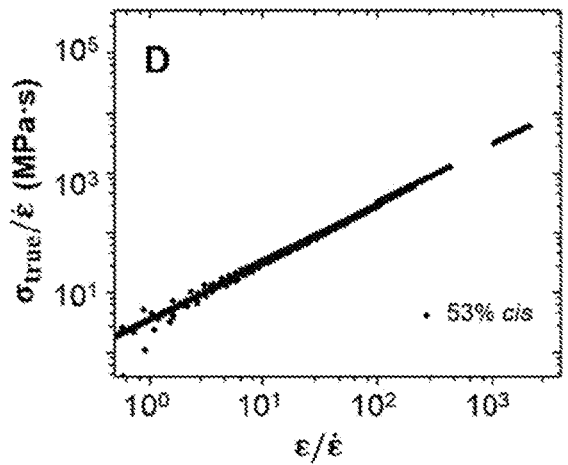
Figure 5E:
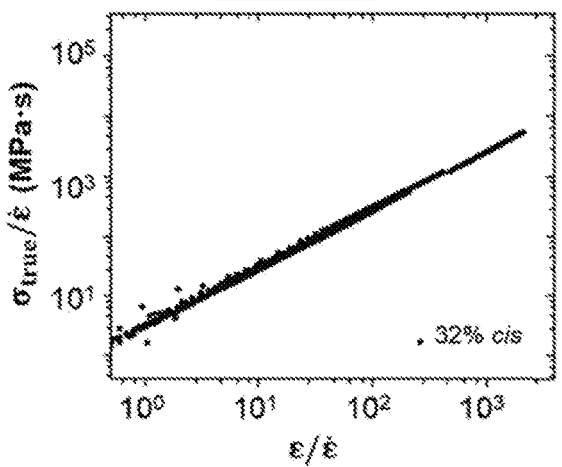
Figure 6:
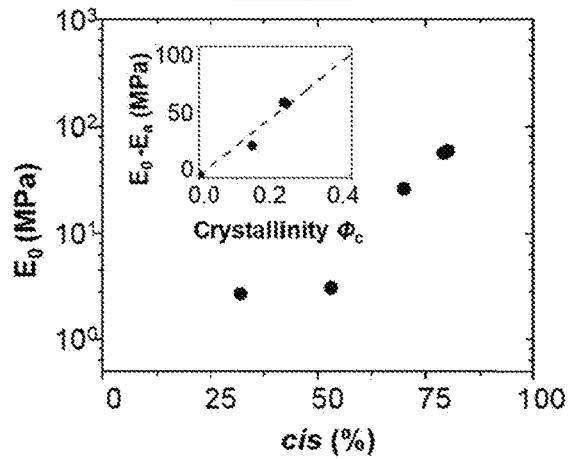
FIG. 6 is a graph showing the Young's moduli of thiol-yne elastomers of the present invention as a function of the fraction of cis-isomers they contain.
Figure 7A:
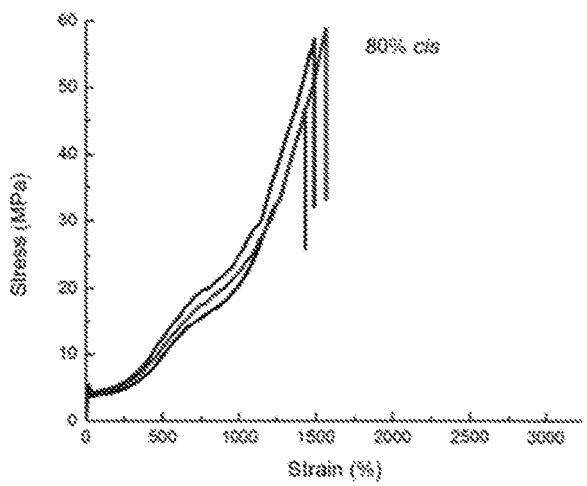
FIGS. 7A-C are exemplar stress vs strain curves for $C_{3A}$-$C_{6S}$ elastomers according to one or more embodiments of the present invention with different percentages of cis (80% (FIG. 7A), 53% (FIG. 7B), and 32% (FIG. 7C)) tested at 20 mm/min. For each, data for 3 samples are shown to illustrate the reproducibility.
Figure 7B:
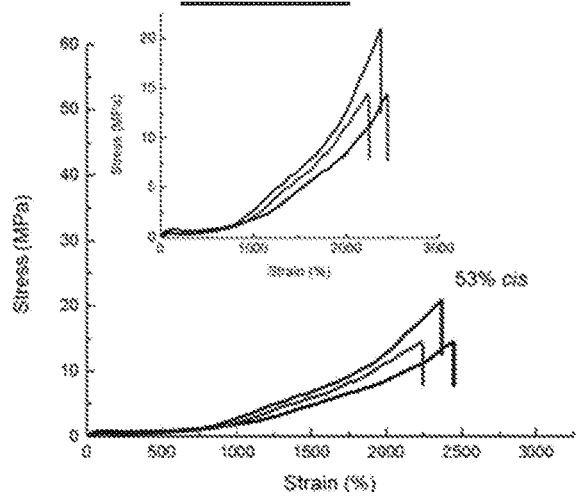
Figure 7C:
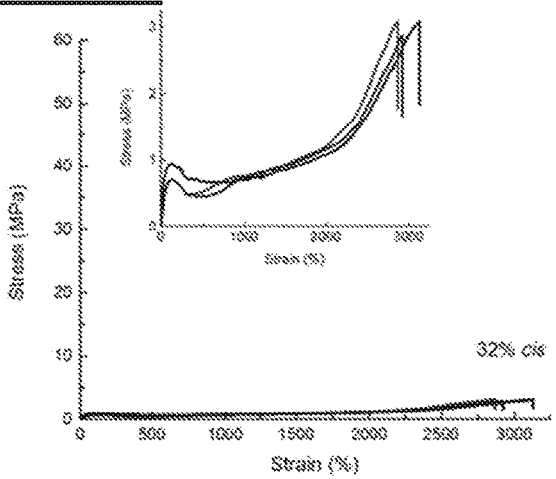

In addition, a series of experiments were conducted to investigate the effect of molar mass of the precursor polymers on the mechanical properties of the resulting networks as the molar mass between in natural rubber has been shown In order to confirm that cross-linking/branching was not occurring during the polymerisation, size exclusion chromatography using viscometry detection was conducted on samples both before and after processing (See FIG. 4A-B). These studies revealed that these polymers had a values of ca. 0.6, which is highly characteristic of a linear, unbranched or non-cross-linked material in a good solvent.

The synthetic nature of the methods of various embodiments of the present invention also affords significant versatility in controlling the properties of these materials through monomer design and end-group modification, while retaining the excellent mechanical properties that are endowed by their biomimetic structure. The importance of specific end-group modification in the modulation of the properties of synthetic elastomers is a key advantage of that technology over the use of natural rubber (and its synthetic surrogates) as it allows for the selective modification of selected (i.e. surface) properties without affecting the bulk properties of the materials. The methodology described herein herein also results in controllable and definable end groups that can be specifically modified and will be critical to dispersing and grafting fillers within the elastomer network. Specifically, the use of a slight excess of multifunctional alkyne monomer results in alkyne chain ends that can be further modified by a simple nucleophilic addition.

Figure 19:
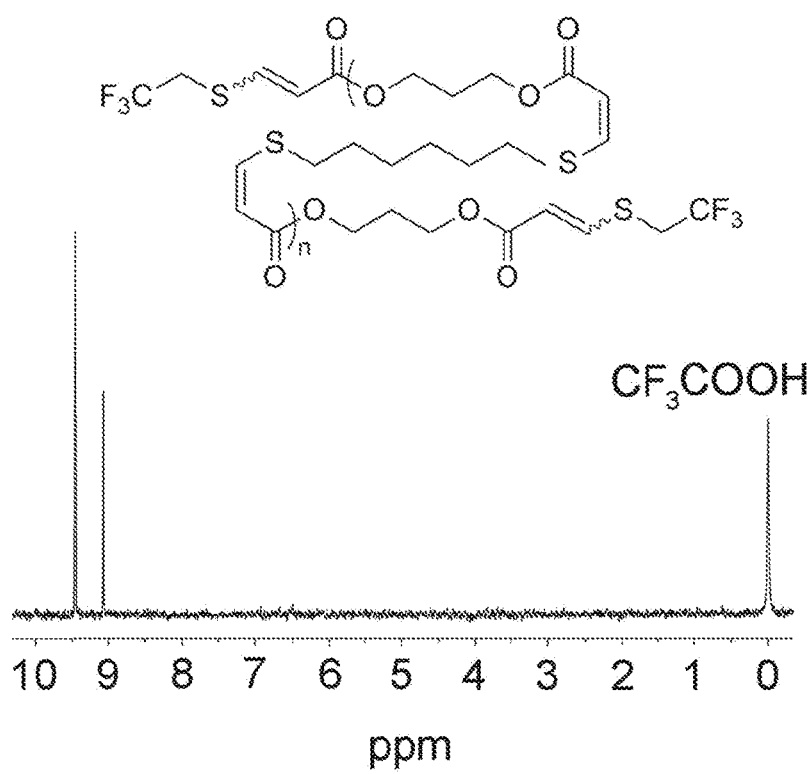
FIG. 19 is a $^{19}F$ NMR spectrum of a $C_{3A}$-$C_{6S}$ thiol-yne step growth polymer according to one or more embodiments of the present invention following end capping with 2,2,2-trifluoroethanethiol (376 MHz, $CDCl_3$+0.01% v/v $CF_3COOH$). The two signals are consistent with cis- and trans-double bond formation upon addition. This result has also been confirmed by $^1H$ and $^{19}F$ NMR spectra taken of small molecule model compounds (data not shown).
Figure 20A:
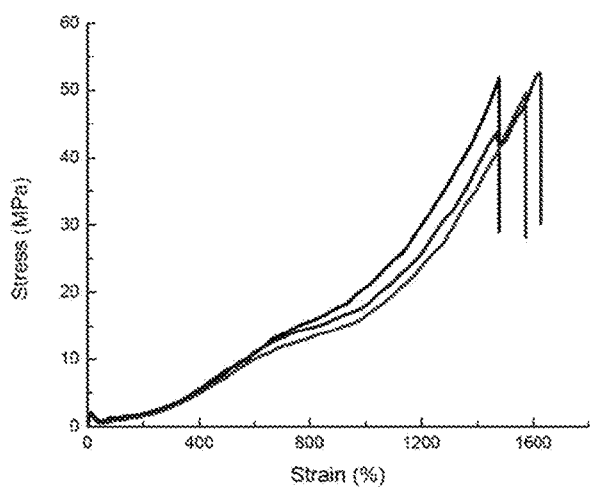
FIGS. 20A-B are exemplar stress vs strain curves for a 109 kDa $C_{3A}$-$C_{6S}$ (90%)+DTT (10%) elastomer (FIG. 22A) and 122.6 kDa $C_{3A}$-$C_{6S}$ (90%)+DEG (10%) eleastomer (FIG. 22B) according to one or more embodiments of the present invention, with similar percentages of cis double bonds, tested at 20 mm/min. For each figure, data for 3 samples is shown to illustrate the reproducibility. Results are listed in Table 6, below
Figure 20B:
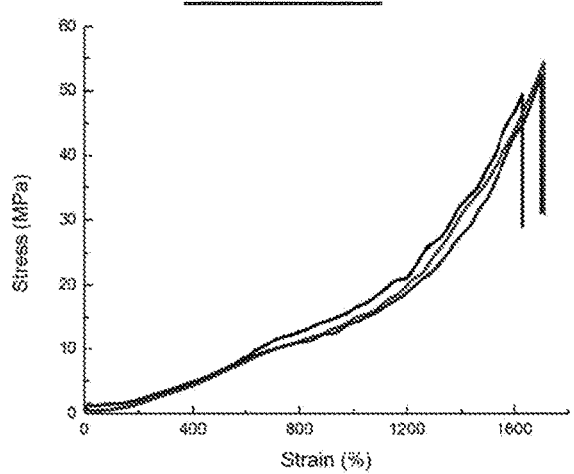

To this end, it has been demonstrated that 2,2,2-trifluoro-ethanethiol can be added selectively to the chain ends of $C_{3A}$-$C_{6S}$ (See FIG. 19) by addition of the thiol to the material either directly after the polymerisation reaction or in a subsequent post-polymerisation step.

Beyond chain-end modification, simple variation of the monomer structure of the dialkyne or dithiol enables not only access to varied mechanical properties, as set forth above, but also materials with different physical properties. For example materials with longer alkyl chains between ester units (introduced through either dialkyne or dithiol monomers) typically resulted in materials with increased strength (See Table 2). $C_{3A}$-$C_{3S}$ materials were also characterised and confirmed using the same methods used for tested the $C_{3A}$-$C_{6S}$ materials described above and it was found that the manipulation of cis:trans ratio of the $C_{3A}$-$C_{3S}$ materials retained the effect on mechanical properties seen with the $C_{3A}$-$C_{6S}$ materials. The same results were found for different monomer compositions as reflected in Table 6), below.

TABLE 6

Mechanical testing data for materials with varied composition.

| Alkyne Monomer | Thiol Monomer(s) | [b] $M_w$ (kg mol$^{-1}$) | [c] % cis | E' (MPa) | $\varepsilon_{yield}$ (%) | $\sigma_{yield}$ (MPa) | $\varepsilon_{break}$ (%) | $\sigma_{break}$ (MPa) |
|---|---|---|---|---|---|---|---|---|
| $C_{3A}$ | $C_{3S}$ | 143.0 | 75 | 2.9 ± 0.3 | — | — | 769 ± 262 | 10.7 ± 4.6 |
| $C_{4A}$ | $C_{3S}$ | 145.8 | 74 | 3.8 ± 0.3 | — | — | 1281 ± 31 | 61.7 ± 8.5 |
| $C_{6A}$ | $C_{3S}$ | 105.8 | 75 | 36.1 ± 3.1 | 25 ± 2 | 3.7 ± 0.5 | 1390 ± 119 | 56.5 ± 7.3 |
| $C_{3A}$ | $C_{4S}$ | 101.5 | 78 | 27.4 ± 7.8 | 48 ± 3 | 5.5 ± 0.8 | 1266 ± 43 | 54.4 ± 9.6 |
| $C_{3A}$ | $C_{8S}$ | 139.2 | 79 | 43.8 ± 3.3 | 13 ± 4 | 2.6 ± 0.8 | 1451 ± 179 | 39.8 ± 3.0 |
| $C_{3A}$ | $C_{10S}$ | 118.2 | 79 | 87.6 ± 6.3 | 14 ± 2 | 4.6 ± 0.6 | 1608 ± 103 | 46.7 ± 4.1 |
| $C_{3A}$ | $C_{3S}$ | 108.0 | 63 | 3.1 ± 0.2 | 167 ± 1 | 1.5 ± 0.2 | 2081 ± 91 | 12.2 ± 1.4 |
| $C_{3A}$ | $C_{3S}$ | 103.8 | 42 | 3.7 ± 0.4 | 175 ± 8 | 1.5 ± 0.2 | 3236 ± 508 | 9.0 ± 2.3 |
| $C_{3A}$ | $C_{6S}$ (90%) + DTT (10%) | 109.8 | 78 | 39.3 ± 1.9 | 9 ± 1 | 1.8 ± 0.2 | 1557 ± 74 | 51.3 ± 1.5 |
| $C_{3A}$ | $C_{6S}$ (90%) + DEG (10%) | 122.6 | 79 | 20.7 ± 3.5 | 11 ± 4 | 1.0 ± 0.4 | 1680 ± 44 | 52.1 ± 2.6 |
| $C_{3A}$ * | $C_{6S}$ | — | — | 2.7 ± 1.0 | — | — | 1690 ± 89 | 16.6 ± 2.2 |

[a] Mechanical data were determined by tensile testing and are presented as a mean ± s.d. of three independent measurements.
[b] $M_w$ determined by SEC analysis,
[c] % cis content determined by $^1$H NMR analysis.
DTT = 1,4-dithio-D-threitol;
DEG = 2,2'-(ethylenedioxy)diethanethiol.
* sample vulcanised with 1 % wt dicumyl peroxide.

Distinct changes in physical properties were easily introduced through the incorporation of functional dithiols including 2,2'-(ethylenedioxy)diethanethiol and 1,4-dithio-D-threitol. Even at only a 10% incorporation of these comonomers, the polar component of the Young's-Laplace equation is significantly reduced, while the mechanical properties were largely retained (See, Tables 6 and 7; FIGS. 11A-D, 13A-C, 14A-C and 20A-B). It is believed that these effects will be significant when dispersing polar fillers.

TABLE 7

Surface energy properties for materials with varied composition.

| Alkyne Monomer | Thiol Monomer(s) | $M_w$ (kg mol$^{-1}$) | % cis | Before/After Stretching | $\gamma_S^p$ (mJ m$^{-2}$) | $\gamma_S^d$ (mJ m$^{-2}$) | $\gamma_S$ (mJ m$^{-2}$) |
|---|---|---|---|---|---|---|---|
| $C_{3A}$ | $C_{3S}$ | 143.0 | 75 | Before | 11.8 ± 7.8 | 16.1 ± 6.4 | 27.9 ± 14.2 |
|  |  |  |  | After | 5.7 ± 2.0 | 16.6 ± 2.8 | 22.3 ± 4.8 |
| $C_{3A}$ | $C_{6S}$ | 147.5 | 80 | Before | 18.6 ± 2.2 | 9.7 ± 1.5 | 28.4 ± 3.7 |
|  |  |  |  | After | 15.0 ± 4.2 | 13.2 ± 3.9 | 28.1 ± 8.1 |
| $C_{3A}$ | $C_{10S}$ | 118.2 | 79 | Before | 3.5 ± 0.7 | 17.3 ± 1.5 | 20.8 ± 2.2 |
|  |  |  |  | After | 12.8 ± 1.6 | 10.5 ± 1.5 | 23.3 ± 3.1 |
| $C_{3A}$ | $C_{6S}$ (90%) + DTT (10%) | 109.8 | 78 | Before | 7.5 ± 3.2 | 11.2 ± 3.7 | 18.7 ± 6.9 |
| $C_{3A}$ | $C_{6S}$ (90%) + DEG (10%) | 122.6 | 79 | Before | 3.6 ± 2.1 | 17.6 ± 4.4 | 21.1 ± 6.5 |

$\gamma_S^d$ is the dispersion component of polymer surface energy, $\gamma_S^p$ is the polar component of polymer surface energy, $\gamma_S$ is the overall polymer surface energy.
Surface energies were determined from contact angle measurements with four different probe liquids (propylene glycol, ethylene glycol, glycerol and water) using a Goniometer and fitting the data using the Owen's equation.
Data is presented as a mean ± s.d. of five independent measurements.
$M_w$ determined by SEC analysis, % cis content determined by $^1$H NMR analysis.
DTT = 1,4-dithio-D-threitol;
DEG = 2,2'-(ethylenedioxy)diethanethiol.

Figure 21:
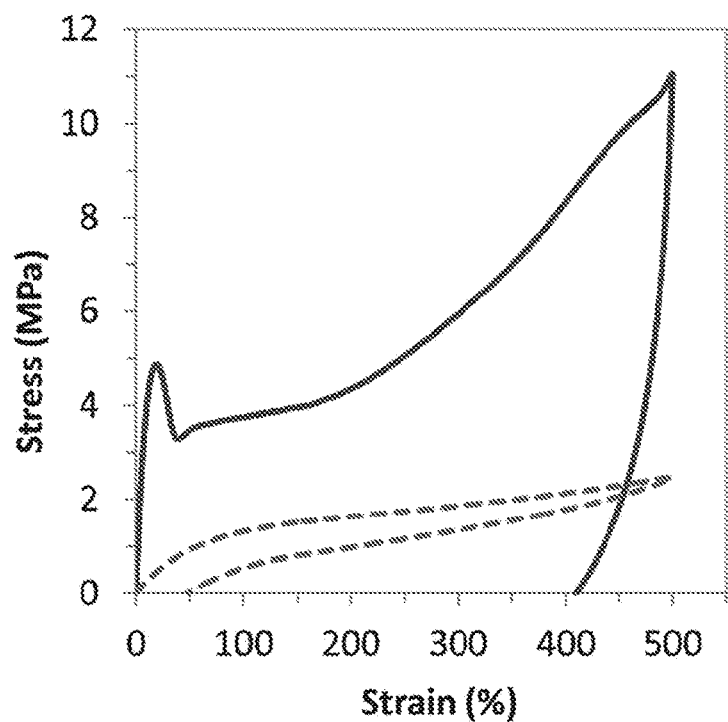
FIG. 21 is an exemplar stress vs strain curves for 80% cis $C_{3A}$-$C_{6S}$ before (solid line) and after (dashed line) vulcanisation with 1% wt dicumyl peroxide. Samples were extended to 500% of their original length before being allowed to relax. While the non-vulcanised sample does not significantly recover, the vulcanised sample recovers to 150% of its original length which demonstrates the superior elastic properties endowed as a result of the vulcanisation process.
Figure 22A:
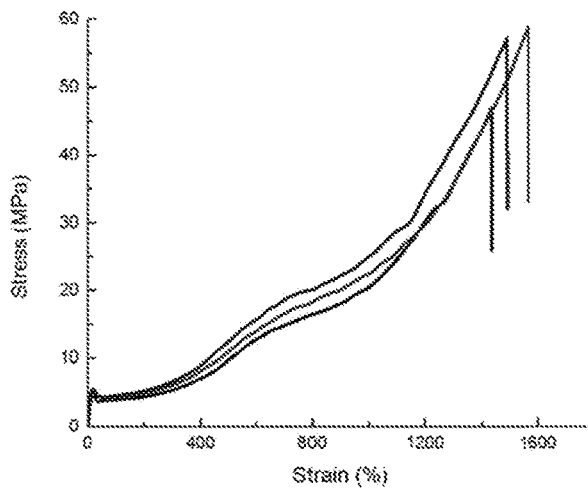
FIGS. 22A-B are exemplar stress vs strain curves for 80% cis $C_{3A}$-$C_{6S}$ elastomers according to various embodiments of the present invention before (FIG. 23A) and after (FIG. 23B) vulcanization, tested at 20 mm/min. For each figure, data for 3 samples is shown to illustrate the reproducibility. The expansion inset is for clarity. Results are listed in Table 6, below.
Figure 22B:
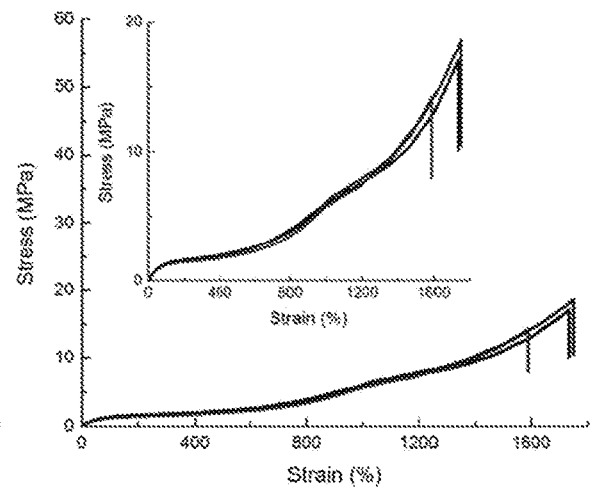

Analysis of the hydrolytic and thermal degradability of these materials have also been investigated. Submersion of the 80% cis $C_{3,4}$-$C_{6S}$ material, described above, in a phosphate-buffered saline solution (pH 7.4) and 0.1 M $KOH_{aq}$ solution at at 27° C. only revealed a less than 0.3% additional mass and no degradation after 14 days which indicates that these materials have an excellent stability to hydrolysis. Furthermore, using thermogravimetric analysis (TGA), an onset of degradation was observed at 355° C. which shows that the materials are also thermally stable and suitable for melt processing, thermal molding and vulcanization-based toughening. These materials have been stable to ambient oxidation and maintained their mechanical properties for more than a year. Finally, it has been demonstrated that the double bonds within these material remains accessible for further reaction. Specifically, vulcanisation of the materials by radical curing with 1 wt % dicumyl peroxide at 160° C. in bulk yields a significant change in the materials such that, consistent with cross-linking reactions occurring, the material becomes more elastic in nature (See FIG. 21, 22A-B. Most notably, it has been found that the modified material can now be subjected to repeated load-unload cycles of up to 500% extension with the materials recovering to 150% of the original dimensions.

Example 2

Dithiol monomers were obtained from commercial sources and used after purification by distillation. Multi-functional alkyne monomers were obtained by sulphuric acid-catalyzed Fischer esterification of propiolic acid and the corresponding diol in a 2:1 ratio using a Dean-Stark apparatus at 120° C. Thiol-yne step growth polymerization was undertaken by combination of dialkyne and dithiol monomers in equimolar ratio in $CHCl_3$ at −15° C. before addition of 1 mol % 1,8-diazabicycloundecene (DBU) as catalyst. The exothermic reaction was allowed to warm to room temperature and stirred for 1 h before dilution with $CHCl_3$, addition of 2,6-di-tert-butyl-4-methylphenol (BHT, 5% wt) to prevent undesired radical reactions and precipitation into diethyl ether. Modification of molar mass of the polymers was undertaken by changing the amount of dithiol in relation to the dialkyne such that the dialkyne was always in excess, and control over % cis content of the polymers was obtained by using $Et_3N$ as catalyst in place of DBU while varying the solvent to compositions of $CHCl_3$ and DMF (17:3, 7:3, and 100% DMF). Following compression moulding under vacuum at 160° C., dumbbell-shaped samples were cut and tested using an Instron 5543 Universal Testing Machine.

$^1H$, $^{13}C$ and $^{19}F$ NMR spectra were recorded in $CDCl_3$ on either a Bruker DPX-500 (monomers and model compounds) or Bruker DPX-400 (all polymers) spectrometer at 298 K. SEC analyses were performed in either $CHCl_3$ or DMF on an Agilent system equipped with a guard column and two mixed D Agilent Polymer Laboratories columns and a range of detectors. Thermal analyses were performed at a heating rate of 10° C./min with a TA Instruments DSC Q200 apparatus. WAXD experiments were conducted using Bruker AXS diffractometer and SAXS experiments were performed on a Rigaku MicroMax 002+ instrument. Surface energy measurements were taken from contact angle measurements using propylene glycol, ethylene glycol, glycerol and water as probes on an Advanced Goniometer (Rame-Hart Instrument Co., Model 500) at 25° C. Data was fitted using the Owen's equation. (See Eq. 1, above) The results are reported in Table 7, above.

The novel approach to materials design of various embodiments of the present invention as described herein outlines a series of principles that transfer the unique mechanical properties of natural rubber and gutta percha to a fully synthetic system. The organocatalytic, step growth polymerization of embodiments of the present invention affords independent control over mass, mass distribution, stereochemistry and the resulting mechanical and physical properties, without the use of metals or exotic additives. Furthermore, the synthetic precursors of these systems allow access to starting materials and functional species and defined end groups not commonly found in natural or even synthetic elastomers. It is believed that the benefits of monomer composition, stoichiometry, end-group modification and the ability to toughen via commercially relevant vulcanization processes realized by various embodiments of the present invention yield an entire new design space for functional elastomers.

In light of the foregoing, it should be appreciated that the present invention significantly advances the art by providing a thiol-yne elastomer (and related methods of making and using same) that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A thiol-yne elastomer composition comprising the residue of a multi-functional alkyne monomer and the residue of a multi-functional thiol monomer, said thiol-yne elastomer composition having a cis-trans double bond ratio of from 99:1 to about 1:99 having a glass transition temperature ($T_g$) of from about −50° C. or more to about 10° C. or less.

2. The thiol-yne elastomer composition of claim 1 further comprising one or more functional end groups.

3. The thiol-yne elastomer composition of claim 2 wherein said one or more functional end groups are selected from the group consisting of alkyne, alkene, hydroxyl, carboxylic acid, fluoro, trifluoro, perfluoro, and combinations thereof.

4. The thiol-yne elastomer of claim 1 wherein said multi-functional alkyne comprises an alkyne ester, an activated alkyne amide, or a dialkyne with a ketone.

5. The thiol-yne elastomer composition of claim 1 wherein said multi-functional alkyne is a dialkyne having the formula:

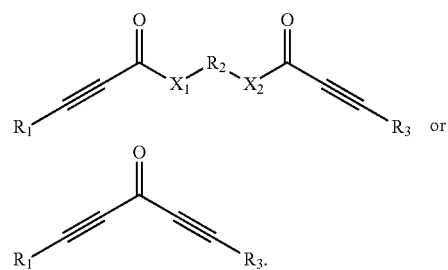

where $R_1$, and $R_3$ are each an H, alkyl or aryl group; $R_2$ is an alkyl, alkylene, ethoxy, or arylene group; and $X_1$ and $X_2$ are an O, NH, or S group.

6. The thiol-yne elastomer of claim 1 wherein said multi-functional alkyne is a dialkyne having the formula:

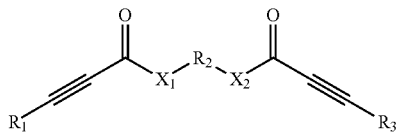

where $R_1$, and $R_3$ are each an H, alkyl or aryl group; $R_2$ is an alkyl, alkylene, ethoxy, or arylene group; and $X_1$ and $X_2$ are an O, NH, or S group.

7. The thiol-yne elastomer of claim 1 wherein said multi-functional thiol monomer comprises a linear dithiol, a branched trithiol, a branched tetrathiol, or a combination thereof.

8. A thiol-yne elastomer composition comprising the residue of a multi-functional alkyne monomer and the residue of a multi-functional thiol monomer, said thiol-yne elastomer composition having a cis-trans double bond ratio of from 99:1 to about 1:99 having an elastic modulus (E) of from about 1.0 MPa to about 90 MPa.

9. The thiol-yne elastomer of claim 8 wherein said multi-functional alkyne comprises an alkyne ester, an activated alkyne amide, or a dialkyne with a ketone.

10. The thiol-yne elastomer of claim 8 wherein said multi-functional alkyne is a dialkyne having the formula:

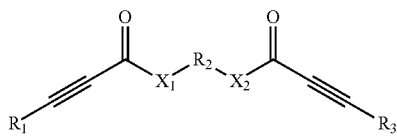

where $R_1$, and $R_3$ are each an H, alkyl or aryl group; $R_2$ is an alkyl, alkylene, ethoxy, or arylene group; and $X_1$ and $X_2$ are an O, NH, or S group.

11. The thiol-yne elastomer of claim 8 wherein said multi-functional thiol monomer comprises a linear dithiol, a branched trithiol, a branched tetrathiol, or a combination thereof.

12. A thiol-yne elastomer composition comprising the residue of a multi-functional alkyne monomer and the residue of a multi-functional thiol monomer, said thiol-yne elastomer composition having a cis-trans double bond ratio of from 99:1 to about 1:99 having an elongation at break ($\varepsilon_{break}$) of from 50% or more to 3000% or less.

13. The thiol-yne elastomer of claim 12 wherein said multi-functional alkyne comprises an alkyne ester, an activated alkyne amide, or a dialkyne with a ketone.

14. The thiol-yne elastomer of claim 12 wherein said multi-functional alkyne is a dialkyne having the formula:

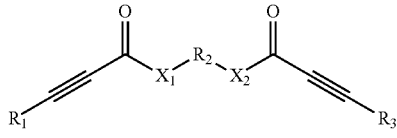

where $R_1$, and $R_3$ are each an H, alkyl or aryl group; $R_2$ is an alkyl, alkylene, ethoxy, or arylene group; and $X_1$ and $X_2$ are an O, NH, or S group.

15. The thiol-yne elastomer of claim 12 wherein said multi-functional thiol monomer comprises a linear dithiol, a branched trithiol, a branched tetrathiol, or a combination thereof.

16. A thiol-yne elastomer composition comprising the residue of a multi-functional alkyne monomer and the residue of a multi-functional thiol monomer, said thiol-yne elastomer composition having a cis-trans double bond ratio of from 99:1 to about 1:99 and a glass transition temperature ($T_g$) of from about −50° C. or more to about 10° C. or less wherein said multi-functional alkyne is a dialkyne having the formula:

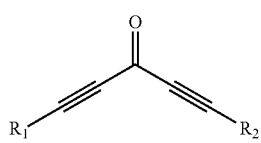

where $R_1$ and $R_2$ are H, alkyl or aryl groups.

17. The thiol-yne elastomer composition of claim 16 wherein said multi-functional thiol monomer comprises a branched trithiol, a branched tetrathiol, or a combination thereof.

18. The thiol-yne elastomer of claim 16 wherein said multi-functional thiol monomer has the formula:

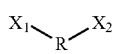

where R is an alkylene or arlyene group and $X_1$ and $X_2$ are SH groups.

19. The thiol-yne elastomer of claim 16 having a weight average molecular mass ($M_W$) of from about 1,000 Da or more to about 1,000,000 Da or less.

20. A method of making the thiol-yne elastomer composition of claim 1 comprising:
A. combining a multi-functional alkyne monomer and a multi-functional thiol monomer, with a suitable reaction solvent or solvent combination in a suitable vessel at a temperature of from about −20° C. to about 40° C.;
B. adding a suitable base catalyst, allowing the temperature to rise to about ambient temperature, and stirring for from about 0.05 hours to about 10 hours;
C. diluting the mixture of step B with additional reaction solvent or solvent combination and adding a radical inhibitor compound to prevent undesired radical reactions; and
D. precipitating the mixture of step C into a suitable polar solvent to produce a thiol-yne elastomer composition.

21. The method of claim 20 wherein said multi-functional alkyne is a dialkyne monomer having the formula:

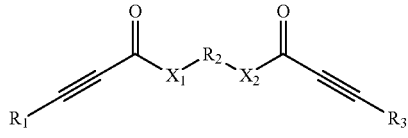

where $R_1$, and $R_3$ are H, alkyl or aryl groups; $R_2$ is alkyl, alkylene, ethoxy, or aryl group; and $X_1$ and $X_2$ is an O, NH, or S group.

22. The method of claim 20 wherein said reaction solvent or solvent combination comprises a mixture of solvents having different polarities.

23. The method of claim 20 wherein said reaction solvent or solvent combination comprises a solvent selected from the group consisting of chloroform ($CHCl_3$), N,N-dimethylformamide (DMF), dioxane, methylene chloride ($CH_2Cl_2$), N-methylpyrolidone (NMP), and combinations thereof.

24. The method of claim 20 wherein said base catalyst is selected from the group consisting of 1,8-diazabicycloundecene (DSU), triazabicyclodecene (TBD), triethylamine ($Et_3N$), tetramethyl guanidine (TMG), benzotriazole, dimethylphenylphosphine (DMPP), and combinations thereof.

25. The method of claim 20 wherein said radical inhibitor is 2,6-di-tert-butyl-4-methylphenol (BHT).

26. The method of claim 20 wherein the molar ratio of the multi-functional alkyne monomer to the multi-functional thiol monomer is approximately 1:1.

27. The method of claim 20 further comprising controlling the cis-trans double bond ratio of the resulting thiol-yne elastomer composition by using triethylamine as said base catalyst and varying the polarity of said suitable solvent or solvent combination, wherein an increase in the polarity of said reaction solvent or solvent combination produces an increase in the cis-trans double bond ratio of the resulting thiol-yne elastomer composition and a decrease in the polarity of said reaction solvent or solvent combination produces an decrease in the cis-trans double bond ratio of the resulting thiol-yne elastomer composition.

28. The method of claim 20 further comprising adding one or more thiol functionalized end group to the terminal ends of said thiol-yne elastomer composition by means of a thiol-alkyne click reaction.

29. The method of claim 20 wherein the ratio of dialkyne monomer to the multi-functional thiol monomer is greater than 1:1, said method further comprising:
   E. adding a thiol functionalized end group to the mixture of step C after the step of adding a radical initiator.

30. The method of claim 20 wherein the ratio of said dialkyne monomer to said multi-functional thiol monomer is greater than 1:1, said method further comprising:
   F. dissolving the thiol-yne elastomer composition of step D in a suitable solvent;
   G. adding a thiol functionalized end group to the solution of step F and stirring until said thiol functionalized end group dissolves;
   H. adding a catalyst; and
   I. precipitating the solution of step H into a non-solvent for said thiol-yne elastomer composition to produce a thiol-yne elastomer composition comprising said end groups.

* * * * *